US009932073B2

(12) United States Patent
Dube et al.

(10) Patent No.: US 9,932,073 B2
(45) Date of Patent: Apr. 3, 2018

(54) OFF-ROAD WHEELED SIDE-BY-SIDE VEHICLE

(71) Applicant: BOMBARDIER RECREATIONAL PRODUCTS INC., Valcourt (CA)

(72) Inventors: Frank Dube, Valcourt (CA); Dominic Otis-Aubut, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 15/113,452

(22) PCT Filed: Feb. 2, 2015

(86) PCT No.: PCT/IB2015/050798
§ 371 (c)(1),
(2) Date: Jul. 22, 2016

(87) PCT Pub. No.: WO2015/114604
PCT Pub. Date: Aug. 6, 2015

(65) Prior Publication Data
US 2017/0029035 A1    Feb. 2, 2017

Related U.S. Application Data

(60) Provisional application No. 61/934,526, filed on Jan. 31, 2014.

(51) Int. Cl.
*B60K 15/063* (2006.01)
*B62D 21/18* (2006.01)
(Continued)

(52) U.S. Cl.
CPC ............ *B62D 21/183* (2013.01); *B60K 13/02* (2013.01); *B60K 13/04* (2013.01); *B60K 15/063* (2013.01);
(Continued)

(58) Field of Classification Search
CPC ................................ B60K 13/02; B60K 15/03
(Continued)

(56) References Cited

U.S. PATENT DOCUMENTS

| 4,192,216 A | 3/1980 | Wait |
| 4,817,985 A * | 4/1989 | Enokimoto .......... B62D 21/183 |
| | | 280/124.143 |

(Continued)

FOREIGN PATENT DOCUMENTS

| RU | 86532 U1 | 9/2009 |
| RU | 2459714 C2 | 8/2012 |

OTHER PUBLICATIONS

Search Report issued from the Russian Patent Office in connection with the RU Corresponding Application No. 2016134946; Search Report completed on Apr. 17, 2017.
(Continued)

*Primary Examiner* — Jeffrey J Restifo
(74) *Attorney, Agent, or Firm* — BCF LLP

(57) ABSTRACT

A vehicle includes a frame, a left and right front wheel, and a left and right rear wheel. A left front suspension operatively and a right front suspension operatively respectively operatively connect the left and right front wheels to the frame. A left and right rear suspension, respectively operatively connect the left and right rear wheels to the frame. At least one seat, connected to the frame and having a seat base, is disposed longitudinally rearward of the left and right front suspensions. An engine is operatively connected to at least one of the wheels. An air induction system fluidly, which includes an airbox, and a fuel tank fluidly communicate with the engine. The engine, the airbox and the fuel tank are disposed longitudinally forward of the rear suspensions and longitudinally rearward of the seat base of the at least one seat.

31 Claims, 61 Drawing Sheets

(51) Int. Cl.
*B60K 13/02* (2006.01)
*B60K 13/04* (2006.01)
*B60N 2/01* (2006.01)
*B60N 2/30* (2006.01)
*B60R 7/04* (2006.01)
*B60R 11/00* (2006.01)
*B62D 25/20* (2006.01)
*F02M 35/10* (2006.01)
*F02M 35/16* (2006.01)
*B60K 17/34* (2006.01)
*B60K 5/00* (2006.01)

(52) U.S. Cl.
CPC ............. *B60N 2/012* (2013.01); *B60N 2/305* (2013.01); *B60R 7/043* (2013.01); *B60R 11/00* (2013.01); *B62D 25/2045* (2013.01); *F02M 35/10006* (2013.01); *F02M 35/16* (2013.01); *B60K 17/34* (2013.01); *B60K 2005/003* (2013.01); *B60K 2015/0638* (2013.01); *B60R 2011/0029* (2013.01); *B60Y 2200/20* (2013.01)

(58) Field of Classification Search
USPC ........................................ 180/291, 292, 68.3
See application file for complete search history.

(56) References Cited

U.S. PATENT DOCUMENTS

| | | | | |
|---|---|---|---|---|
| 5,116,097 | A | 5/1992 | Bulgari | |
| 7,287,619 | B2 * | 10/2007 | Tanaka | B60K 13/02 180/291 |
| 7,510,199 | B2 * | 3/2009 | Nash | B60G 7/02 180/311 |
| 7,650,959 | B2 * | 1/2010 | Kato | B60G 7/02 180/208 |
| 7,753,427 | B2 * | 7/2010 | Yamamura | B60K 13/04 180/309 |
| 8,464,824 | B1 * | 6/2013 | Reisenberger | B60K 28/10 180/268 |
| 8,479,854 | B1 * | 7/2013 | Gagnon | B60K 26/04 180/68.3 |
| 8,746,719 | B2 * | 6/2014 | Safranski | B60G 3/14 280/124.148 |
| 9,217,501 | B2 * | 12/2015 | Deckard | B60K 17/08 |
| 9,434,244 | B2 * | 9/2016 | Sunsdahl | B60K 5/00 |
| 9,512,771 | B2 * | 12/2016 | Mahira | F01N 13/085 |
| 2004/0231900 | A1 * | 11/2004 | Tanaka | B60K 13/02 180/68.3 |
| 2006/0065231 | A1 * | 3/2006 | Nozaki | B60K 13/02 123/198 E |
| 2009/0302590 | A1 * | 12/2009 | Van Bronkhorst | B60G 15/063 280/756 |
| 2010/0078240 | A1 * | 4/2010 | Miura | B60K 13/02 180/68.3 |
| 2010/0078256 | A1 * | 4/2010 | Kuwabara | B60K 5/02 180/337 |
| 2010/0236852 | A1 * | 9/2010 | Shiratori | B60K 13/02 180/68.3 |
| 2012/0031693 | A1 * | 2/2012 | Deckard | F16H 57/0416 180/68.3 |
| 2012/0217078 | A1 * | 8/2012 | Kinsman | B60R 21/13 180/69.4 |
| 2012/0255799 | A1 * | 10/2012 | Kohler | B60L 11/126 180/65.245 |
| 2013/0033070 | A1 * | 2/2013 | Kinsman | B62D 21/183 296/190.03 |
| 2013/0319785 | A1 * | 12/2013 | Spindler | B62D 23/005 180/292 |
| 2014/0265285 | A1 * | 9/2014 | Erspamer | B60N 2/6009 280/783 |
| 2014/0296030 | A1 * | 10/2014 | Norita | F16H 61/0009 477/77 |
| 2015/0041237 | A1 * | 2/2015 | Nadeau | B60K 5/00 180/292 |
| 2015/0047917 | A1 * | 2/2015 | Burt, II | B62D 25/2036 180/292 |
| 2016/0185202 | A1 * | 6/2016 | Itoo | B60K 5/00 180/291 |
| 2017/0001549 | A1 * | 1/2017 | Bessho | B60K 13/04 |
| 2017/0028881 | A1 * | 2/2017 | Proulx | B60N 2/305 |
| 2017/0029035 | A1 * | 2/2017 | Dube | B60K 15/063 |
| 2017/0029036 | A1 * | 2/2017 | Proulx | B60N 2/24 |
| 2017/0029042 | A1 * | 2/2017 | Simard | B60P 3/00 |
| 2017/0174027 | A1 * | 6/2017 | Mailhot | B60G 3/20 |

OTHER PUBLICATIONS

International Search Report of PCT/IB2015/050798; Blaine R. Copenheaver; dated May 18, 2015.
Polaris Ranger Owner's Manual; Aug. 15, 2013; Cover page and pp. 1-80; P/N 9924689; Polaris; USA.

* cited by examiner

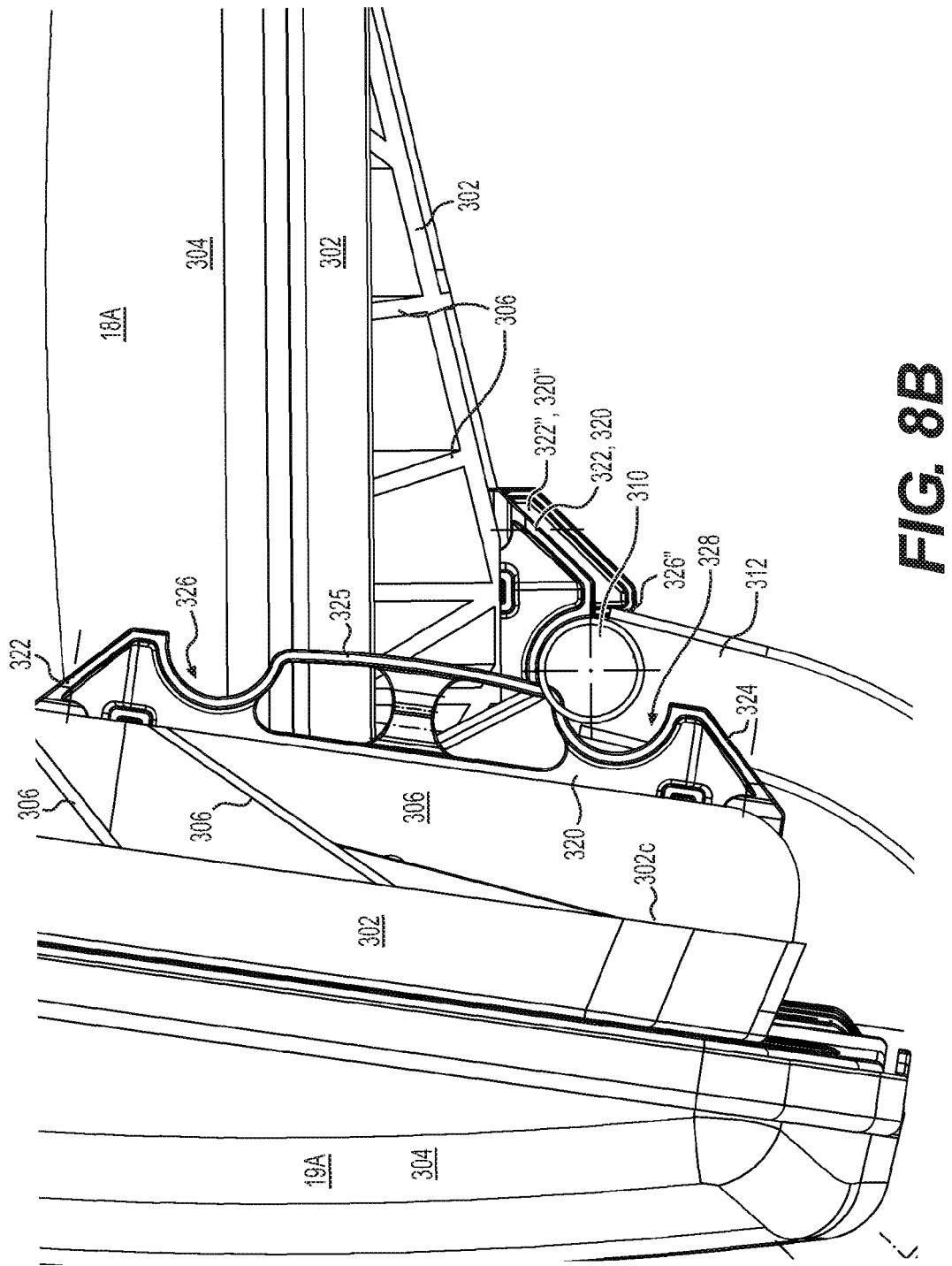

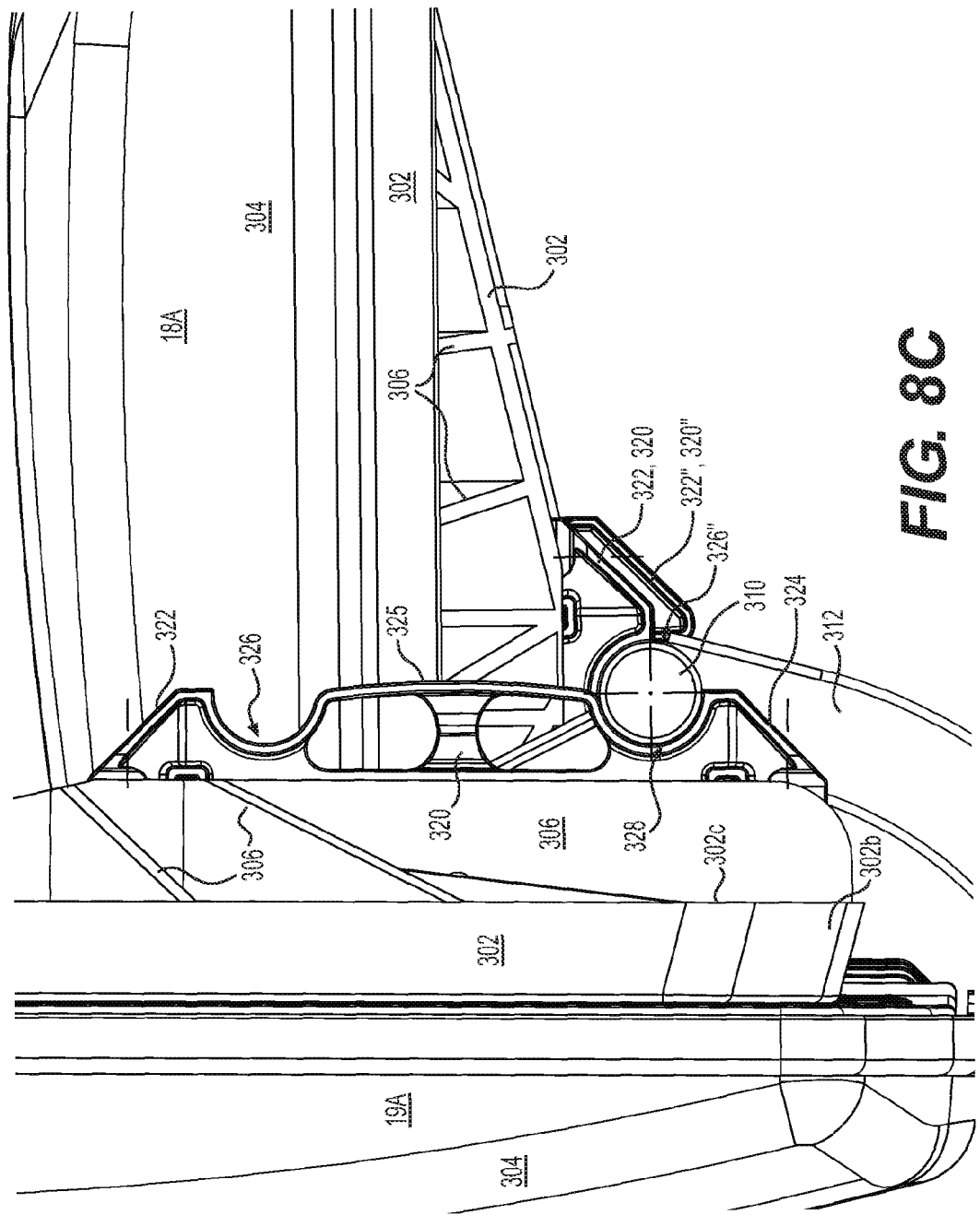

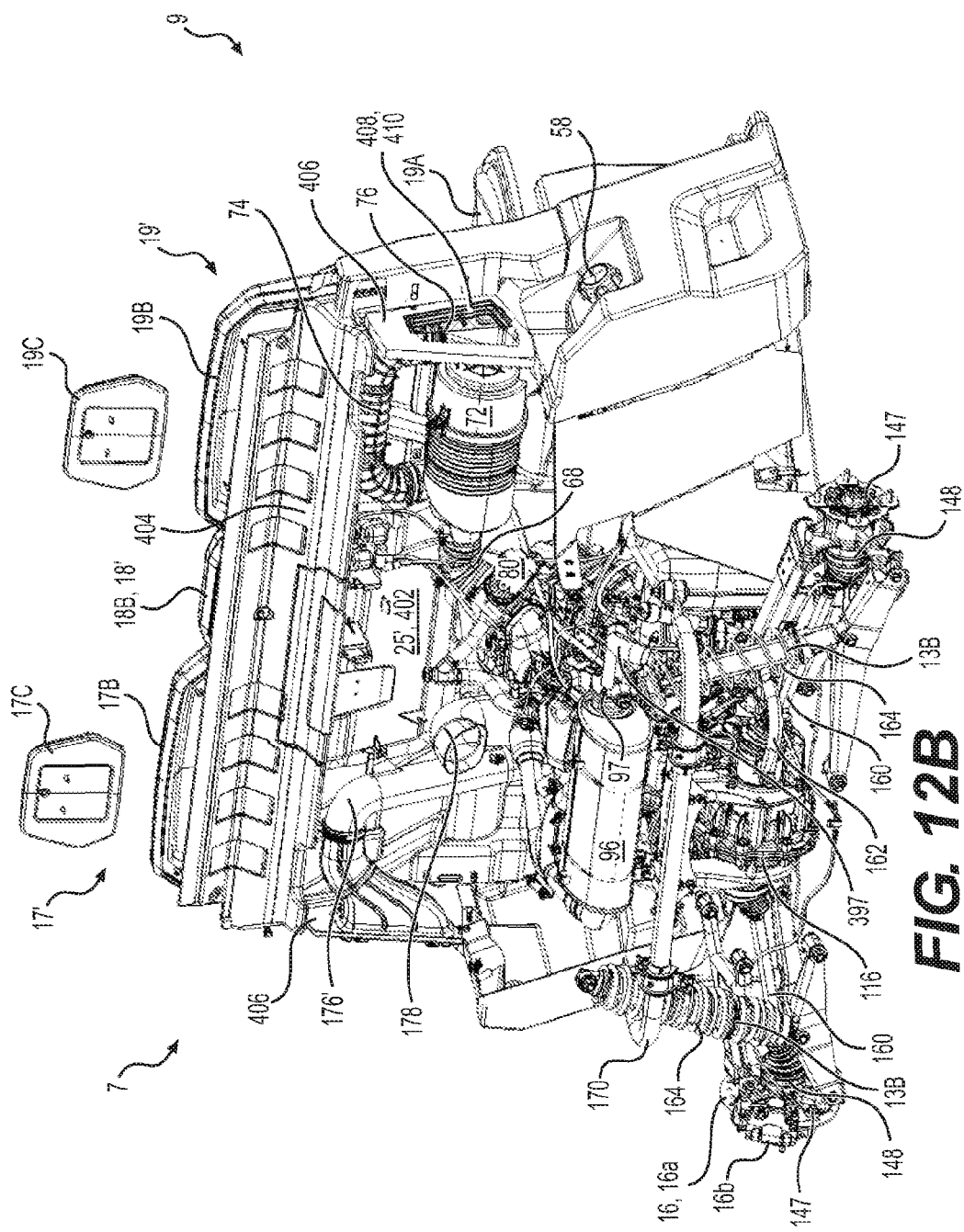

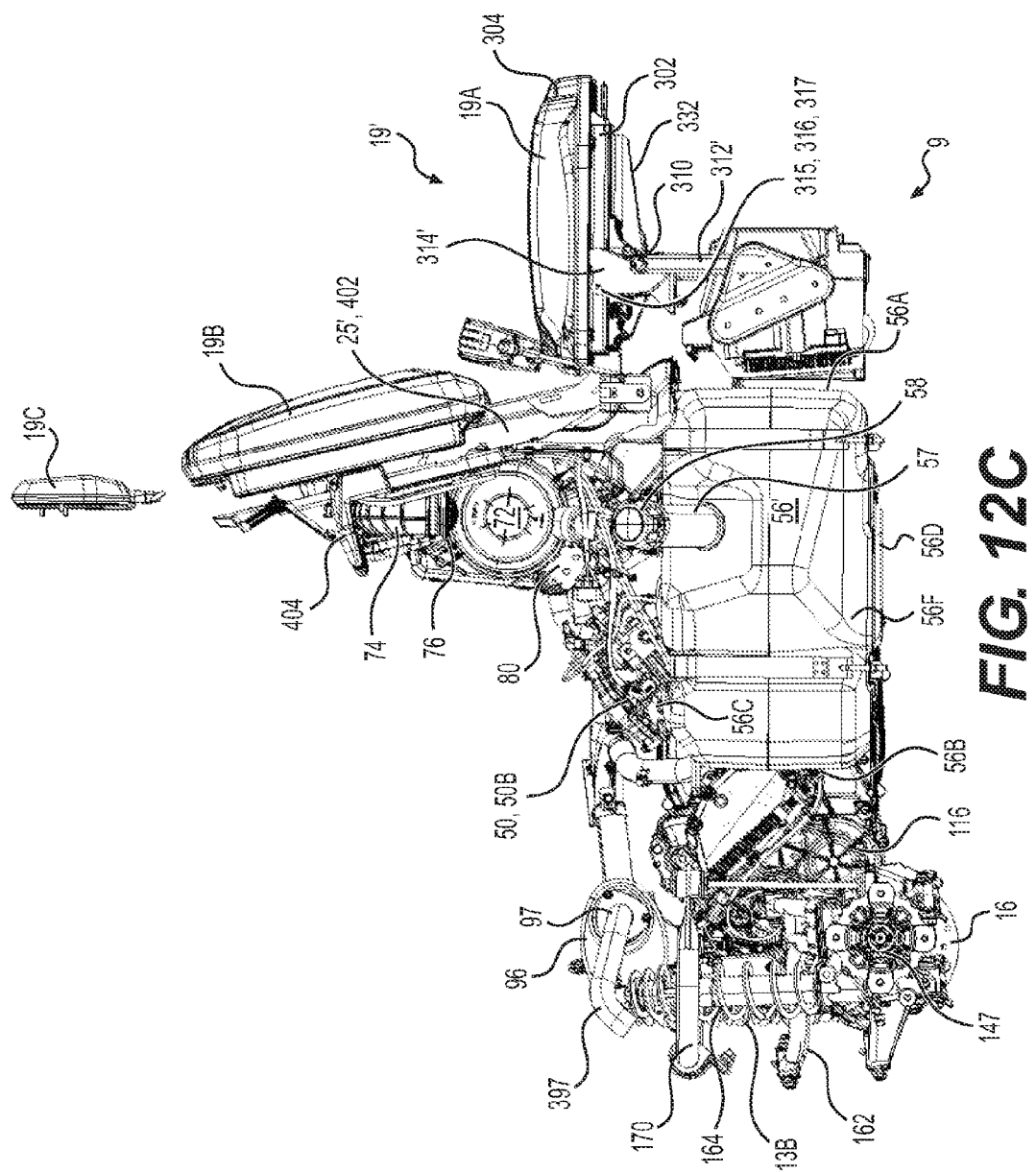

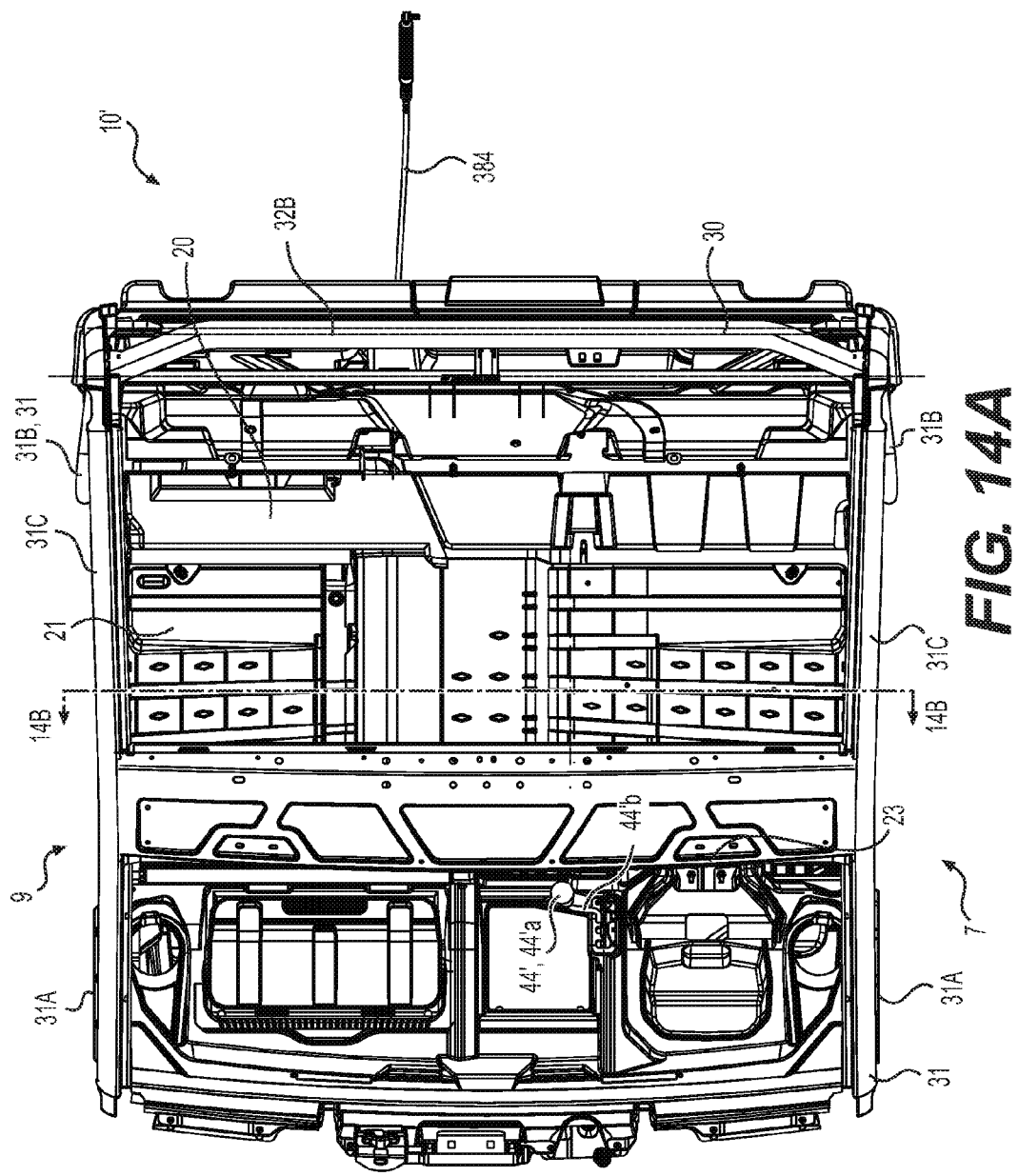

OFF-ROAD WHEELED SIDE-BY-SIDE VEHICLE

CROSS-REFERENCE

The present application claims priority to U.S. Provisional Patent Application No. 61/934,526, filed on Jan. 31, 2014, the entirety of which is incorporated herein by reference.

TECHNICAL FIELD

The present technology relates generally to off-road wheeled vehicles.

BACKGROUND

Side-by-side vehicles (SSVs) are off-road vehicles used for recreation and utility purposes. SSVs generally have an open cockpit area with side-by-side seating for a driver and a passenger. In a conventional SSV, a portion of the engine and/or a fuel tank is typically disposed partly in the cockpit area in order to reduce the overall size of the SSV as it is intended to be used in off-road situations where they may need to maneouvre around obstacles such as rocks, trees, and the like. This however also reduces the amount of space available in the cockpit area which could otherwise be used for additional passengers or for storage of cargo. Whether used for recreational or for utility purposes, it is however, desirable to increase the passenger carrying capacity as well as the cargo storage capacity of these vehicles without significantly adding to the size and/or weight of the vehicle.

SUMMARY

It is an object of the present to ameliorate at least some of the inconveniences present in the prior art.

According to one aspect of the present technology, there is provided a vehicle having a frame, a left front wheel, a right front wheel, a left rear wheel and a right rear wheel. A left front suspension operatively connects the left front wheel to the frame. A right front suspension operatively connects the right front wheel to the frame. A left rear suspension operatively connects the left rear wheel to the frame. A right rear suspension operatively connects the right rear wheel to the frame. At least one seat is connected to the frame and has a seat base. The at least one seat is disposed longitudinally rearward of the left and right front suspensions. An engine operatively is connected to at least one of the wheels. An air induction system, which includes an airbox, fluidly communicates with the engine and. A fuel tank fluidly communicates with the engine. The engine, the airbox and the fuel tank are disposed longitudinally forward of the left and right rear suspensions and longitudinally rearward of the seat base of the at least one seat.

In some implementations, each of the engine, the airbox and the fuel tank is entirely disposed longitudinally rearward of a seat base plane. The seat base plane is a laterally extending vertical plane containing a rearmost point of the seat base of the at least one seat.

In some implementations, each of the engine, the airbox and the fuel tank is entirely disposed vertically lower than a horizontal plane containing a highest point of the seat base of the at least one seat.

In some implementations, the fuel tank is disposed on one side of the engine.

In some implementations, the fuel tank is disposed on one side of a longitudinal centerplane of the vehicle.

In some implementations, the airbox is disposed on the one side of the longitudinal centerplane.

In some implementations, the longitudinal centerplane intersects the engine.

In some implementations, the engine has an output shaft defining an output shaft axis extending laterally. A vertical plane containing the output shaft axis intersects the fuel tank.

In some implementations, a rear portion of the fuel tank is disposed longitudinally rearward of the engine.

In some implementations, a front portion of the fuel tank is disposed longitudinally forward of the engine.

In some implementations, the airbox is disposed on one side of the engine.

In some implementations, the airbox is disposed above the fuel tank.

In some implementations, the airbox is disposed on a top surface of the fuel tank.

In some implementations, the airbox is generally cylindrical, and a cylindrical axis of the airbox extends horizontally and laterally.

In some implementations, the airbox has an outlet defined on a lateral end surface of the airbox.

In some implementations, the airbox has an inlet defined on near surface of the airbox.

In some implementations, the air induction system also includes an intake conduit fluidly communicating with an inlet of the airbox. The intake conduit has an inlet to receive air from the atmosphere. The inlet is disposed longitudinally rearward of the seat base of the at least one seat.

In some implementations, the at least one seat includes a left seat and a right seat, each of the left and right seats including a seat base and a seat back, the seat base of each of the left and right seats being longitudinally disposed entirely forward of the engine, the fuel tank, and the airbox.

In some implementations, the seat base plane contains respective rearmost points of the seat bases of the left and right seats.

In some implementations, at least a portion of the fuel tank is laterally aligned with at least a portion of the seat base of one of the right and left seats.

In some implementations, a front portion of the fuel tank is disposed below a portion of the seat back of the one of the right and left seats.

In some implementations, the at least one seat also includes a middle seat disposed laterally between the left and right seats. The middle seat includes a seat base and a seat back. The seat base of the middle seat is longitudinally disposed entirely forward of the engine, the fuel tank, and the airbox.

In some implementations, the vehicle includes an exhaust system including a muffler fluidly communicating with the engine to expel exhaust gases from the engine. The muffler is laterally disposed between the left rear wheel and the right rear wheel, with the vehicle being steered in a straight ahead direction. At least a portion of the muffler extends vertically above the rear wheels, with the rear wheels being disposed on level ground, and in the absence of a load being carried by the vehicle. At least a portion of the muffler is disposed longitudinally rearward of a vertical plane passing through a front edge of the rear wheels and forward of a vertical plane passing through a rear edge of the rear wheels, with the vehicle being steered in a straight ahead direction.

In some implementations, the muffler includes an outlet, the outlet being disposed at least in part facing a lateral side of the vehicle.

In some implementations, each of the left and right rear suspensions includes a shock absorber connected to the frame and disposed longitudinally rearward of the engine, the fuel tank and the airbox.

In some implementations, the vehicle includes a continuously variable transmission (CVT) operatively connecting the engine to at least one of the wheels, the CVT being disposed on a left side of the engine.

In some implementations, the CVT is disposed on one side of a longitudinal centerplane of the vehicle, and the fuel tank and airbox are each disposed on another side of the longitudinal centerplane.

In some implementations, the CVT includes a driving pulley defining a driving pulley axis extending laterally, and a driven pulley defining a driven pulley axis extending laterally, the driven pulley axis being disposed longitudinally rearward of the driving pulley axis. A front portion of the fuel tank is disposed longitudinally forward of the driving pulley axis, and a rear portion of the fuel tank is disposed longitudinally rearward of the driven pulley axis.

In some implementations, a transmission operatively connecting the CVT to at least one of the wheels. The transmission is disposed rearward of the engine.

In some implementations, a rear differential is operatively connected to the left and right rear wheels and defines a rear differential axis. The engine, the fuel tank and the airbox are disposed longitudinally forward of the rear differential axis.

In some implementations, the vehicle has a cockpit area defined by the frame. The at least one seat is disposed in the cockpit area. A roll cage is connected to the frame and disposed at least in part over the cockpit area.

Also, terms related to spatial orientation such as forward, rearward, front, rear, upper, lower, left, and right, are as they would normally be understood by a driver of the vehicle sitting thereon in a normal driving position with the vehicle being upright and steered in a straight ahead direction.

Implementations of the present technology have at least one of the above-mentioned object and/or aspects, but do not necessarily have all of them.

Additional and/or alternative features, aspects, and advantages of implementations of the present technology will become apparent from the following description, the accompanying drawings, and the appended claims.

BRIEF DESCRIPTION OF THE DRAWINGS

Further features and advantages of the present technology will become apparent from the following detailed description, taken in combination with the appended drawings, in which:

FIG. 8B is a close-up, right side elevation view of the left, middle and right seats of the vehicle of FIG. 1 with the left and middle seats disposed in a seating position and the right seat disposed in an intermediate position slightly prior to being placed in a storage position;

FIG. 8C is a close-up, right side elevation view of the of the left, middle and right seats of FIG. 7A;

Figure 1:
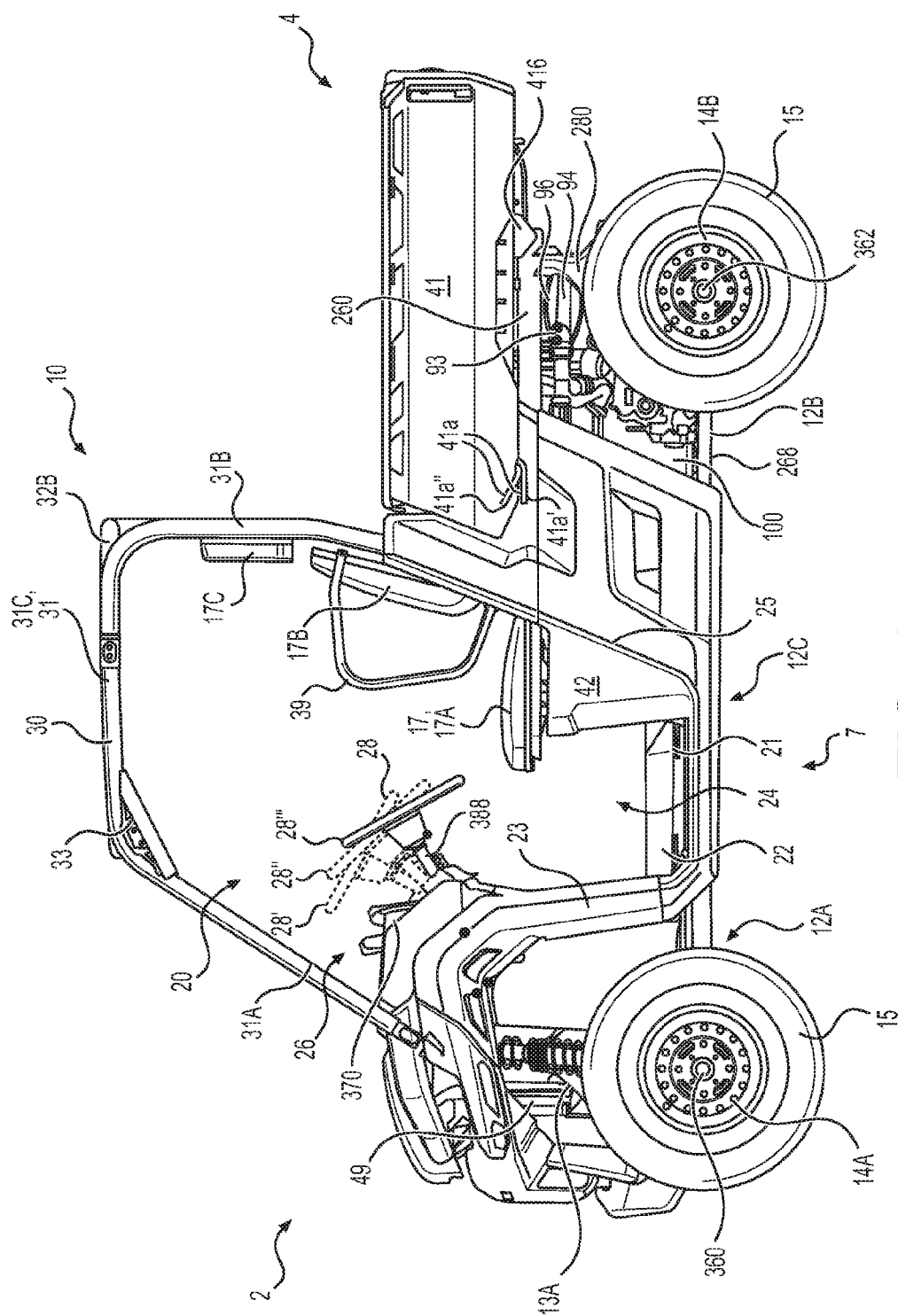
FIG. 1 is a left side elevation view of a side-by-side vehicle (SSV)
Figure 9A:
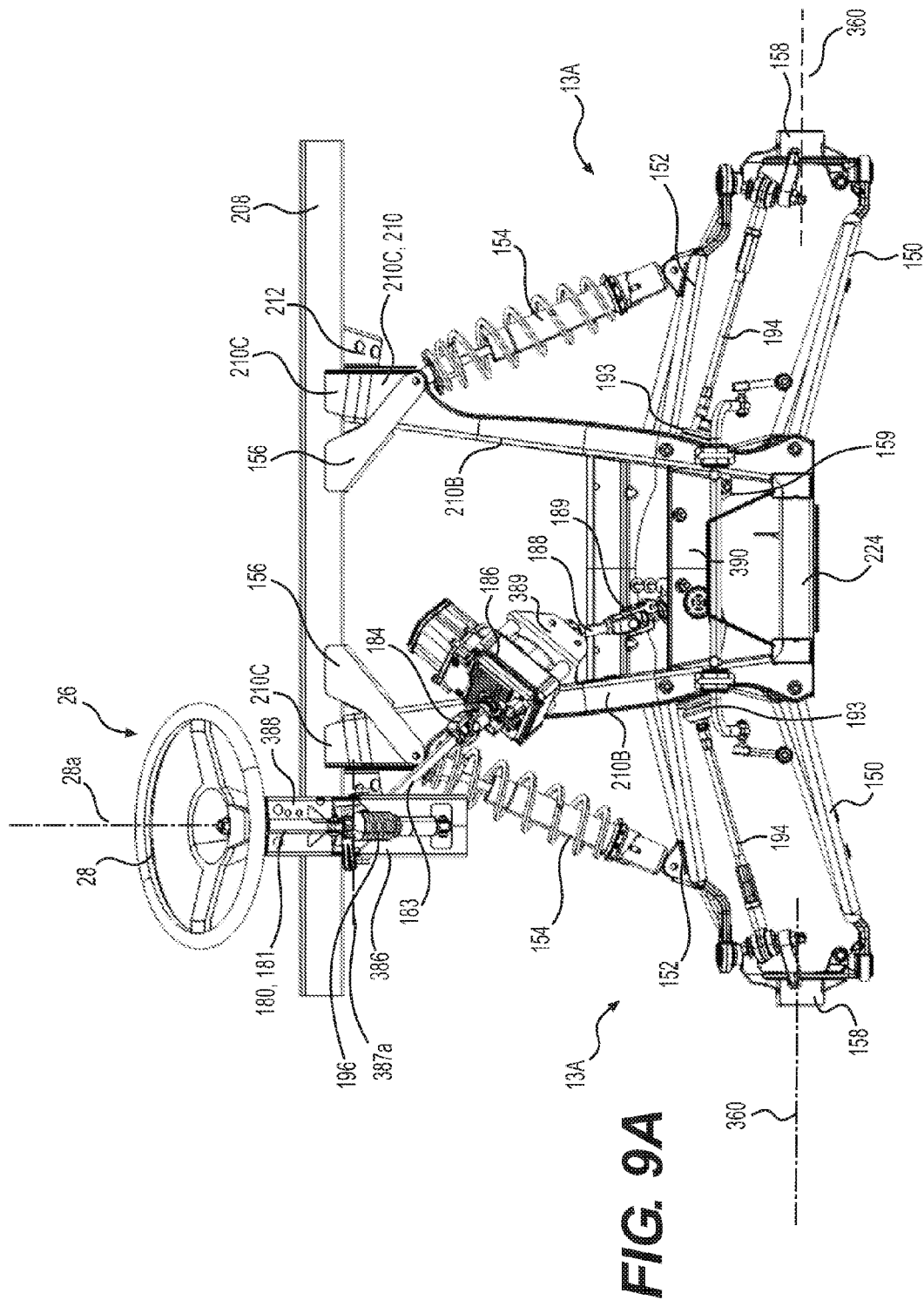
FIG. 9A is a rear elevation view of a portion of the front portion of the frame, the front suspension and the steering assembly of the vehicle of FIG. 1.
Figure 9B:
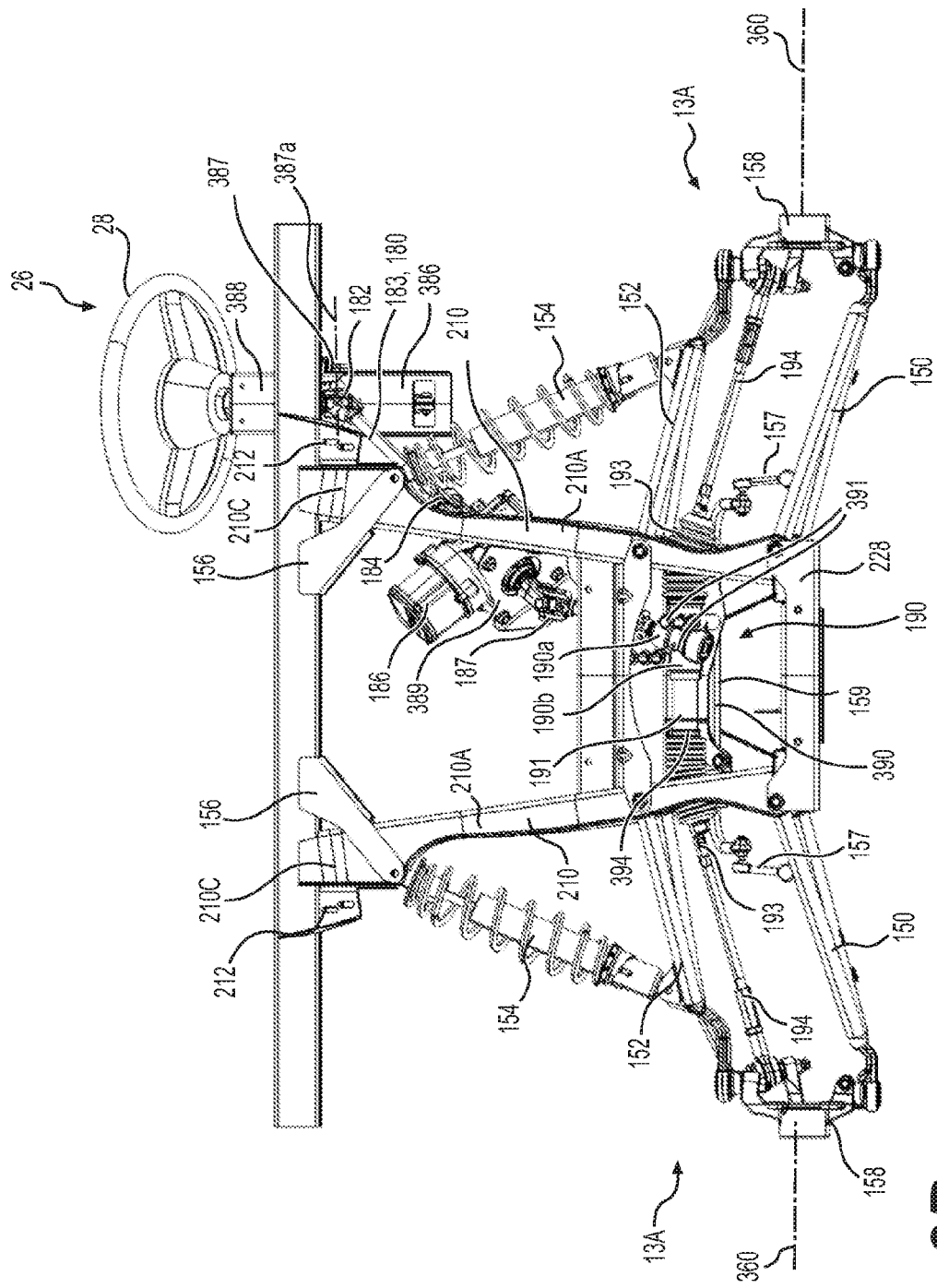
FIG. 9B is a front elevation view of the elements of FIG. 9A.
Figure 9C:
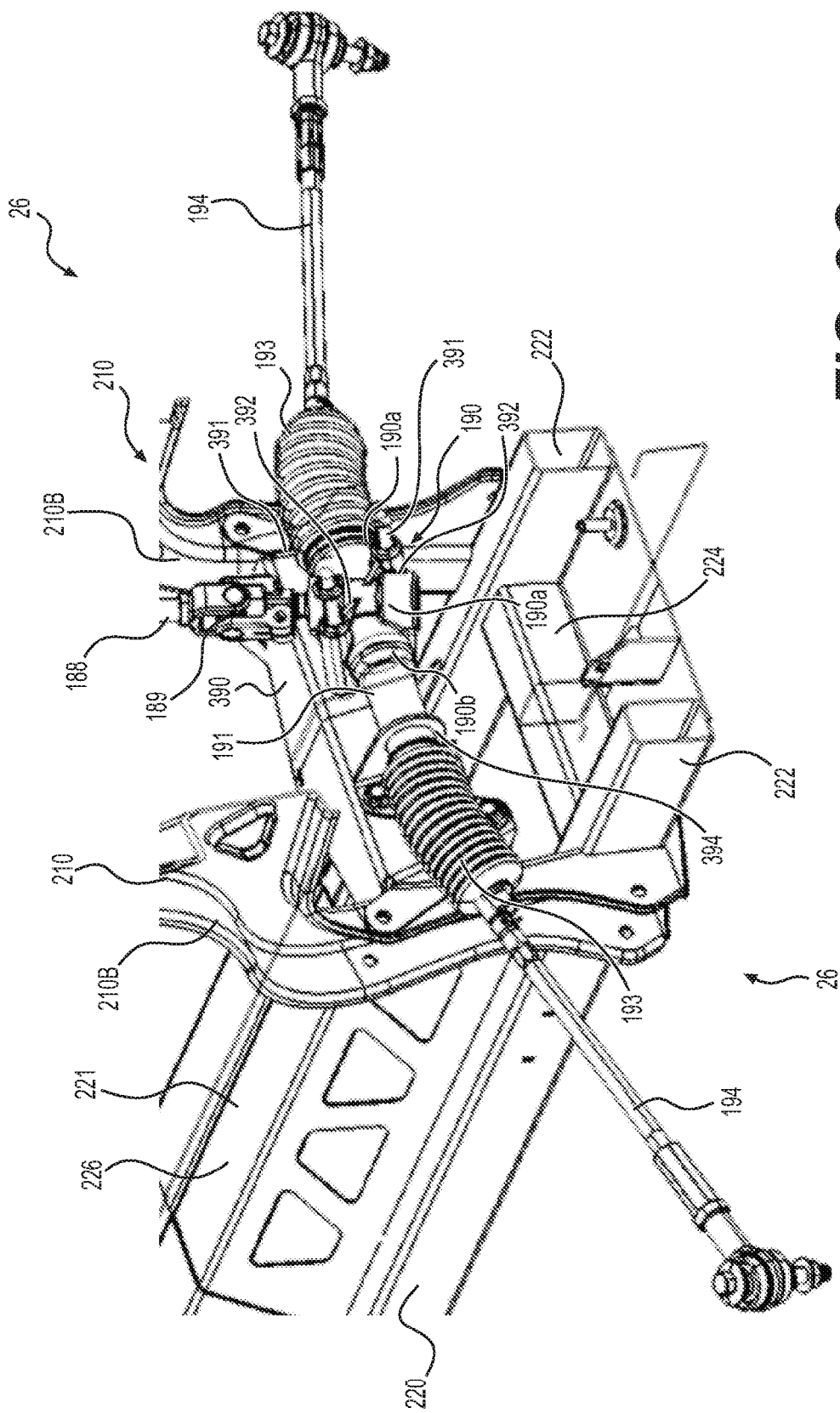
FIG. 9C is a close-up, perspective view, taken from a front, right side, of the steering and a portion of the front frame portion of the vehicle of FIG. 1.
Figure 9D:
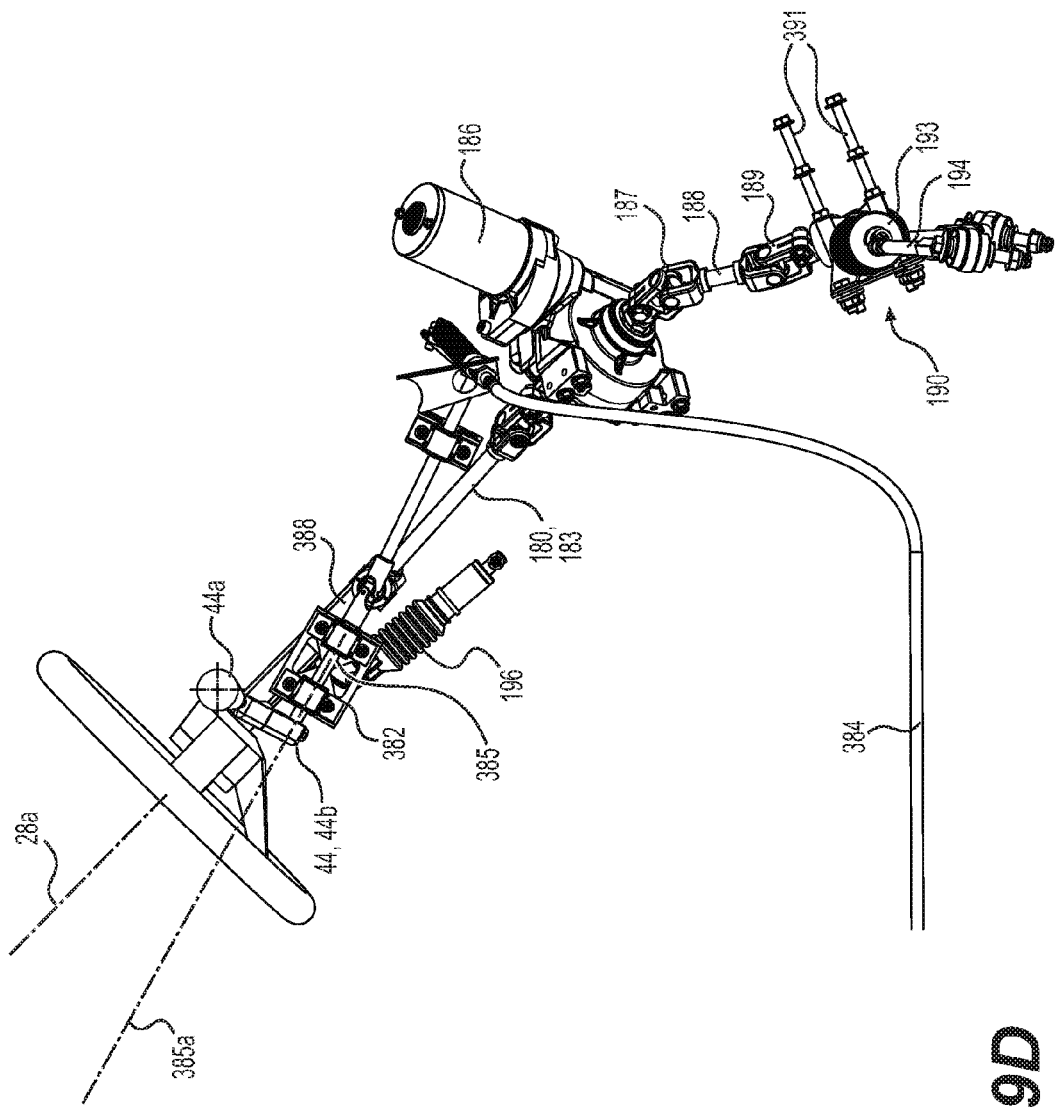
FIG. 9D is a right side elevation view of a portion of the gear selector and a portion of the steering assembly including the steering wheel of the vehicle of FIG. 1.
Figure 10A:
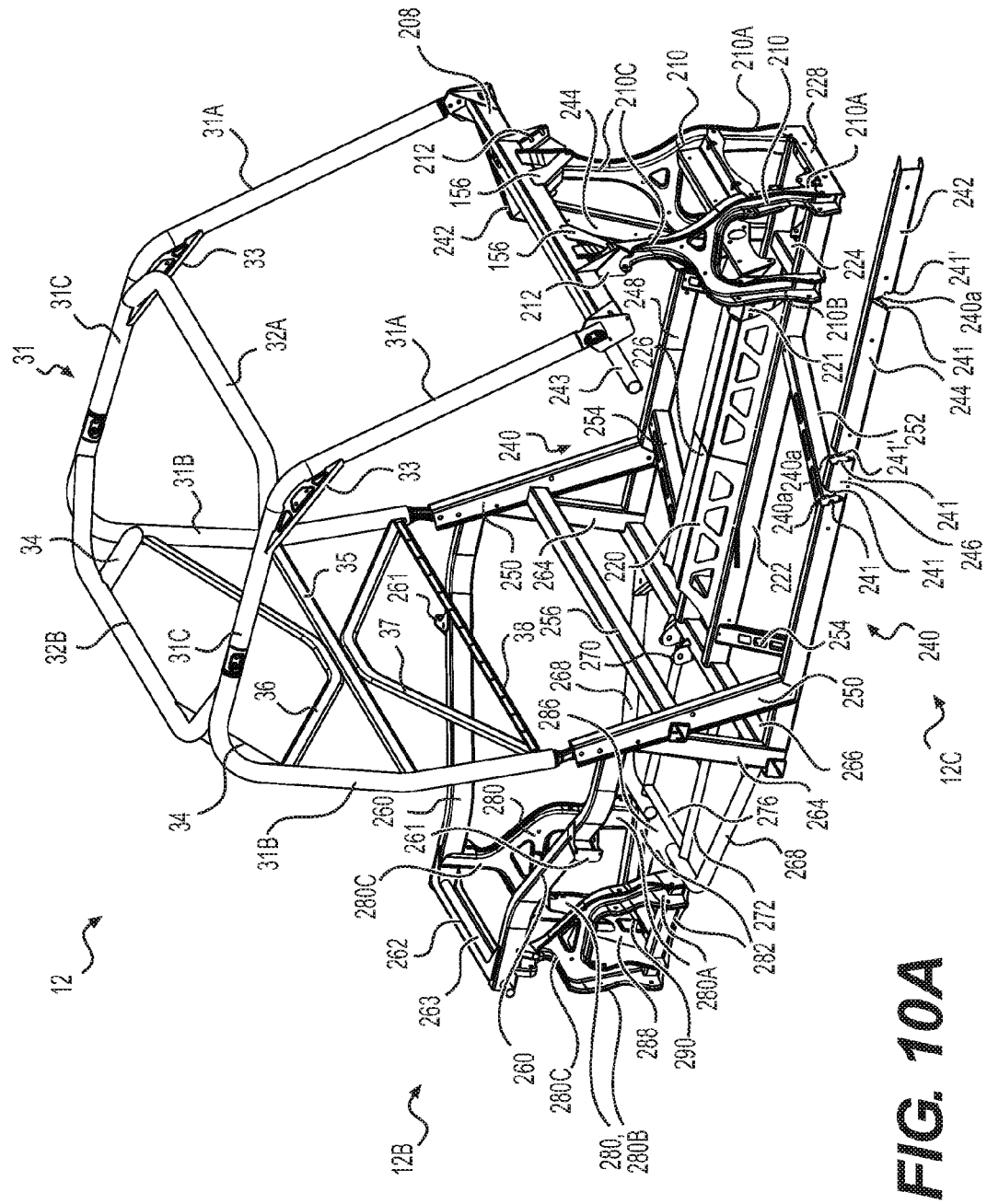
Figure 10B:
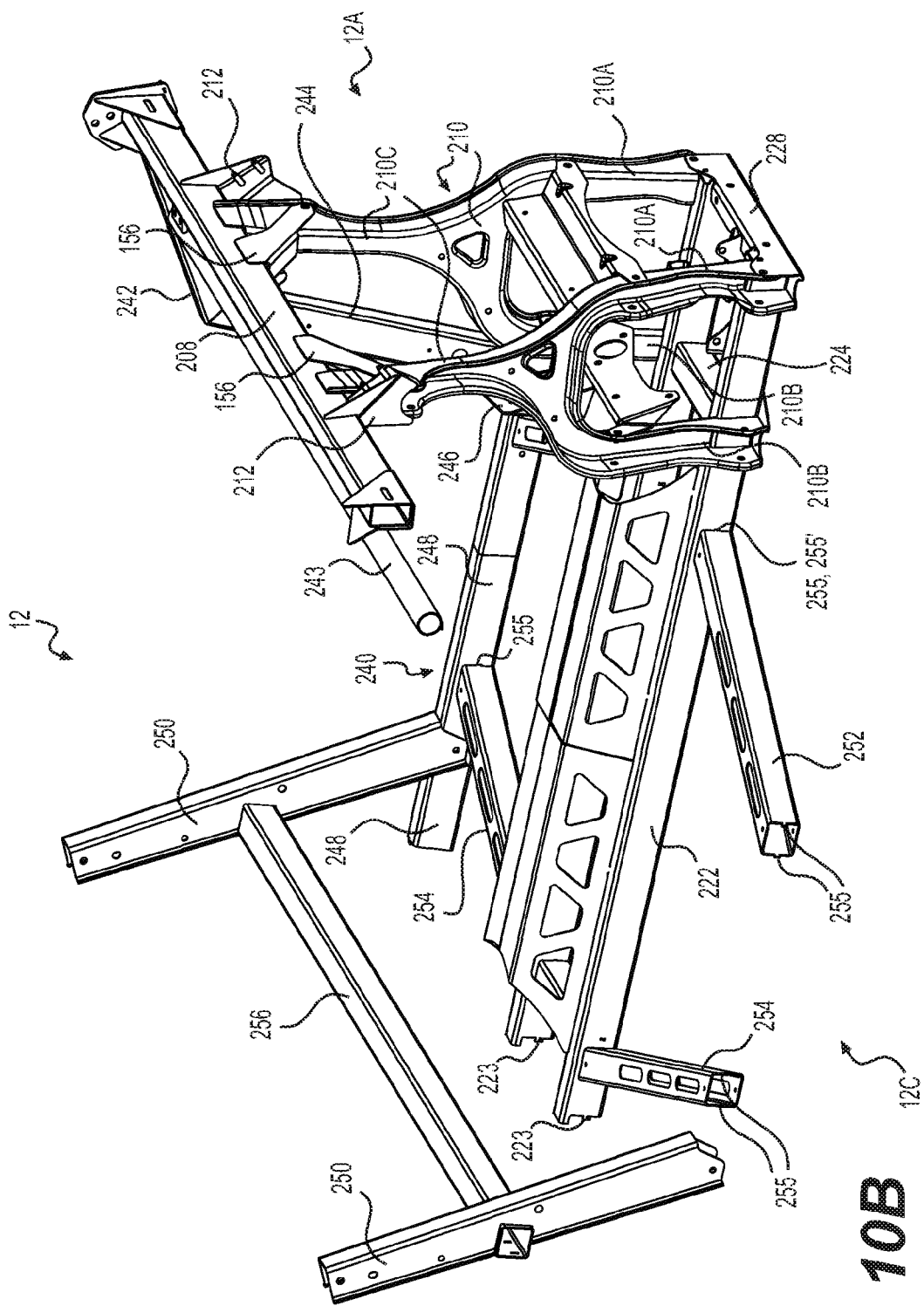
Figure 10C:
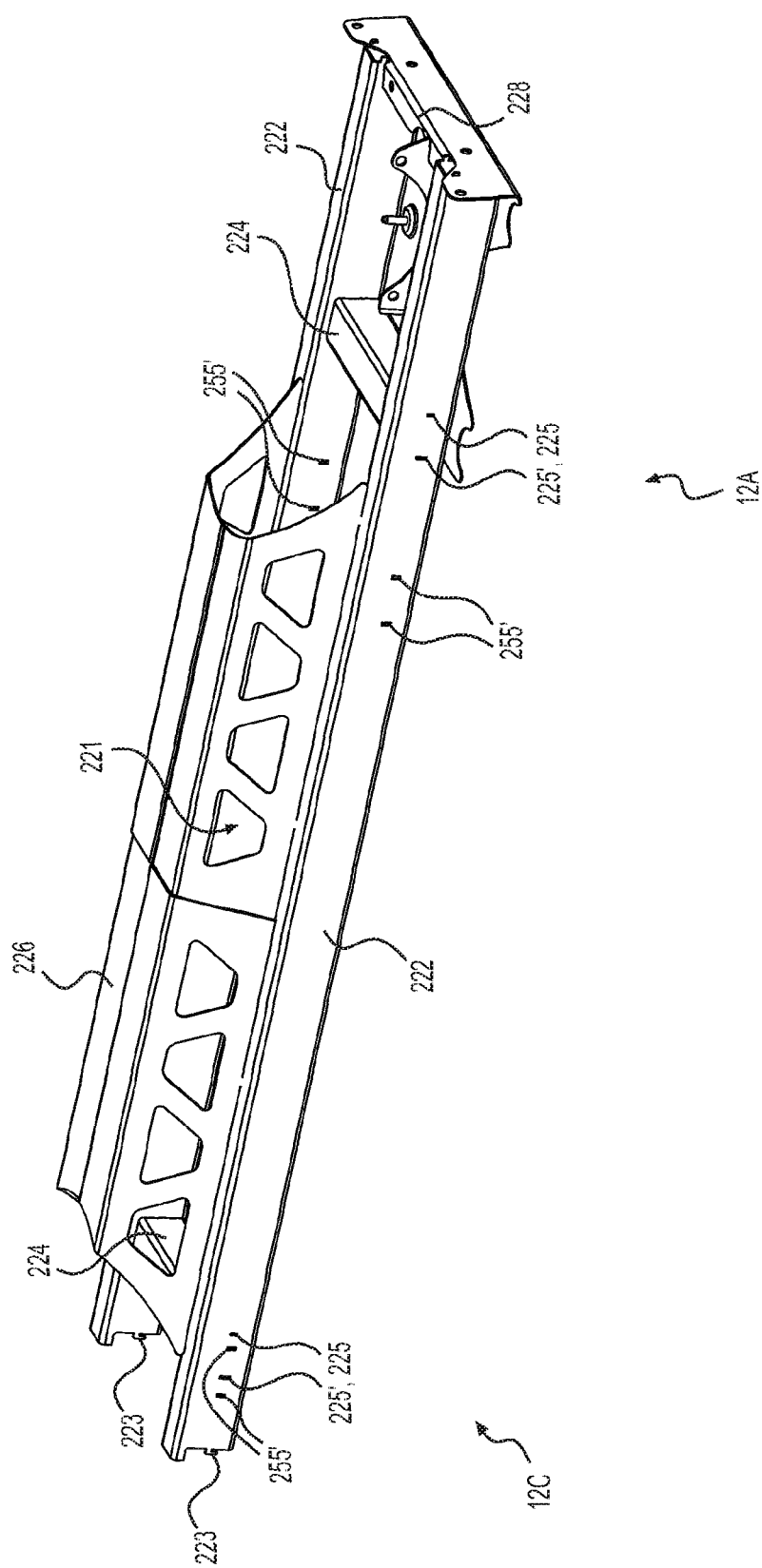
Figure 10D:
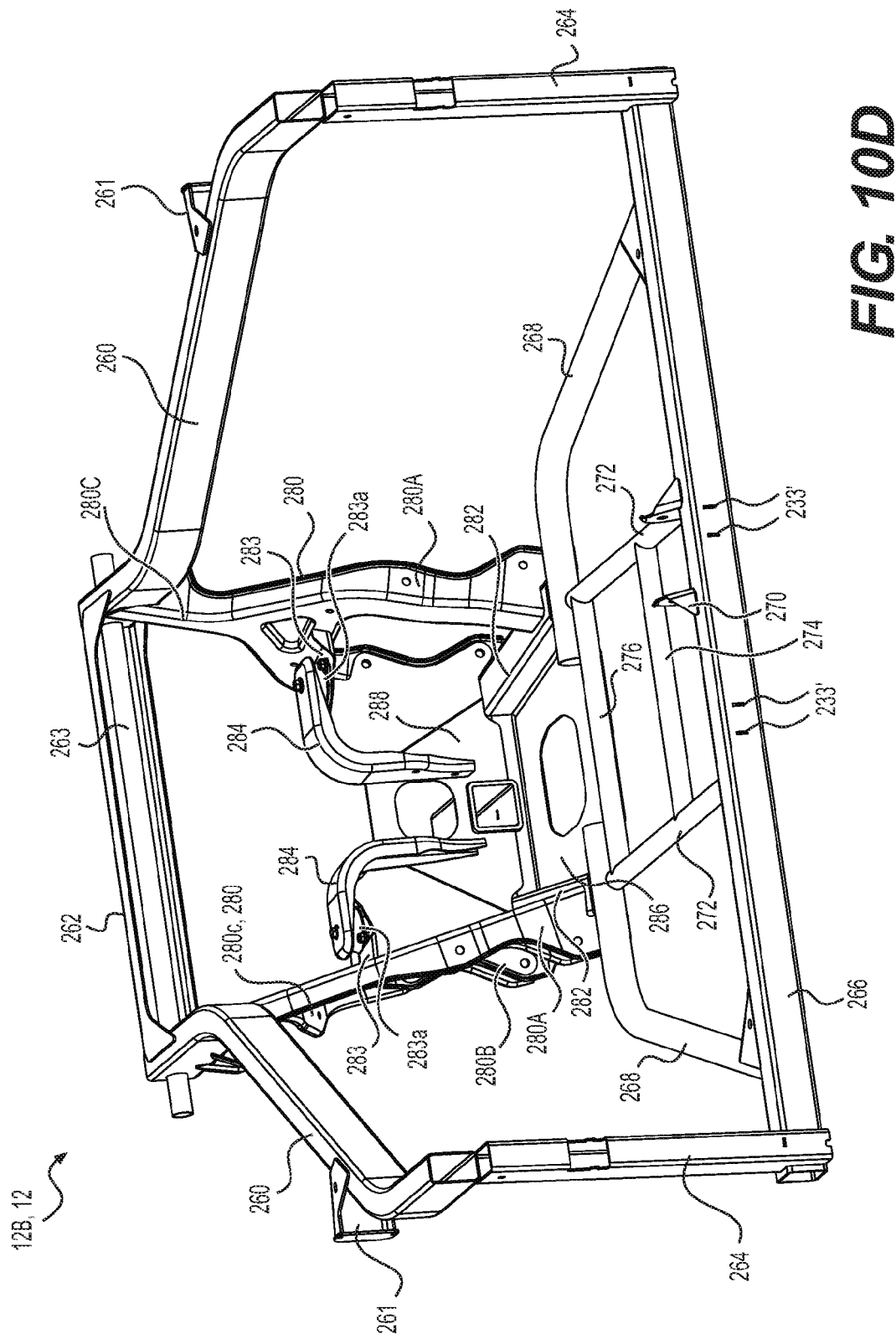
Figure 10E:
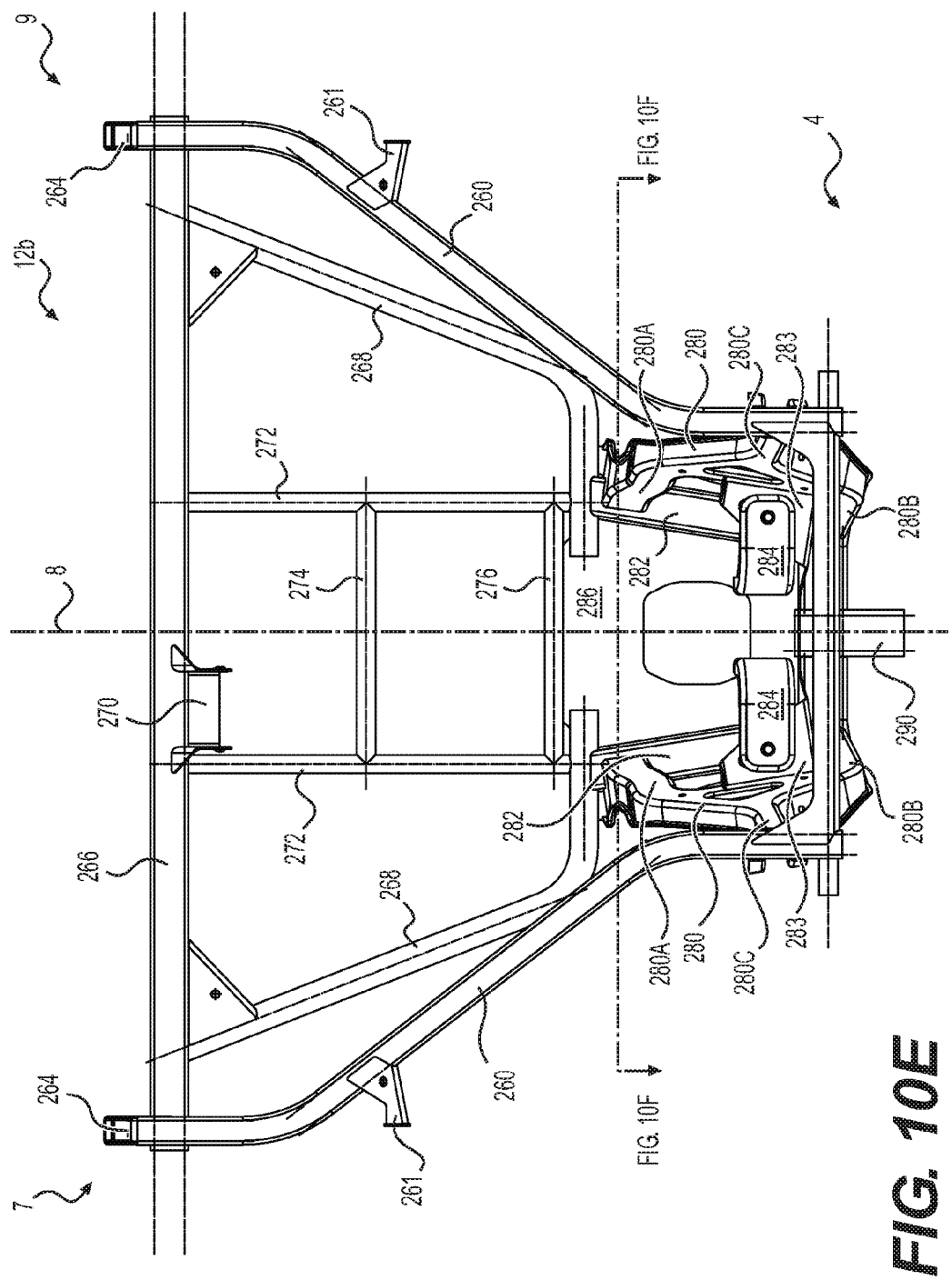
Figure 10F:
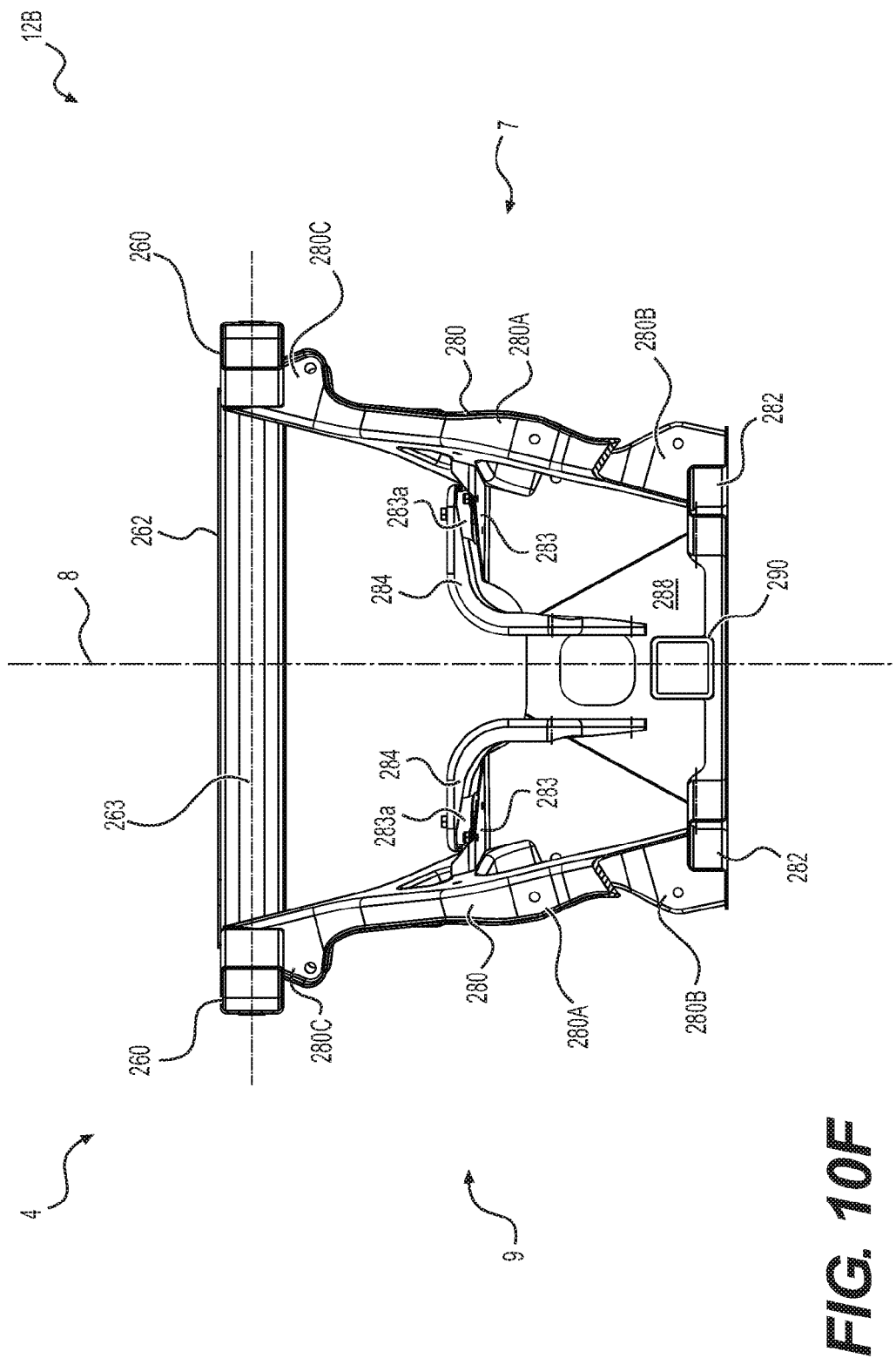
Figure 11A:
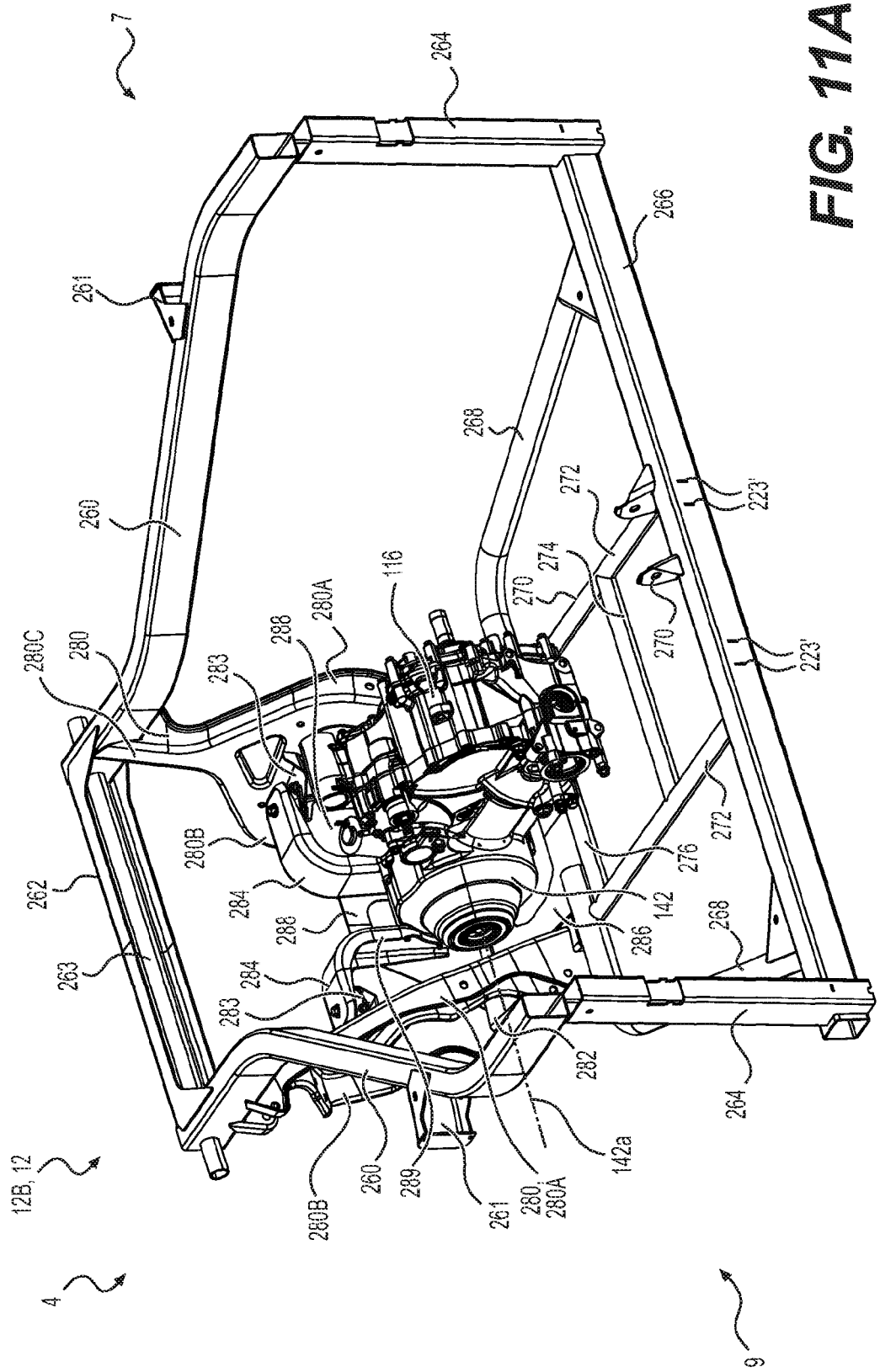
Figure 11B:
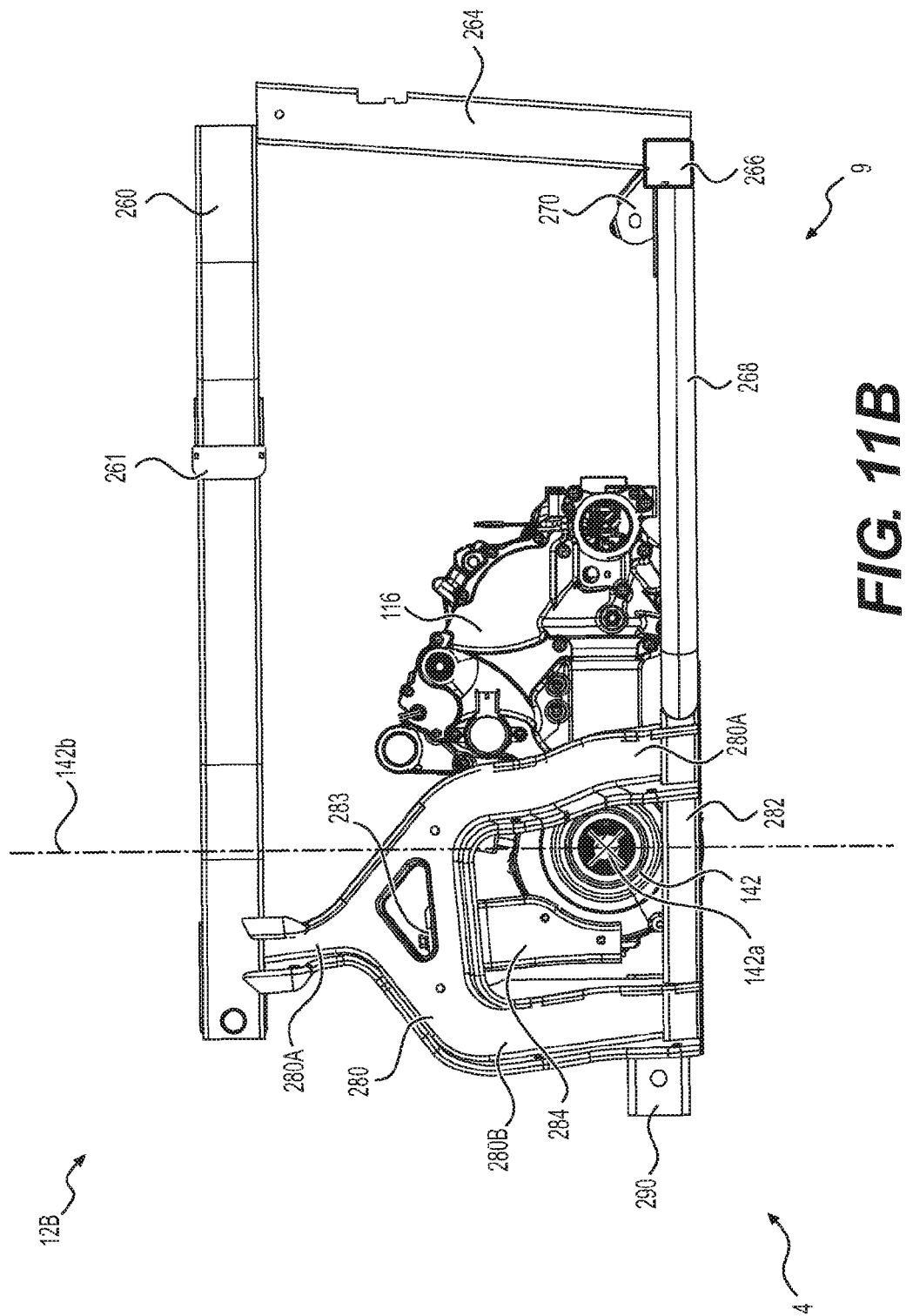
Figure 12A:
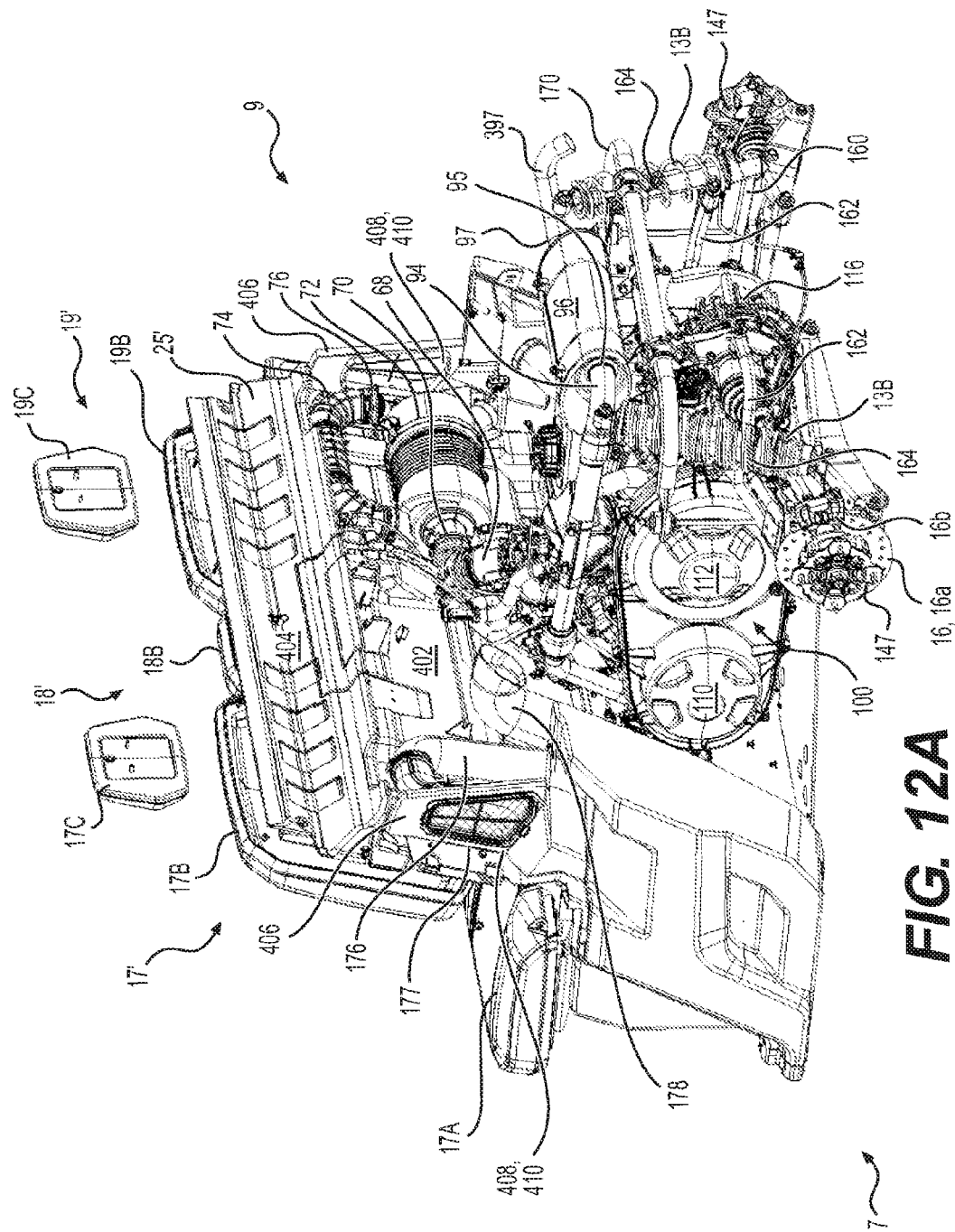
Figure 12D:
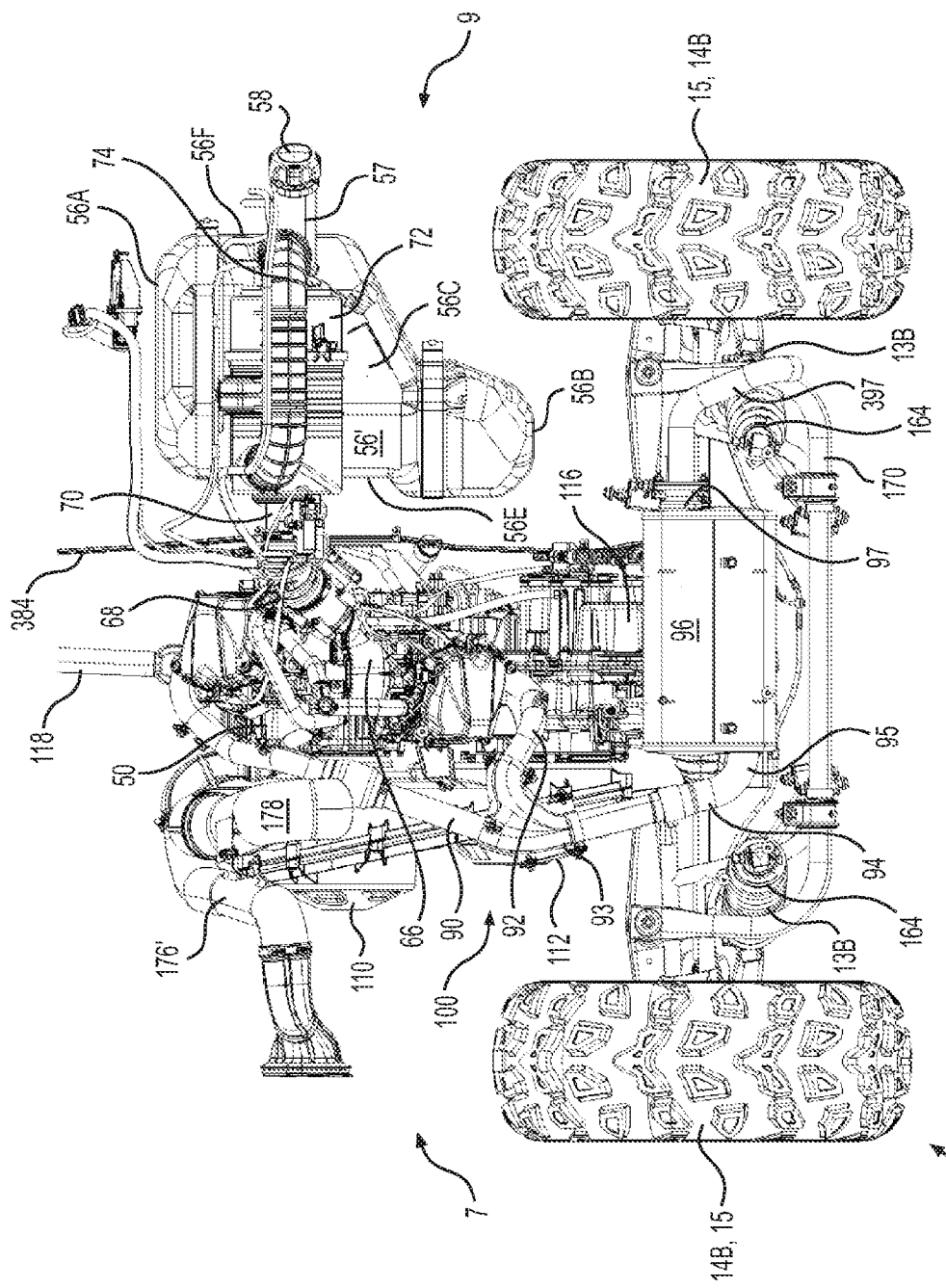
Figure 13A:
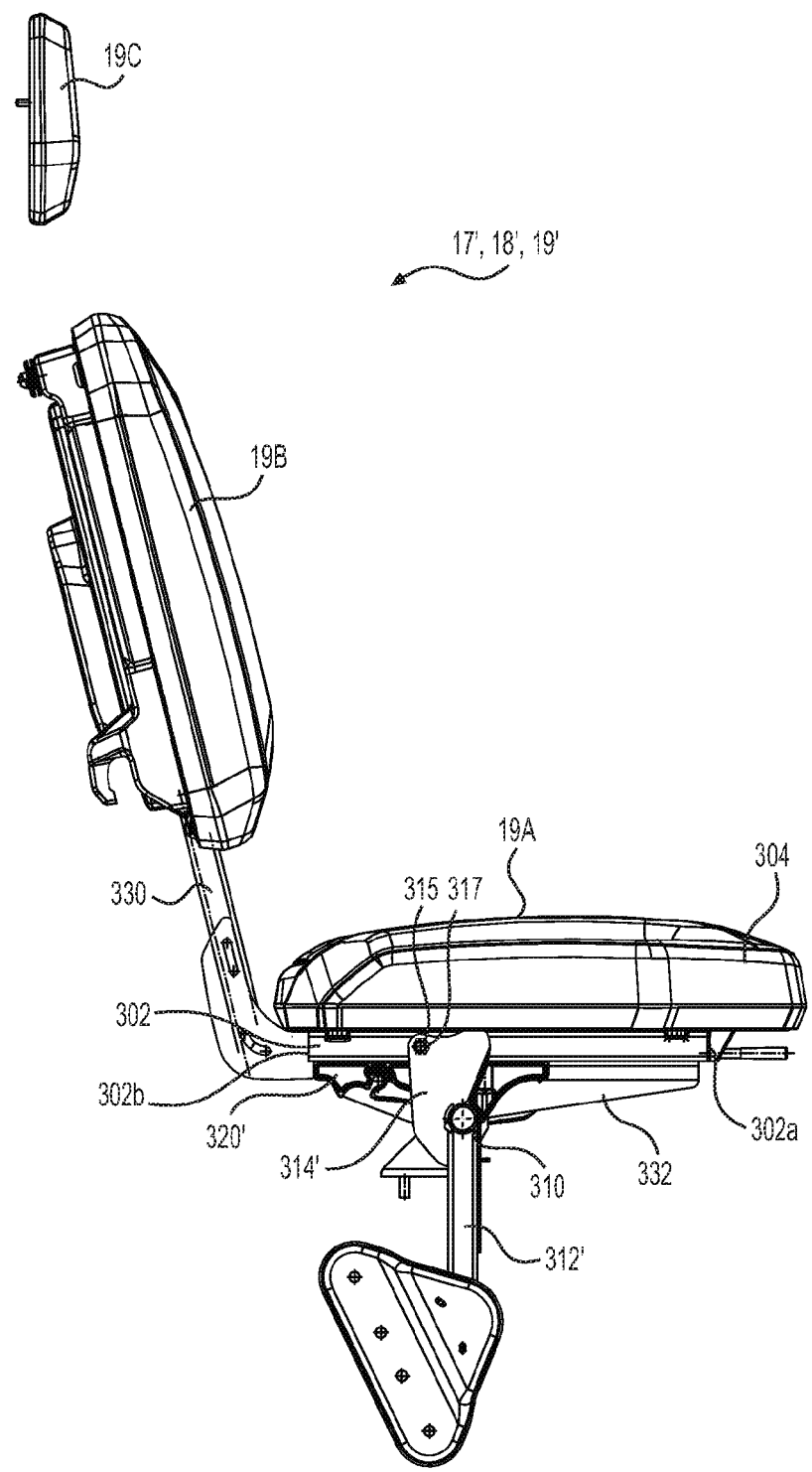
Figure 13B:
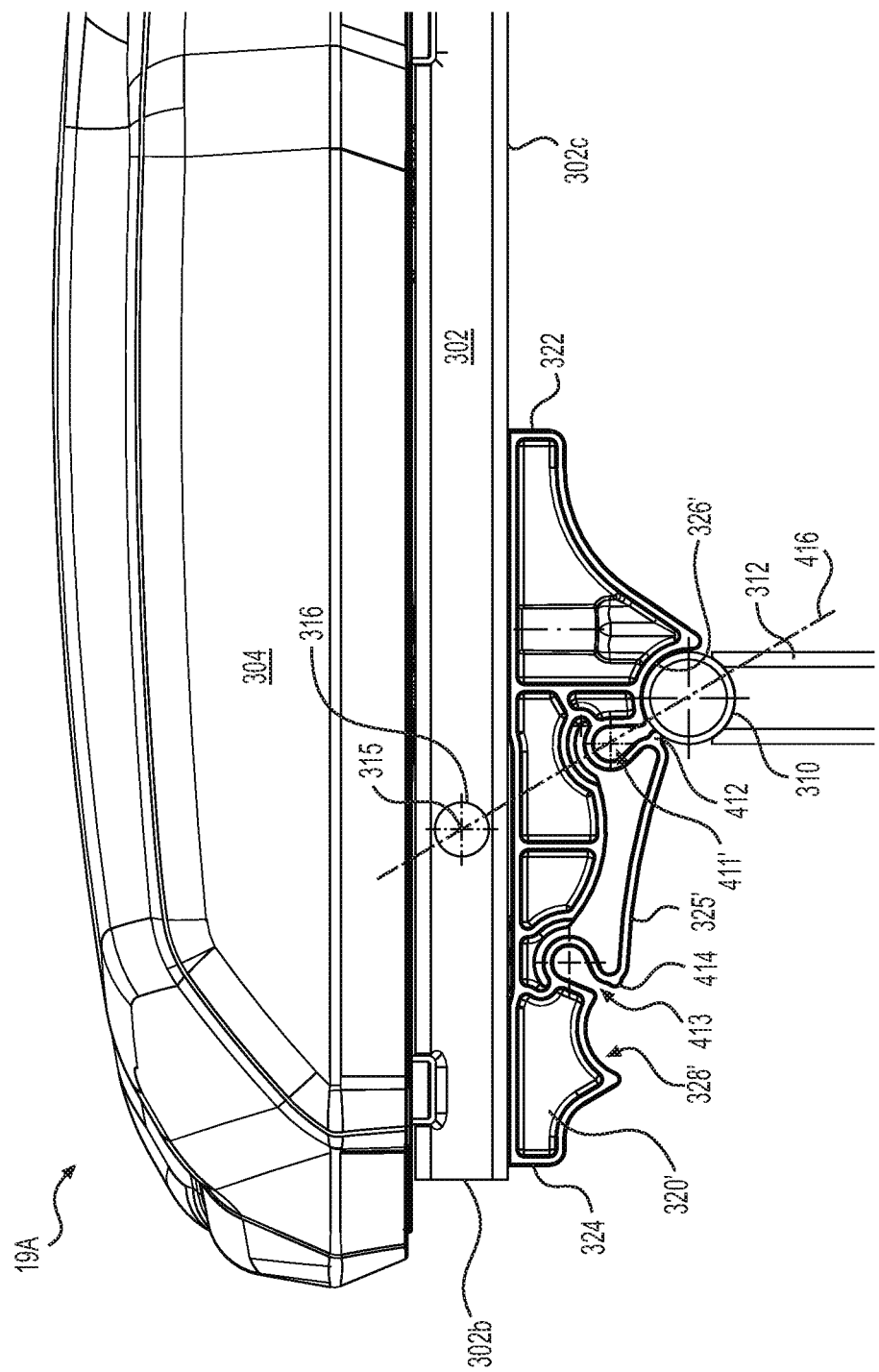
Figure 13C:
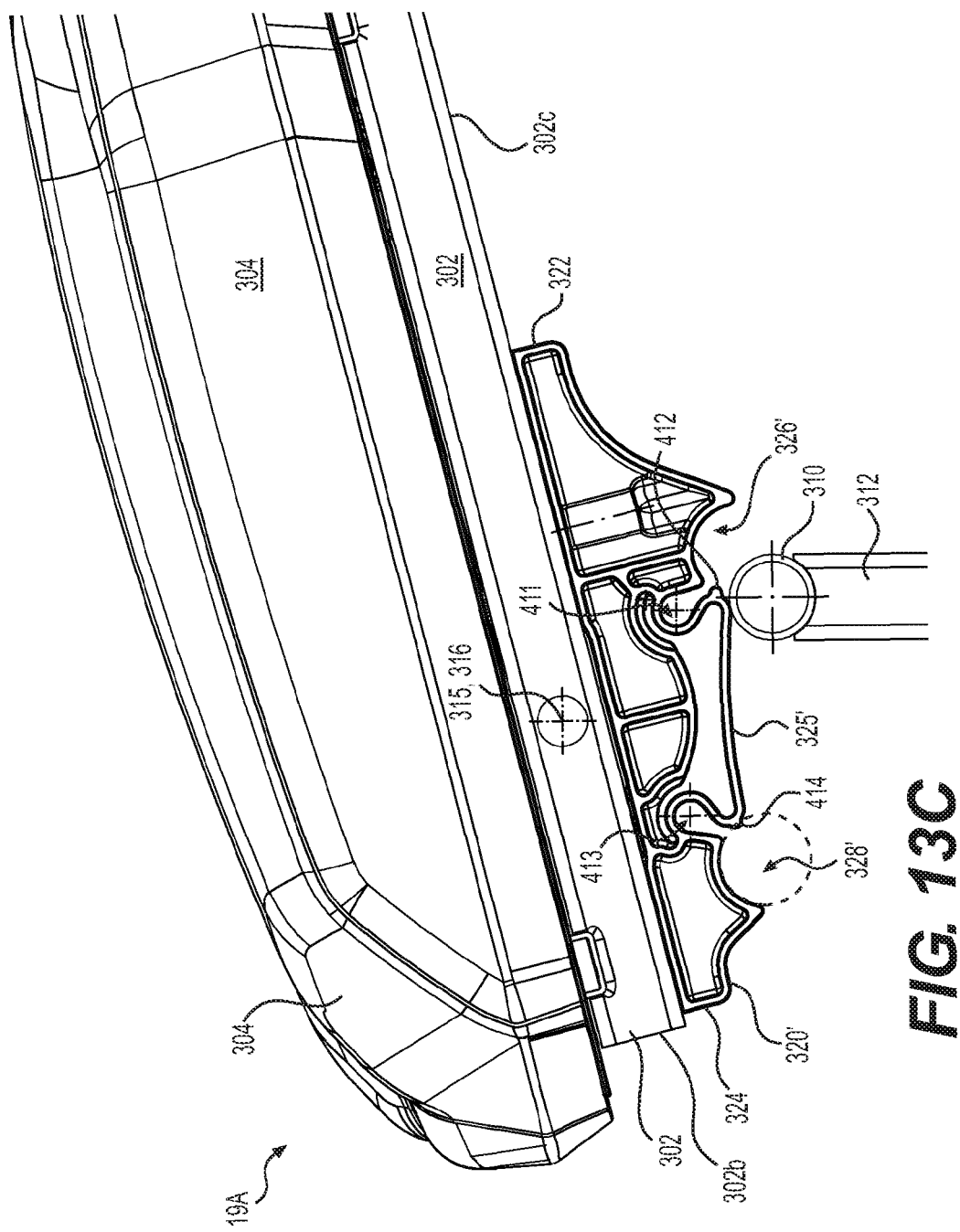
Figure 13D:
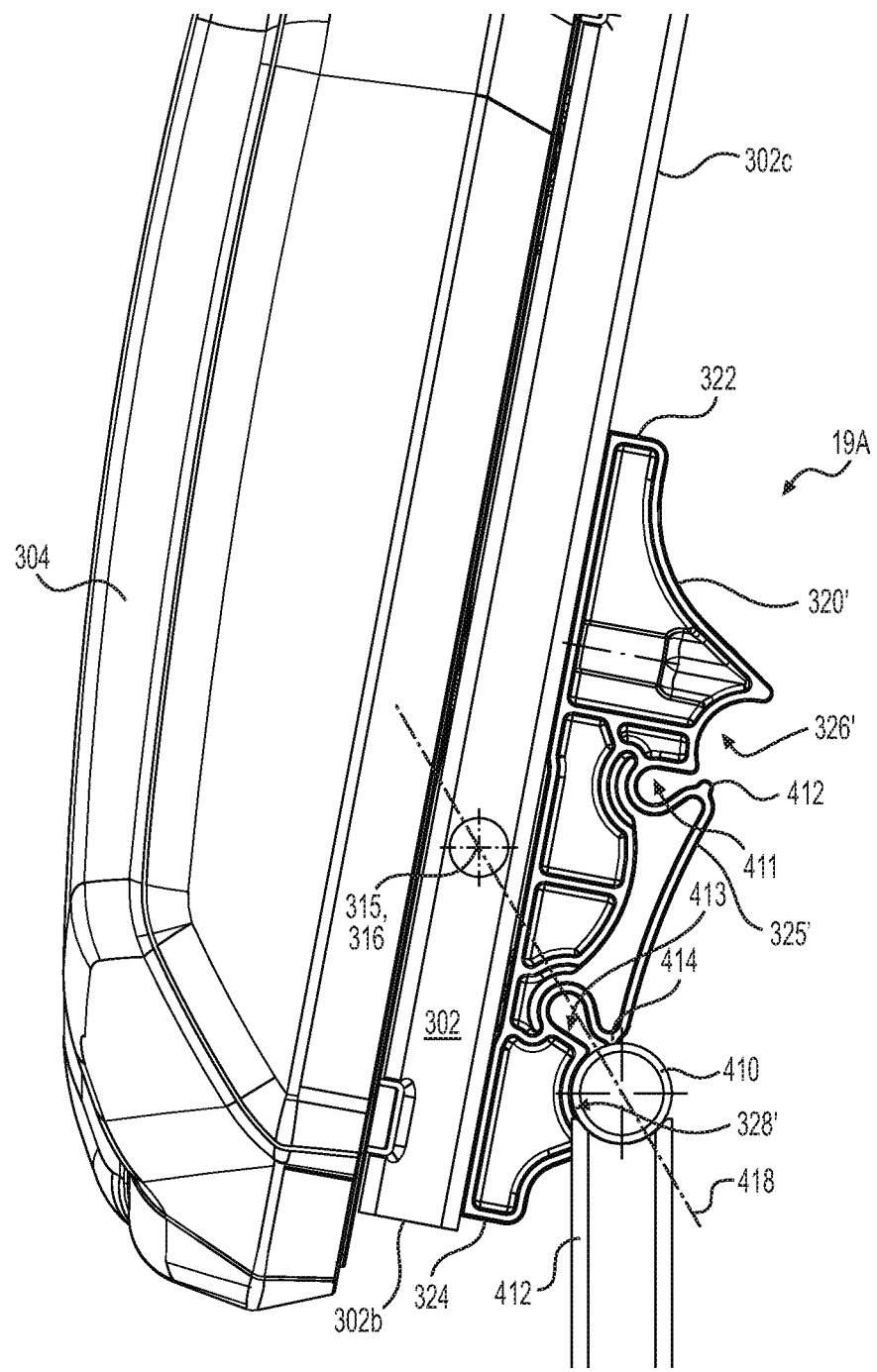
Figure 13E:
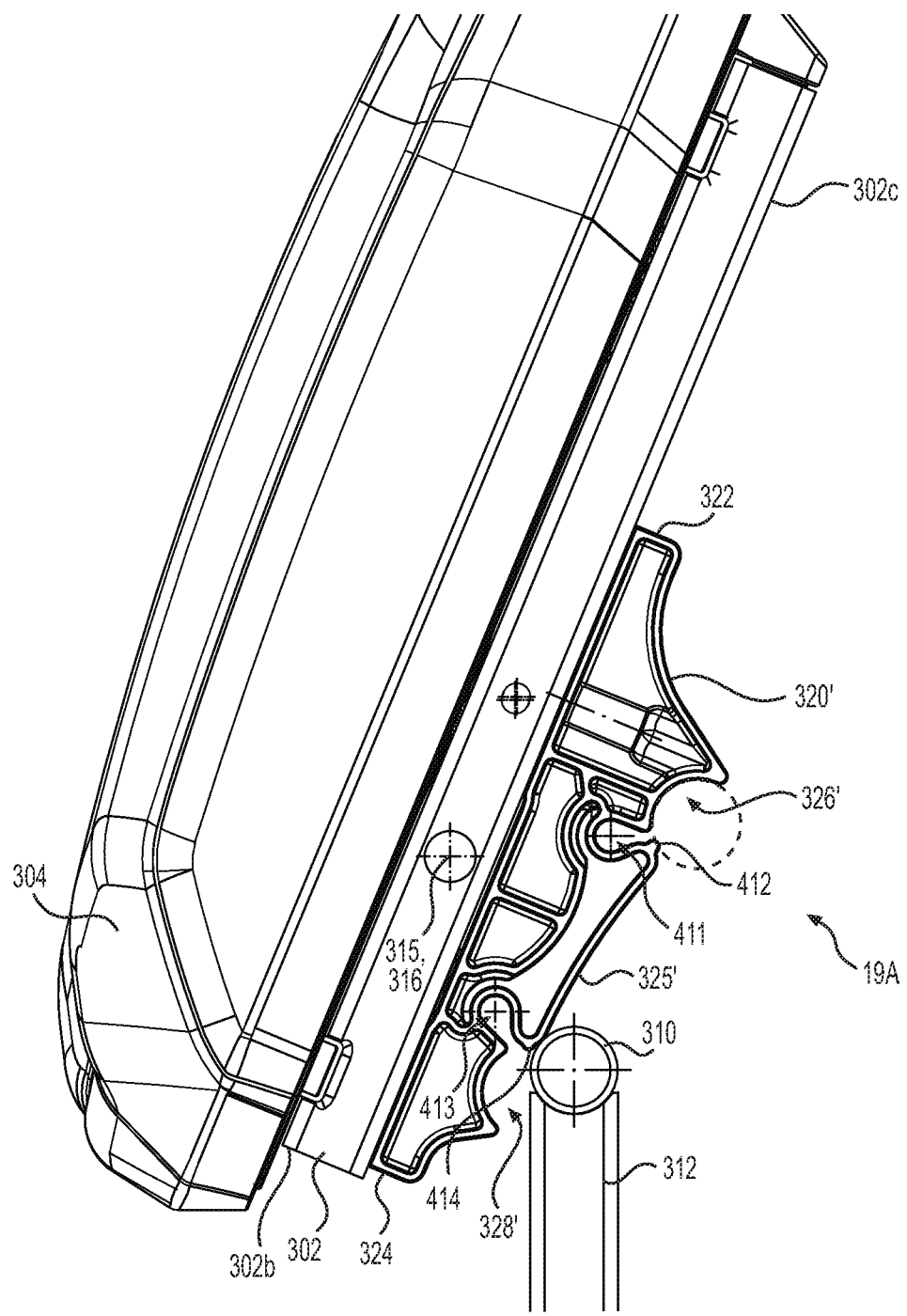
Figure 14B:
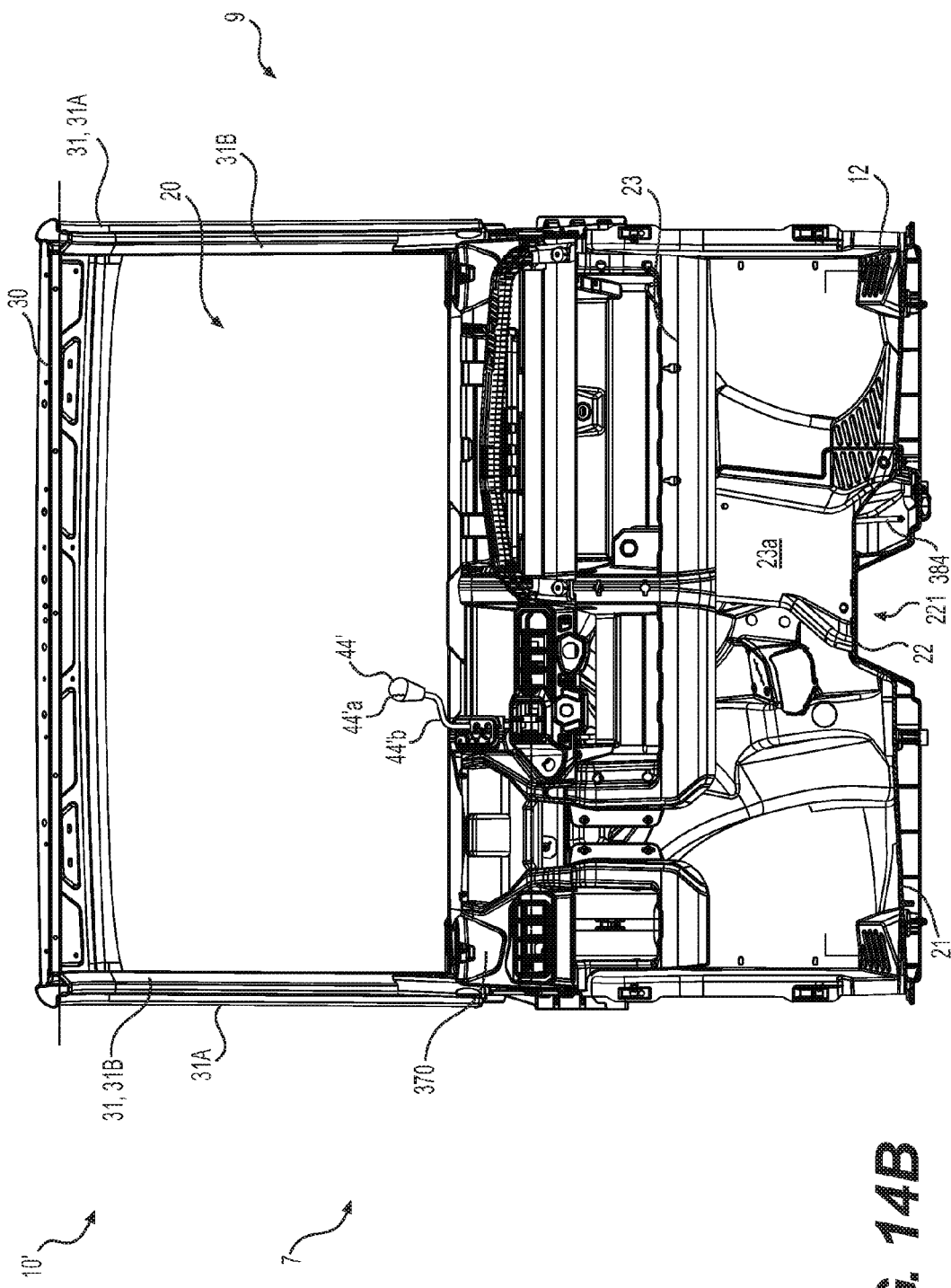
Figure 14C:
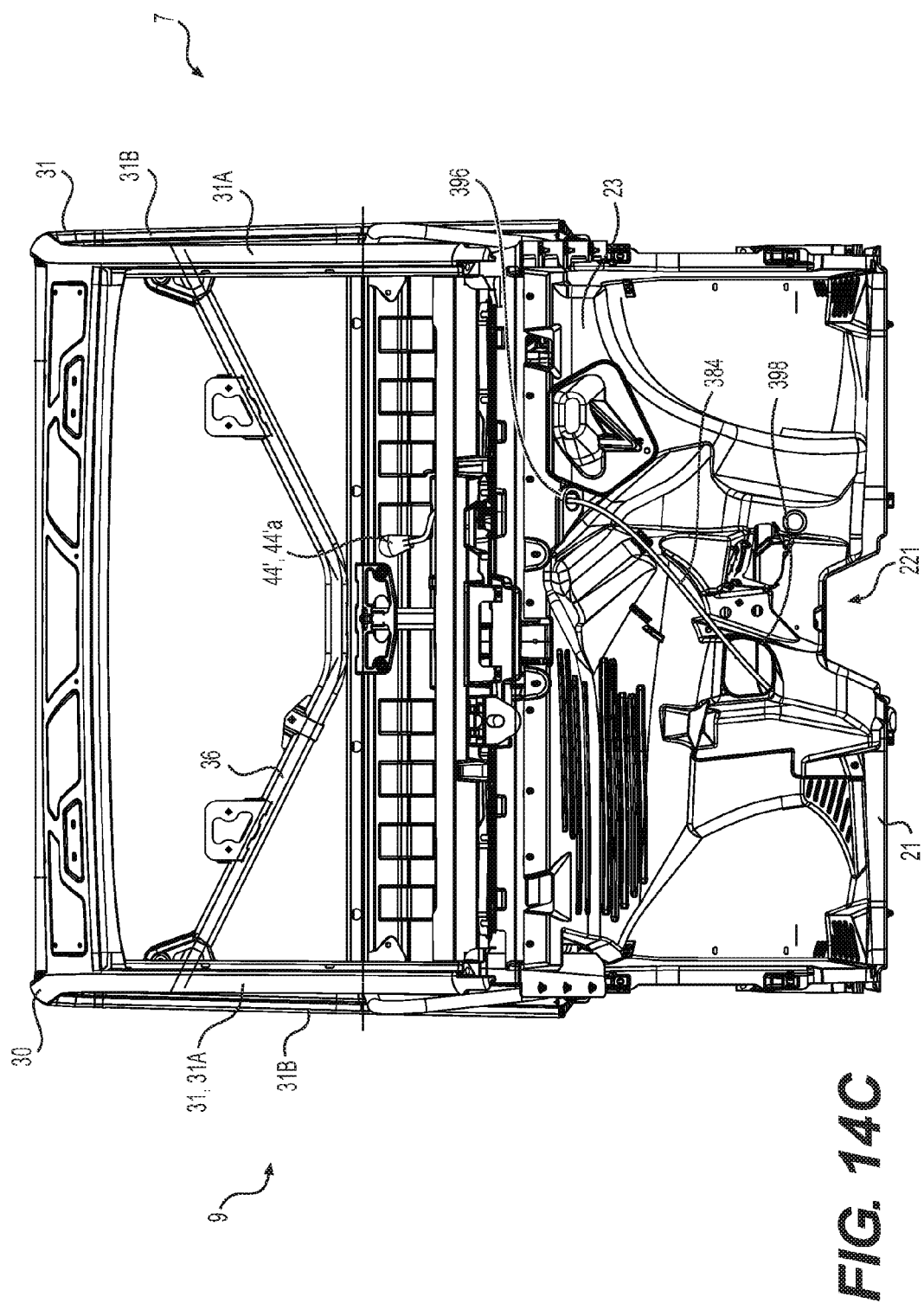

9G is a top plan view of the portion of the gear selector and steering assembly of FIG. 9D;

9H is a perspective view, taken from a rear, right side of the frame and gear selector of the vehicle of claim 1;

FIG. 10A is a perspective view, taken from a front, right side, of a the frame of the vehicle of FIG. 1, with the frame in a partially disassembled configuration and a portion of the front frame portion removed for clarity;

FIG. 10B is a perspective view, taken from a front, right side, of a middle portion of the frame of FIG. 10A;

FIG. 10C is a perspective view, taken from a front, right side, of a tunnel of a middle portion of the frame of FIG. 10A;

FIG. 10D is a perspective view, taken from a front, right side, of a rear portion of the frame of FIG. 10A;

FIG. 10E is a top plan view of the rear frame portion of FIG. 10D;

FIG. 10F is a cross-sectional view of the rear frame portion taken along the line 10F-10F shown in FIG. 10E;

FIG. 11A is a perspective view, taken from a front, right side, the rear frame portion of FIG. 10D having a transmission and a rear differential mounted thereto;

FIG. 11B is a right side elevation view of the rear frame portion, transmission and rear differential of FIG. 11A;

FIG. 12A is a perspective view, taken from a rear, left side, of a portion of another implementation of a vehicle including the seats, a portion of the firewall, the rear suspension, the engine and other internal components of the vehicle;

FIG. 12B a perspective view, taken from a rear, right side, of the portion of the vehicle of FIG. 12A;

FIG. 12B a right side elevation view of the portion of the vehicle of FIG. 12A;

FIG. 12D is a top plan view of a rear portion of the vehicle of FIG. 12A including the rear suspension, the rear wheels, the engine and other internal components of the vehicle;

FIG. 13A is a close-up, right side elevation view of the of the left, middle and right seats of the vehicle of FIG. 12A with the seats disposed in a seating position;

FIG. 13B is a close-up, right side elevation view of seat base of the right seat of FIG. 13A disposed in a seating position and a mounting bracket of the right seat base removed for clarity;

FIG. 13C is a close-up, right side elevation view of the seat base of FIG. 13B disposed in an intermediate position slightly prior to being placed in a seating position;

FIG. 13D is a close-up, right side elevation view of the seat base of FIG. 13B disposed in a storage position;

FIG. 13E is a close-up, right side elevation view of the seat base of FIG. 13B disposed in an intermediate position slightly prior to being placed in a storage position;

FIG. 14A is a top plan view of a portion of the cockpit area of another implementation of a vehicle showing the cockpit floor, the front wall, the rear wall and a gear shifter according to another implementation;

FIG. 14B is a cross-sectional view of the portion of the cockpit area of the vehicle of FIG. 14A, taken along the line 14B-14B of FIG. 14A; and FIG. 14C is a front elevation view of the portion of the cockpit area of the vehicle of FIG. 14A.

DETAILED DESCRIPTION

The present technology will be described below with respect to a side-by-side vehicle (SSV) designed to accommodate three riders (driver and two passengers) seated side-by-side in an open cockpit area. However, it is contemplated that some aspects of the technology could be adapted for use on other kinds of vehicles having an open cockpit area, such as a single passenger off-road vehicle, two-, four- or more passenger SSVs, golf carts and the like. It is also contemplated that aspects of the technology could be applied to vehicles having a closed cockpit area, such as a pickup truck or an automobile.

Figure 2A:
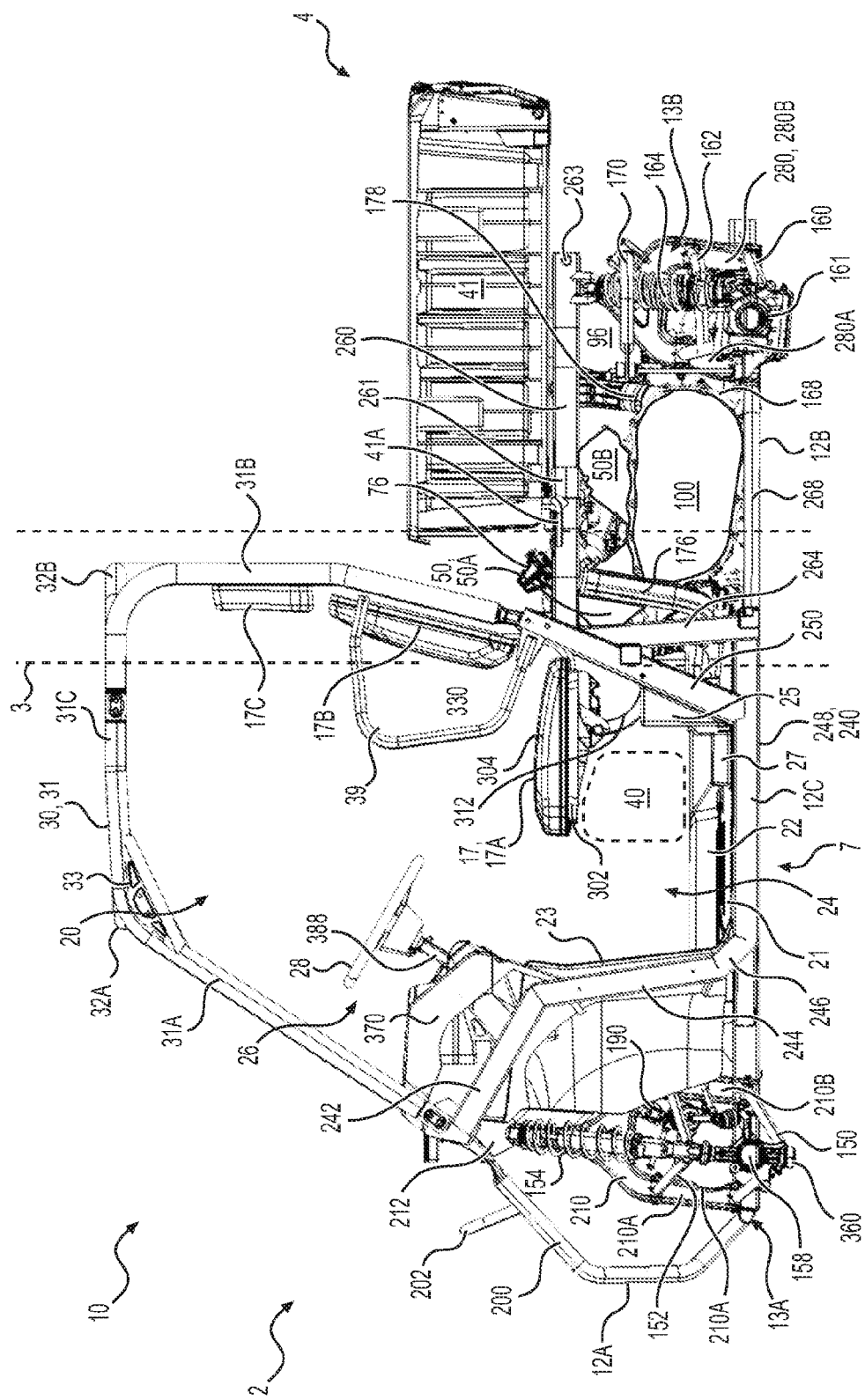
FIG. 2A is a left side elevation view of a portion of the vehicle of FIG. 1 with the fairings, wheels removed for clarity.
Figure 2B:
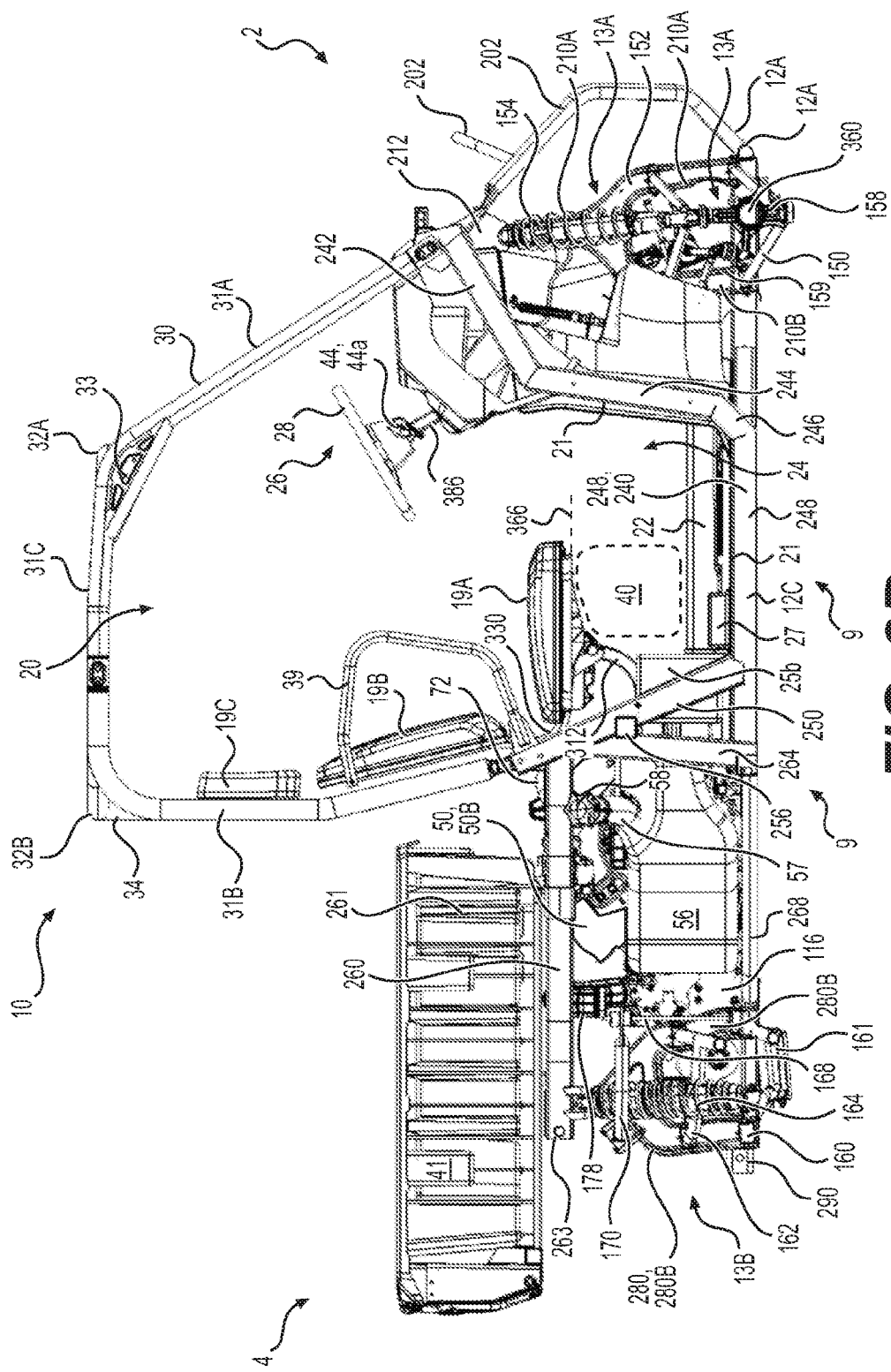
FIG. 2B is a right side elevation view of the vehicle portion of FIG. 2A.
Figure 2C:
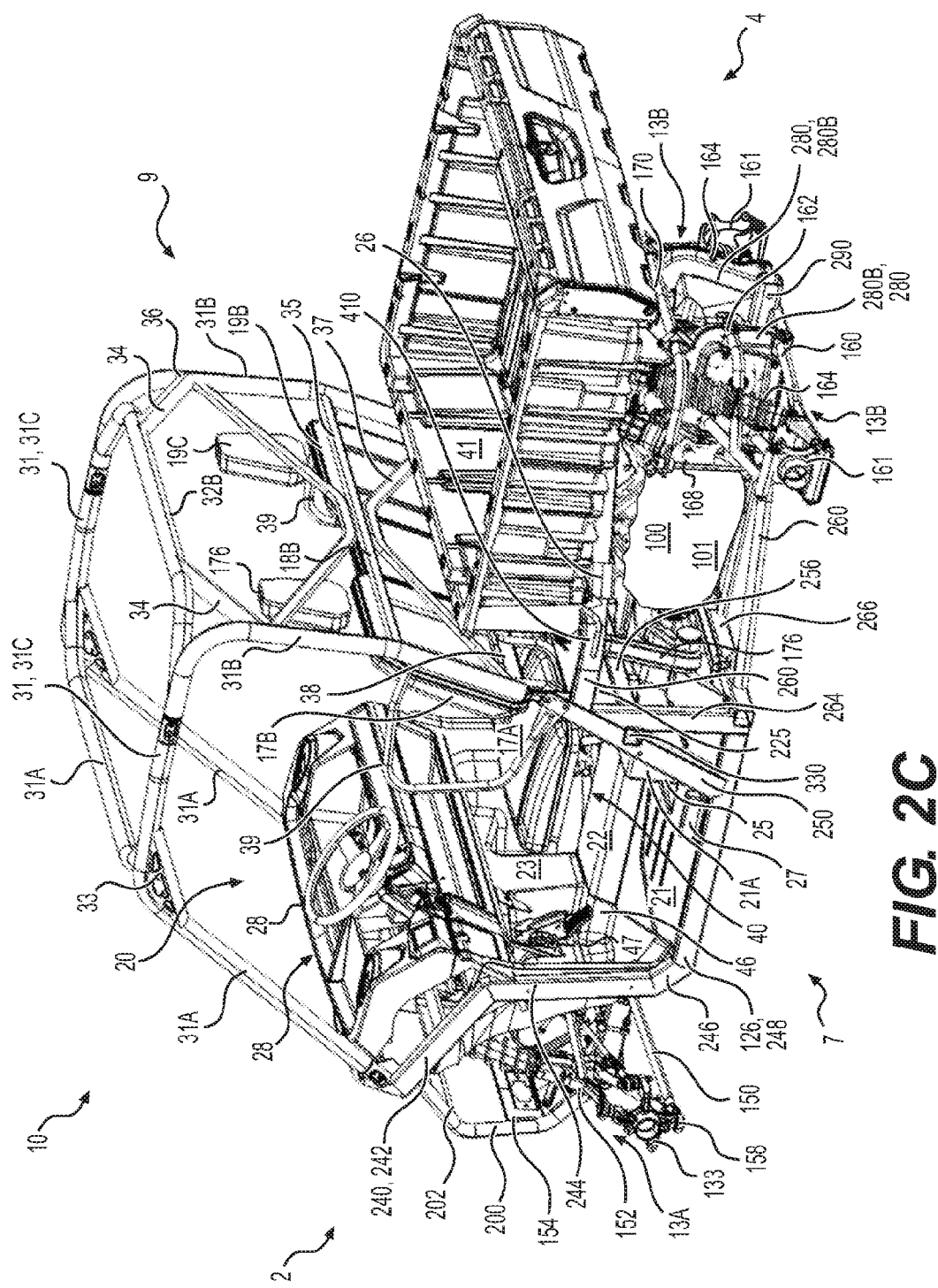
FIG. 2C is a perspective view, taken from a rear left side, of the vehicle portion of FIG. 2A.
Figure 2D:
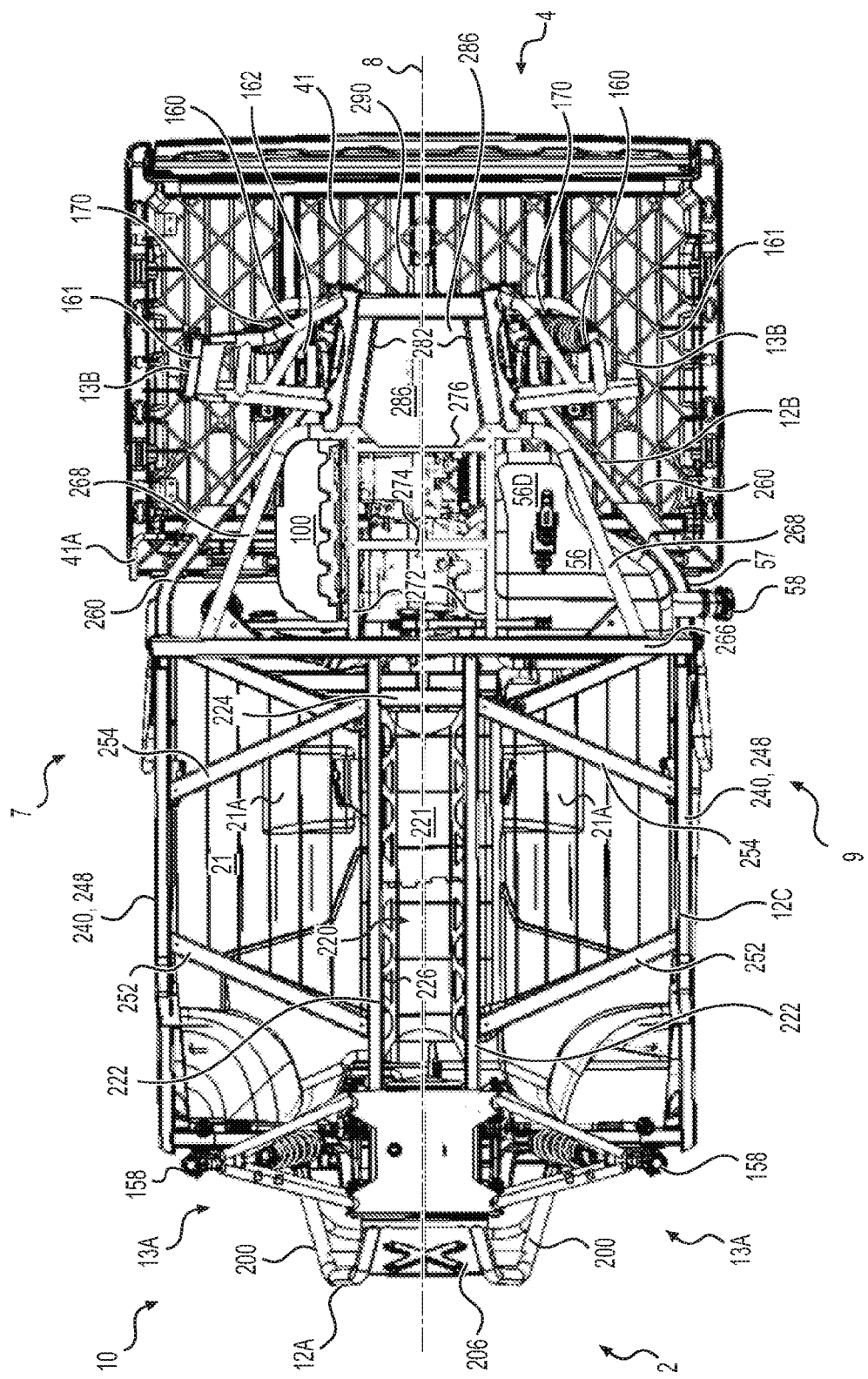
FIG. 2D is a bottom plan view of the vehicle portion of FIG. 2A.
Figure 2E:
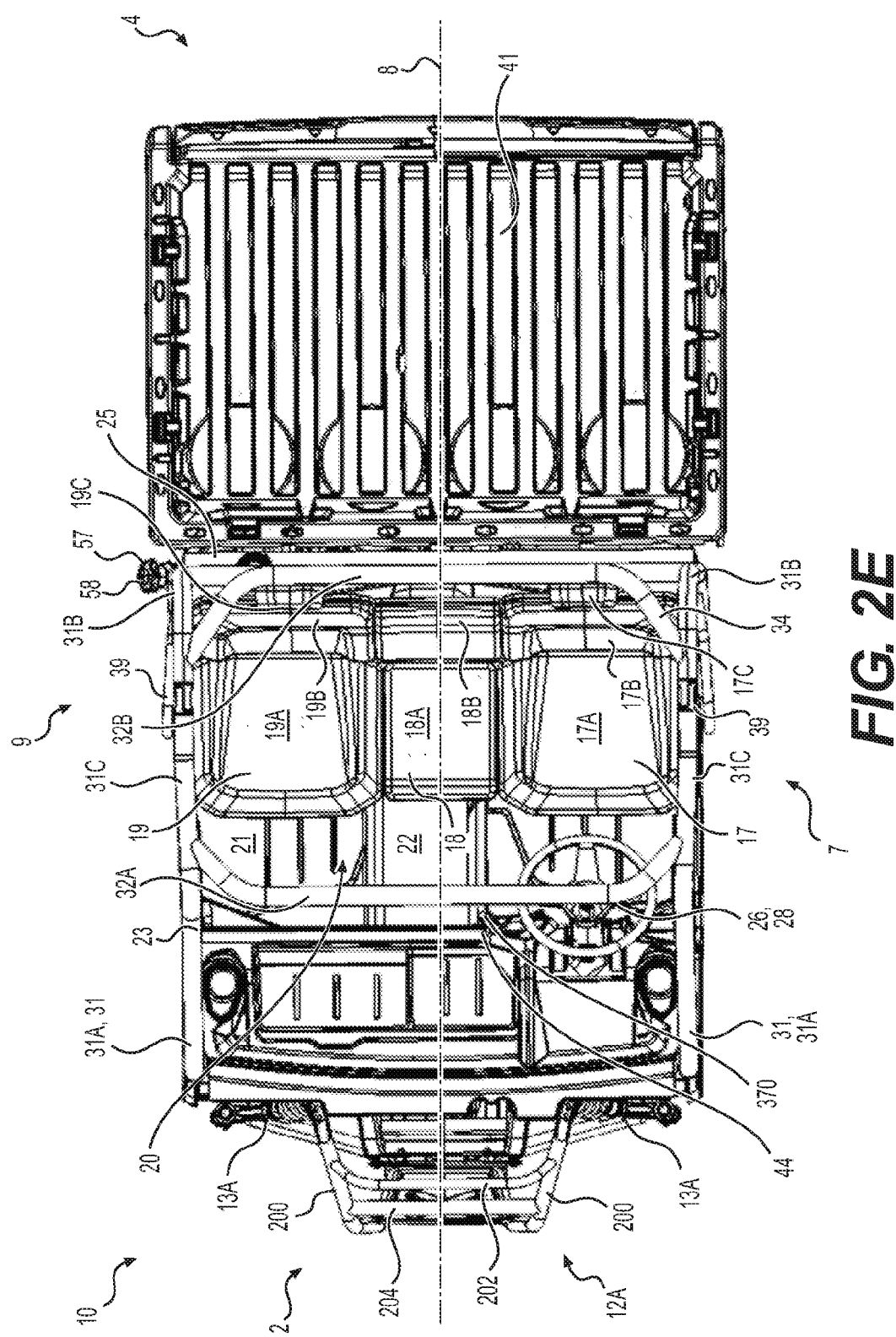
FIG. 2E is a top plan view of the vehicle portion of FIG. 2A.
Figure 2F:
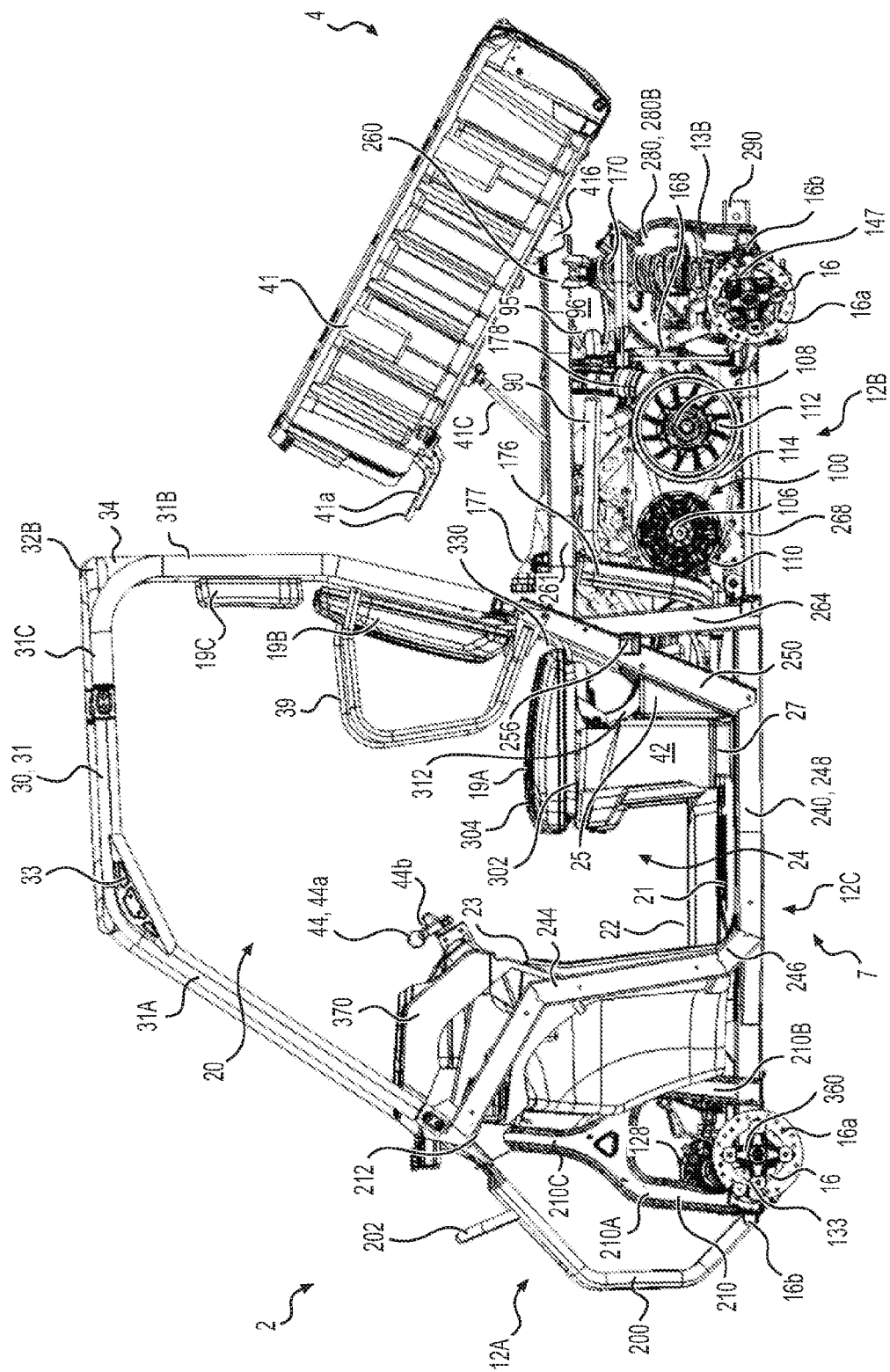
FIG. 2F is a left side elevation view of the vehicle portion of FIG. 2A with the steering wheel removed for clarity, the cargo box disposed in a raised position, and showing additional components of the drivetrain and wheel suspensions.

FIGS. 1 to 2F illustrate a vehicle 10 having a front end 2, a rear end 4, a left side 7 and a right side 9, consistently defined with the forward travel direction. The vehicle 10 includes a frame 12 to which all other parts of the vehicle 10 are connected, directly or indirectly. The frame 12 has a front portion 12A, a rear portion 12B and a middle portion 12C and will be described in more detail below.

The vehicle 10 includes a pair of front wheels 14A and a pair of rear wheels 14B. Each of the wheels 14A, 14B has a tire 15. Each front wheel 14A is suspended from the front portion 12A of the frame 12 via a front suspension 13A. A front wheel axis 360 is defined by a line passing through the centers of both front wheels 14A when the vehicle 10 is situated on level ground and in the absence of a load (driver passengers, cargo). Each rear wheel 14B is suspended from the rear portion 12B of the frame 12 via a rear suspension 13B. A rear wheel axis 362 is defined by a line passing through the center of both rear wheels 14B when the vehicle 10 is situated on level ground and in the absence of a load (driver passengers, cargo).

Each of the wheels 14A, 14B is provided with a brake 16 (FIG. 2F) in the form of a disc-type brake mounted onto a hub of its respective wheel 14A or 14B. Other types of brakes are contemplated. Each brake 16 includes a rotor 16a mounted onto the wheel hub and a stationary caliper 16b straddling the rotor 16a. The brake pads (not shown) are mounted to the caliper 16b so as to be disposed between the rotor 16a and the caliper 16b on either side of the rotor 16a. The brake pads are hydraulically actuated by a hydraulic piston connected to a hydraulic cylinder (not shown) via brake lines (not shown). The hydraulic cylinder is connected to a foot operated brake pedal 47 (FIG. 2C) such that when the brake pedal 47 is actuated, hydraulic pressure is applied to the hydraulic cylinder and thereby to a piston (not shown) of each caliper 16b, causing the brake pads to squeeze their respective rotors 16a which, through friction, brakes the wheels 14A, 14B. The brakes 16 of the four wheels 14A, 14B, the brake lines, the hydraulic cylinder and the brake pedal 47 together form a braking system of the vehicle 10.

Figure 4A:
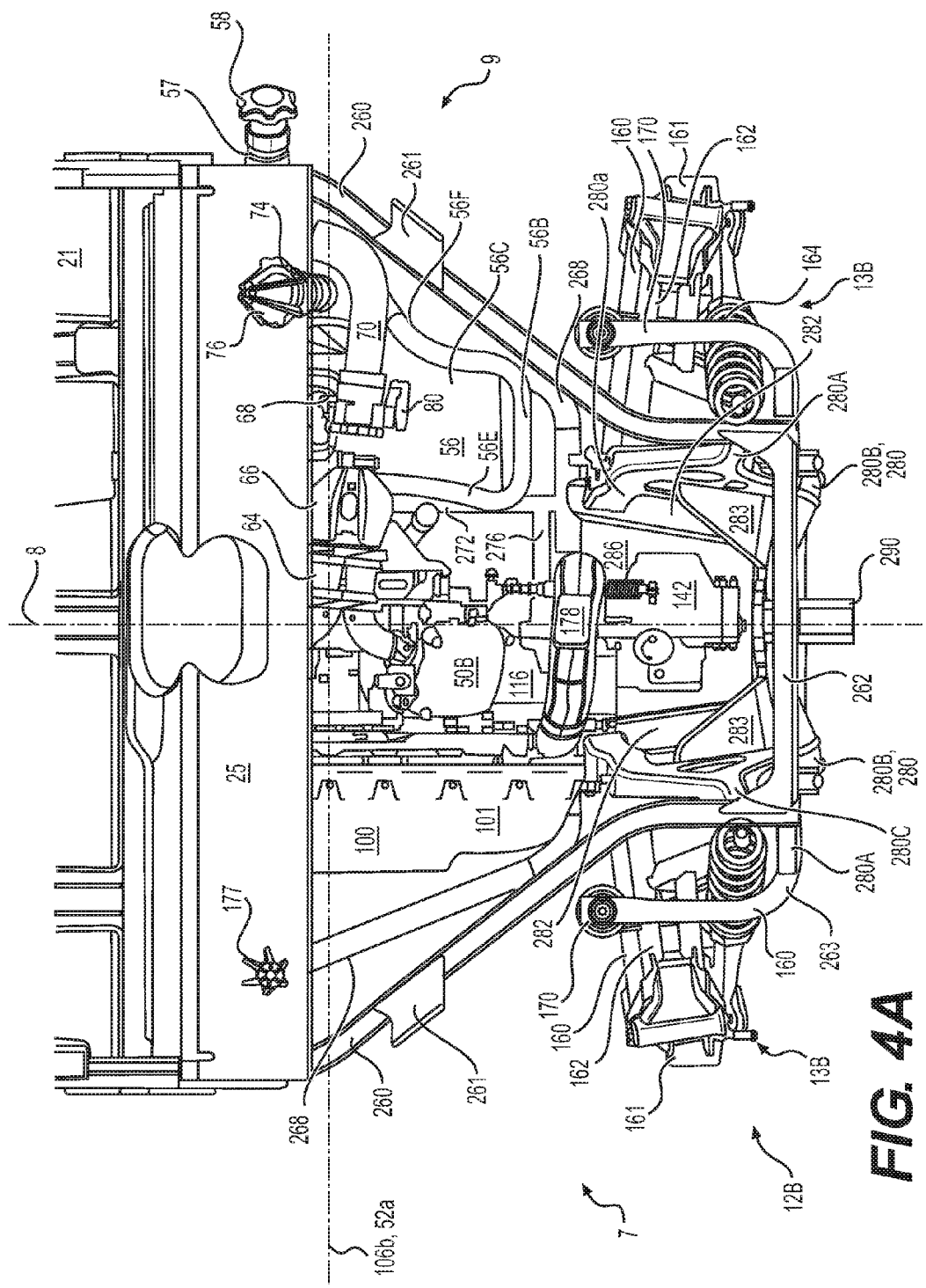
FIG. 4A is a top plan view of a rear portion of the vehicle portion of FIG. 2A including a portion of the firewall, the engine and other internal components, a portion of the frame and the rear suspension with the cargo box removed for clarity.

The front and rear wheels 14A, 14B are connected to an engine 50 (FIG. 4A). The engine 50 and the drivetrain connecting the engine 50 to the wheels 14A, 14B will be described below in further detail. A radiator 49 (FIG. 1) disposed between the front wheels 14A is fluidly connected to the engine 50 for cooling the engine 50.

The vehicle 10 has an open-air cockpit area 20 disposed generally in the middle portion of the vehicle 10. The cockpit area 20 comprises a left seat 17, a middle seat 18 and a right seat 19 to accommodate a driver and two passengers (collectively referred to herein as riders). It is contemplated that the vehicle 10 could have only a left seat 17 and a right seat 19. As the seats 17, 18, 19 are distributed laterally, the vehicle 10 is referred to as a side-by-side vehicle, or SSV. A roll cage 30, connected to the frame 12, is disposed over the cockpit area 20. The roll cage 30, is an arrangement of metal tubes and will be described further below.

A steering assembly 26, including a steering wheel 28, is disposed in front of the driver seat, which in this implementation, is the left seat 17. The steering assembly 26 is operatively connected to the two front wheels 14A to permit steering of the SSV 10. The steering assembly 26 will be described in further detail below. The left side 7 is the driver side, the right side 9 is the passenger side and the middle and right seats 18, 19 are passenger seats. It is contemplated that the steering wheel 26 could be disposed in front of the right seat 19, wherein the right side 9 is the driver side, the left side 7 is the passenger side, and the left and middle seats 17, 18 are passenger seats.

The cockpit area 20 has openings 24 on the left and right sides 7, 9 of the vehicle 10 through which the riders can enter and exit the vehicle 10. A lateral cover (not shown) or a door (not shown) could be selectively disposed across each opening 24. The lateral covers would be disposed across the openings 24 when the riders are riding the vehicle 10 and could be opened by the driver and/or passenger when they desire to enter or exit the cockpit area 20.

With reference to FIGS. 1 to 3D, the cockpit area 20 has a floor 21, a front wall 23 disposed forward of the steering wheel 28 and a rear wall 25 disposed behind the seats 17, 18, 19. As can be seen best on FIG. 2C, a dashboard 370 is attached to the upper portion of the front wall 23, and has the display cluster mounted thereto. The display cluster includes a number of screens and dials for the operation of the vehicle, such as a speedometer, odometer, engine speed indicator, fuel gauge, an engine temperature gauge, and the like. The steering assembly 28 extends through the front wall 23 to connect to the front wheels 14A. The gear selector 44 disposed on the right side of the steering wheel 28 is connected to a gear selector cable 384 which extends through the front wall 23 and will also be discussed below.

Figure 9E:
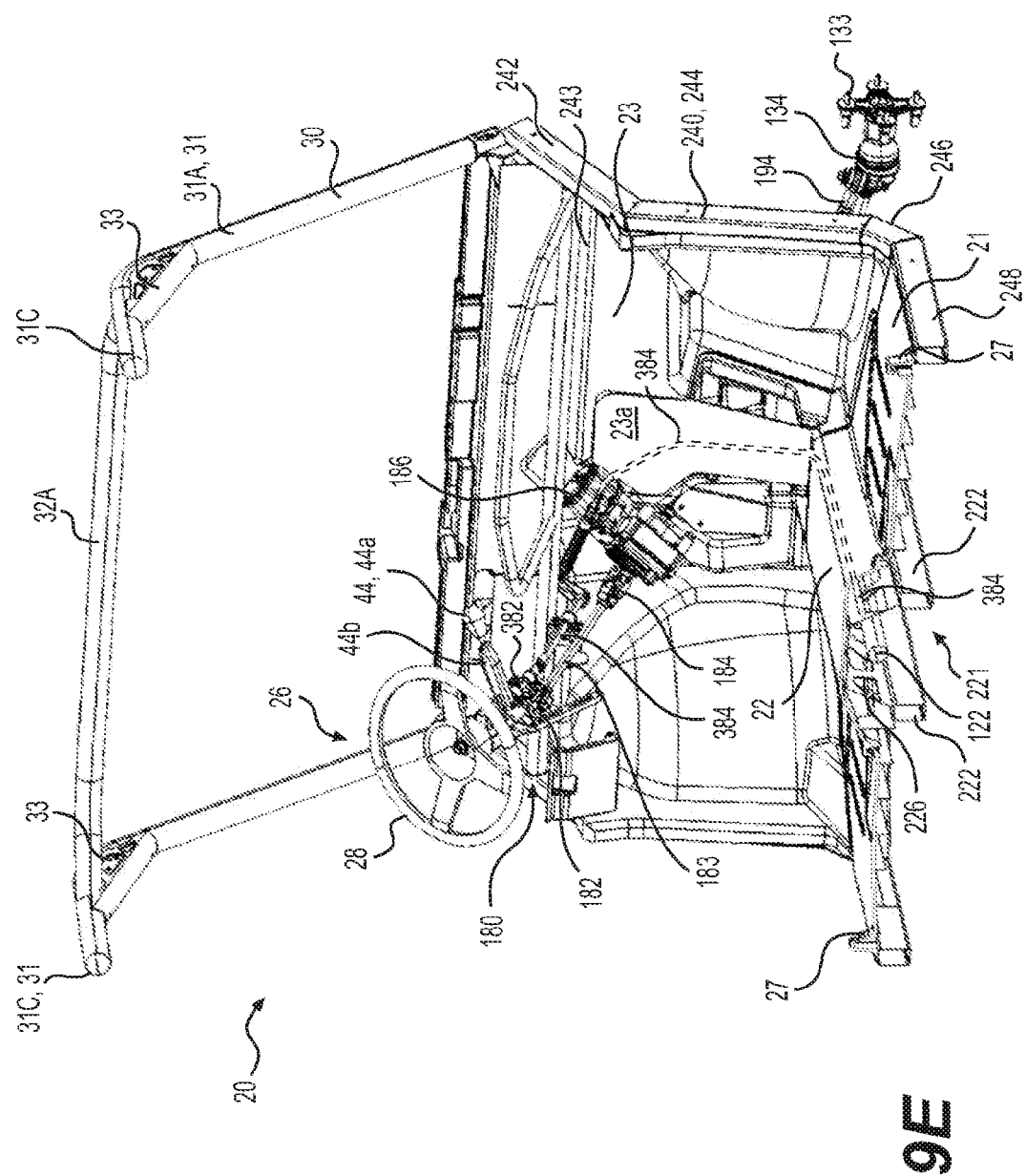
FIG. 9E is a perspective view, taken from a rear, right side, of a front portion of the cockpit area of the vehicle of FIG. 1 with a portion of the front wall removed for clarity.
Figure 9F:
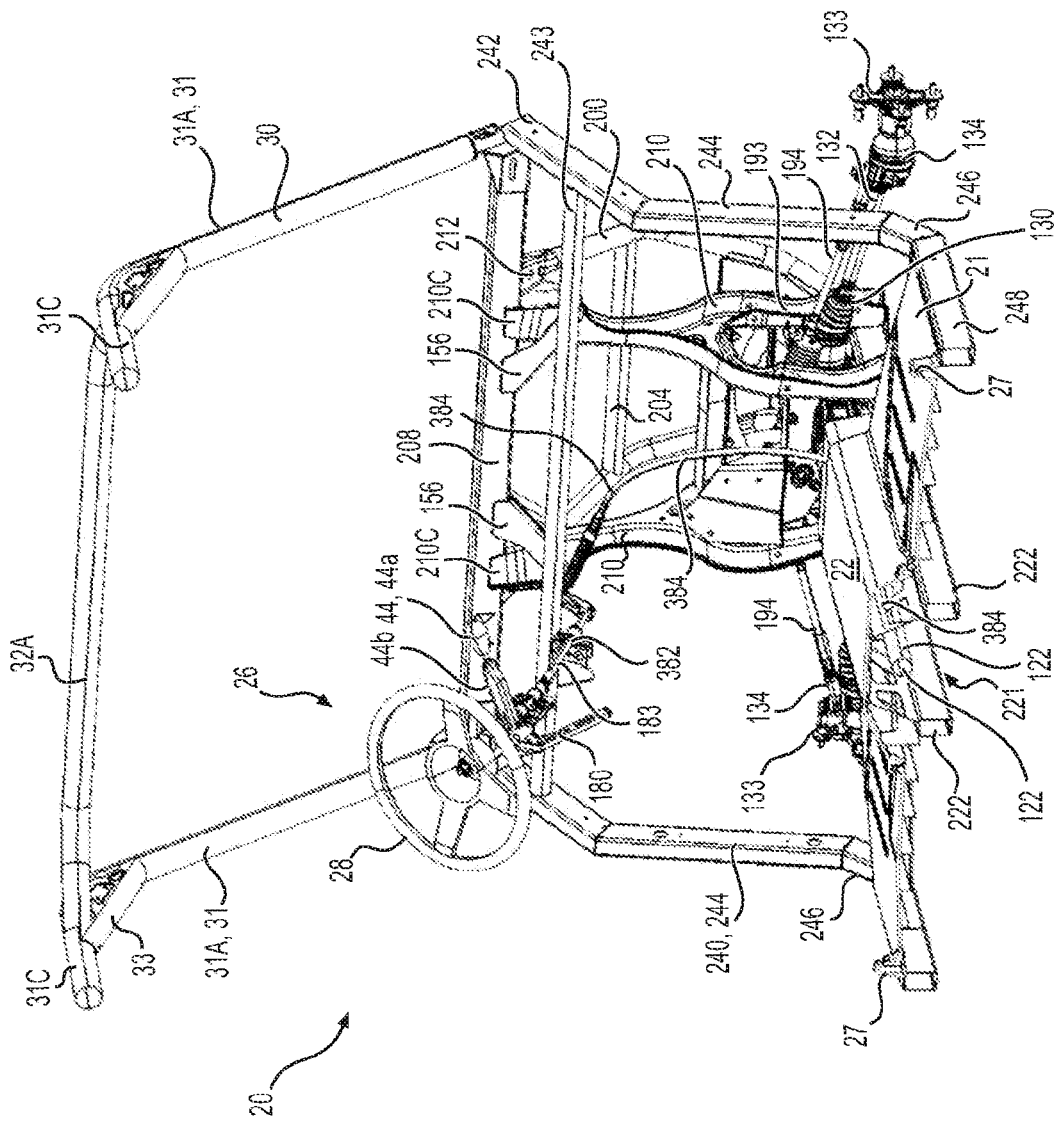
FIG. 9F is a perspective view, taken from a rear, right side, of the front portion of the cockpit area of the vehicle of FIG. 1 with the front wall removed for clarity.
Figure 9G:
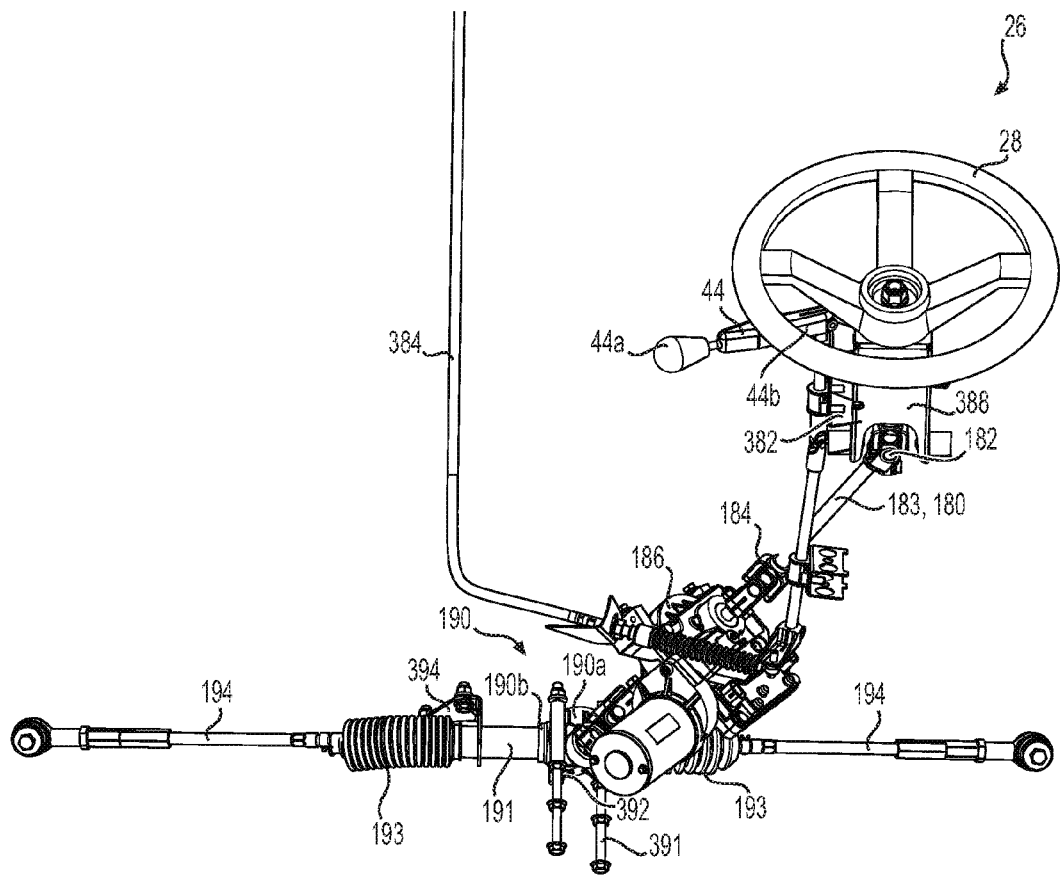
Figure 9H:
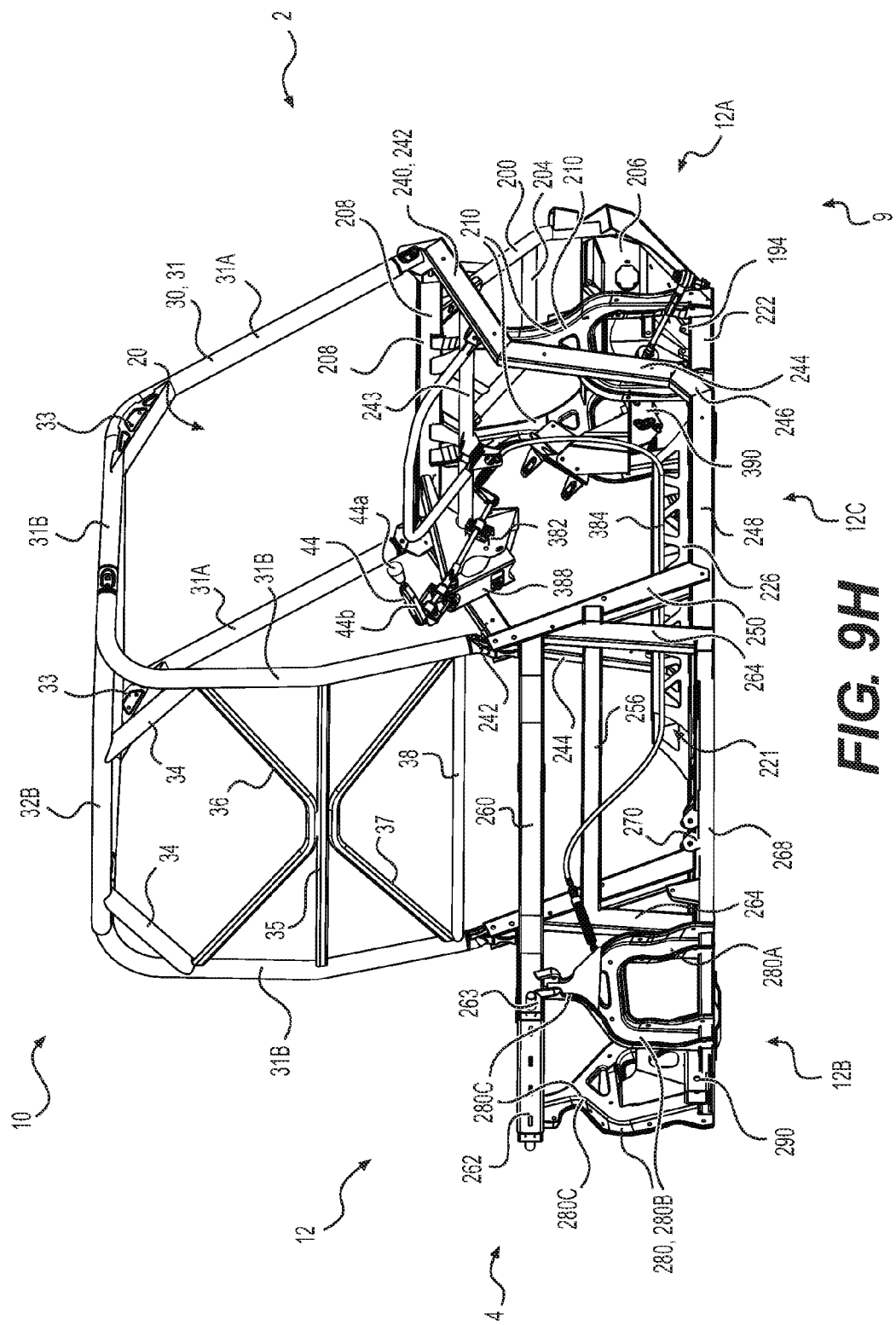

With reference to FIGS. 2C, 9E and 9F, the cockpit floor 21 has a longitudinally extending and raised middle portion 22. This raised portion 22 of the floor 21 is disposed over a longitudinally extending tunnel 221 formed by the frame 12. The tunnel 221 houses the driveshafts 118, 122 extending forwardly from the engine 50 to the front differential 128. The gear shifter cable 384, and cooling hoses connecting the radiator 49 to the engine 50 extend longitudinally along a right side of the tunnel 221 between the tunnel 221 and the raised portion 22 of the cockpit floor 21. The brake pedal 47 and a throttle pedal 46 are disposed above the cockpit floor 21 on a left side of the raised portion 22, below the steering wheel 28 and in front of the driver seat 17.

With reference to FIGS. 3A to 3D, the rear wall 25 separates the cockpit area 20 from the rear portion of the vehicle 10 where the engine 50 and other internal components of the vehicle 10 are located. The rear wall, referred to herein as the firewall 25 includes a lower portion disposed below the seats 17, 18, 19 and an upper portion disposed rearward of the lower portion of the firewall 25. A right portion 25b of the lower portion of the firewall 25 can be detached to access the vehicle's battery 48 disposed rearwardly thereof.

With reference to FIGS. 1 to 3D, the seats 17, 18, 19 are bucket seats. The left seat 17 has a seat base 17A, a seat back 17B and a headrest 17C. The right seat 19 has a seat base 19A, a seat back 19B and a headrest 19C. The middle seat 18 has a seat base 18A and a seat back 18B without a headrest but it is contemplated that the middle seat 18 could also have a headrest. The seat bases 17A, 18A, 19A are each connected to the frame 12. The seat backs 17B, 18B, 19B and the headrests 17C, 19C are each connected to the roll cage 30. It is contemplated that the headrests 17C, 19C could be connected to the top of the backrests 18B, 19B. It is contemplated that the headrests 17C, 19C could be omitted from the left and right seats 17, 19. It is contemplated that the headrests 17C, 19C could be integrally formed with the corresponding seat backs 17B, 19B. It is contemplated that one or more of the seat backs 17B, 18B, 19B could be omitted. It is contemplated that the seat backs 17B, 18B, 18B could be formed integrally with the corresponding seat bases 17A, 18A, 19A. It is contemplated that the seats 17, 18, 19 could be other types of recumbent seats. It is contemplated that the seats 17, 18, 19 could be formed as a single integral bench-like seat base having left 17A, middle 18A, and right 19A seat portions. Each of the seat bases 17A, 18A, 19A, and the seat backs 17B, 18B, 19B are contoured to comfortably receive and support the rider (driver or passenger). Each of the seat bases 17A, 18A, 19A, the seat backs 17B, 18B, 19B and the headrests 17C, 19C includes a frame made of metal and/or plastic, a seat cushion made of a softer foam, and a cover made of leather for waterproofing. It is contemplated that the seat bases 17A, 18A, 19A and the seat backs 17B, 18B, 19B could be made of other materials and have a different structure.

Figure 3A:
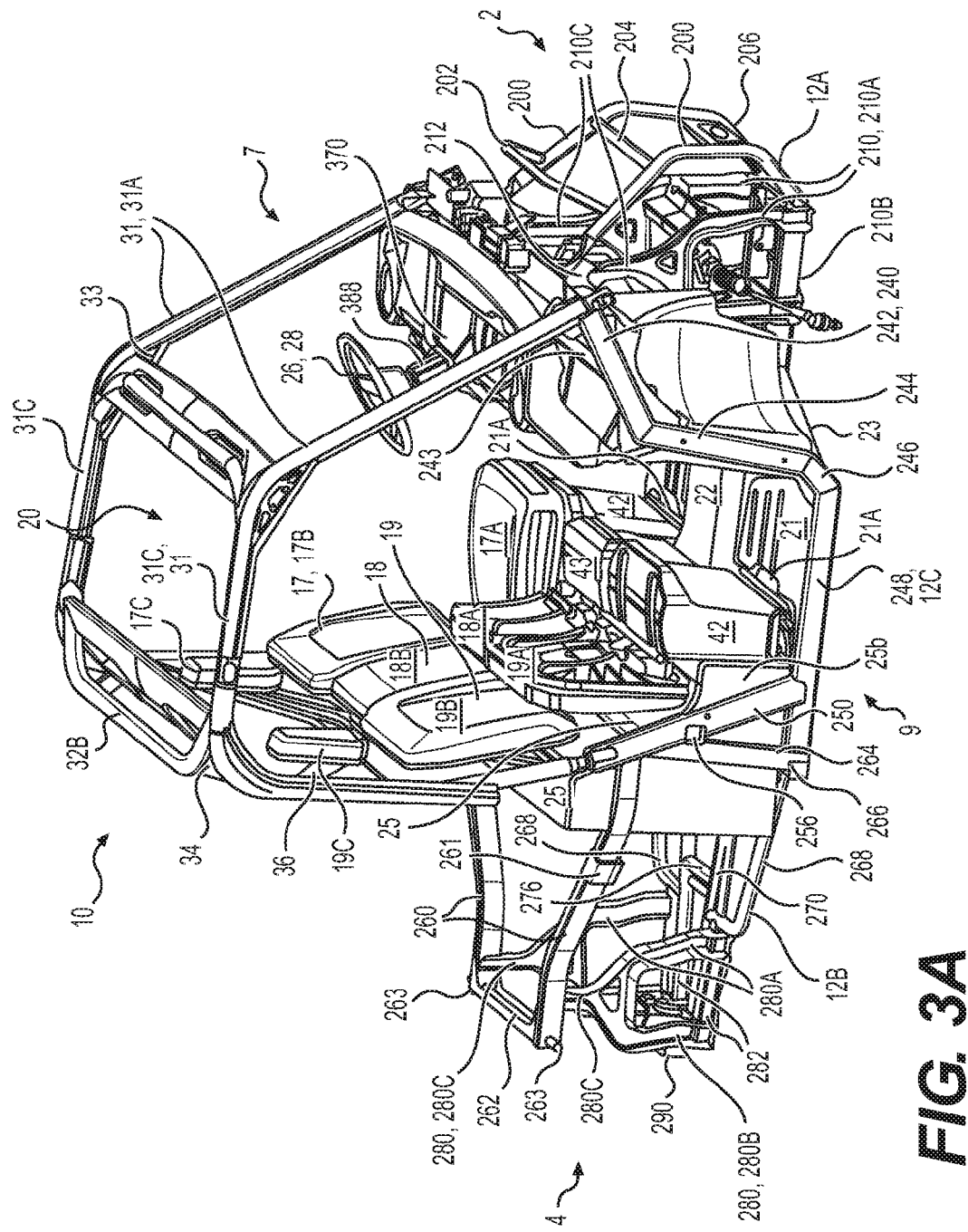
FIG. 3A is a perspective view, taken from a front, right side, of a portion of the vehicle of FIG. 1 showing the frame and the cockpit area with the middle and right seats being pivoted up to a storage position.
Figure 3B:
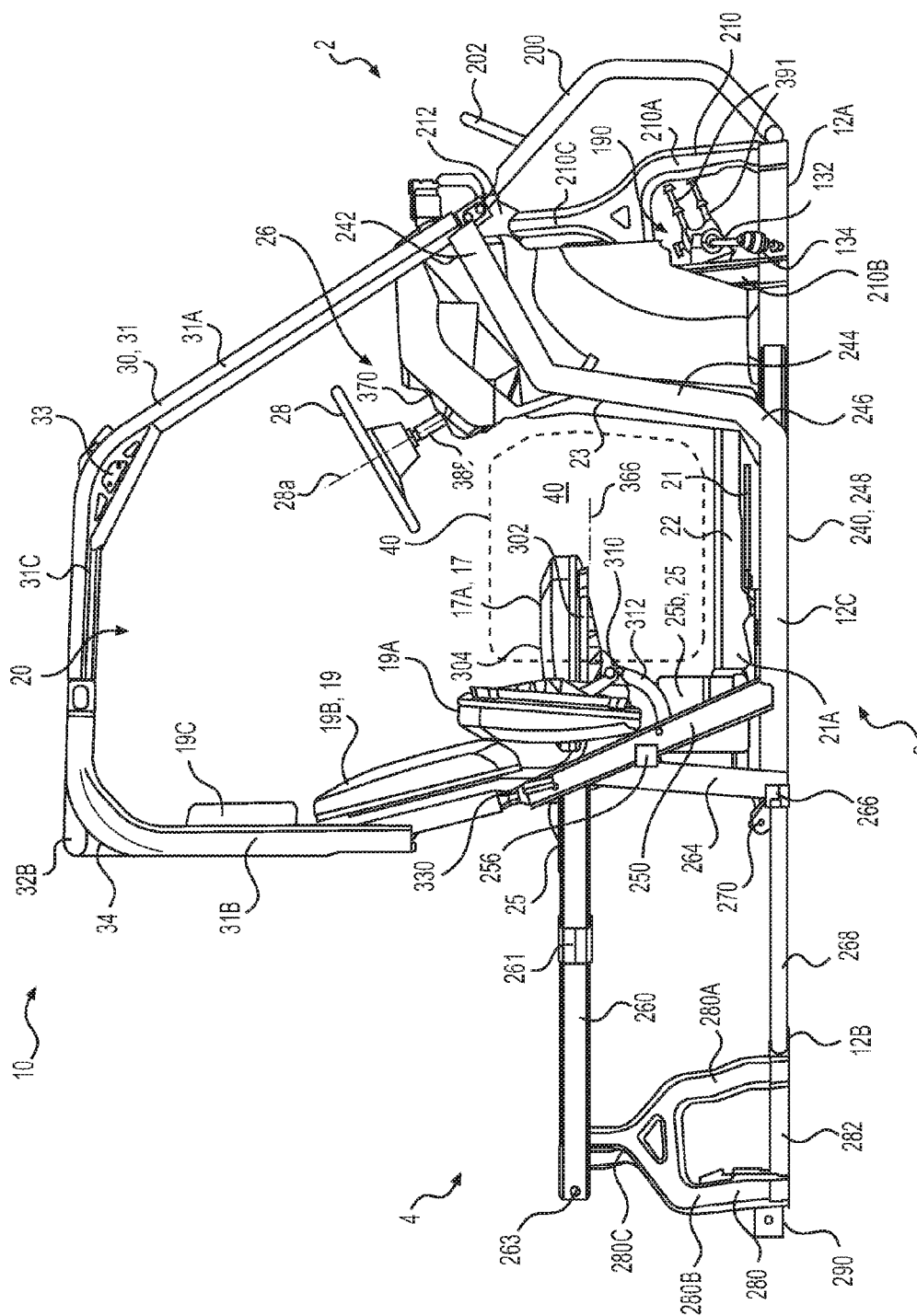
FIG. 3B is a right side elevation view of the vehicle portion of FIG. 3A.

With reference to FIGS. 3A and 3B, in the illustrated implementation of the vehicle 10, the seat bases 18A, 19A of the middle and right seats 18, 19 are pivotable from the seating position shown in FIGS. 1 to 2B to a storage position as can be seen in FIGS. 3A and 3B. The pivoting mechanism of the seat bases 18A, 19A will be discussed below in further detail. The driver's seat base 17A is not pivotable in the illustrated implementation of the vehicle 10 and thus remains in a seating position. It is contemplated that the driver's seat base 17A could also be pivotable to a storage position for use when the vehicle 10 is not being operated. For example, the driver's seat base 17A could be pivoted to provide convenient access to the cockpit floor 21 underneath the seats 17, 18, 19 from the driver's side 7 of the vehicle 10.

The vehicle 10 shown herein is provided with enhanced storage space, as well as a middle passenger seat 18, in the cockpit area 20 as the internal components of the vehicle 10, such as the engine 50, airbox 72 and fuel tank 56 are disposed rearward of the cockpit area 20 as can be seen in FIGS. 4A to 4D. The configuration of the internal components of the vehicle 10 will be described in further detail below.

With reference to FIGS. 2A, 2B and 3B, the space below the seat bases 17A, 18A, 19A forms a storage space 40 extending continuously from the left side 7 to the right side 9 of the vehicle 10. The storage space 40 extends to the front wall 23 in front of the passenger seats 18, 19. When a passenger is seated in one of the passenger seats 18, 19, the passenger's legs would be placed in the storage space 40 extending forward of the seat base 18A, 19A. In the driver's side of the cockpit area 20 however, the storage space 40 does not extend forward of the driver's seat 17 to the front wall 23 in order for the driver to be able to access the brake pedal 47 and the throttle pedal 46 disposed on the floor 21 in front of the driver's seat 17. By pivoting the passenger seat bases 18B, 19B to a storage position as in FIGS. 3A and 3B, the storage space 40 can also be extended vertically above a horizontal plane 366 (FIGS. 2B, 3B) passing through a lower surface of the seat bases 18A, 19A when the seat bases 18A, 19A are in a seating position (i.e. in the middle and right positions of the cockpit area 20, the storage space 40 extends vertically higher than the driver seat base 17A.)

With reference to FIGS. 1 and 3A, the vehicle 10 is provided with storage boxes 42, 43. A left storage box 42 is placed under the left seat 17, a right storage box 42 is placed under the right seat 19, and a middle storage box 43 (FIG. 3A) is placed under the middle seat 18 on the raised portion 22 of the cockpit floor 21. The middle storage box 43 has a shorter vertical height than the left and right storage boxes 42 due to the raised portion 22. The cockpit floor 21 on the left side of the raised portion 22 has a recess 21A (FIGS. 2C, 3A) to accommodate the lower surface of the left storage box 42 or a portion thereof. Another recess 21A (FIGS. 2C, 3A) is formed in the cockpit floor 21 on the right side of the raised portion 22 to accommodate the lower surface of the right storage box 42, or a portion thereof. The left storage box 42 is prevented from moving in the lateral direction by a projection 27 (FIGS. 2A and 2B) extending longitudinally along the left edge of the cockpit floor 21 and the left side wall of the raised portion 22. The right storage box 42 is prevented from moving in the lateral direction by a projection 27 extending longitudinally along the right edge of the cockpit floor 21 and the right side wall of the raised portion 27. The right 42 and middle 43 storage boxes shown in FIG. 3A can be used with the seats 18, 19 in a seated or a storage position. It is contemplated that the vehicle 10 could be provided with other storage boxes, which extend vertically higher than the storage boxes 42, 43 shown herein, for use when the seat bases 18A, 19A are pivoted to the storage position. Storage boxes provided for use in the absence of a passenger could also have a longitudinal direction length that is greater than those shown in the figures such that they extend further forwardly than the front of the seat bases 18A, 19A and possibly to the front wall 23 when disposed in the seating or storage positions.

Turning now to FIGS. 6A to 8C, the pivoting mechanism of the seat bases 18A, 19A will now be discussed. The middle seat base 18A has a similar pivoting mechanism as the right seat base 19A. As such, the pivoting mechanism will be described below with reference mainly to the right seat base 19A.

The seat base 19A includes a seat base frame 302 and a seat cushion 304 connected to an upper surface 302d (FIGS. 6D and 7D) of the seat base frame 302. The upper surface of the seat cushion 304 is a seating surface. A number of reinforcing ribs 306 are formed on the lower surface 302c of the seat base frame 302.

The terms "upper surface 302d" and "lower surface 302c" are being used herein for convenience and refer to the position of the seat base surfaces 302c, 302d when the seat base 19A is in a seating position as seen in FIGS. 6A to 6D. When the seat base 19A is disposed in a seating position as in FIGS. 6A to 6D, the upper surface 302d of the seat base frame 302 and the seat cushion 304 face upwards while the lower surface 302c of the seat base frame 302 faces downwards towards the cockpit floor 21. When the seat base 19A is pivoted to a storage position as shown in FIGS. 7A to 7D, the upper surface 302d of the seat base frame 302 and the seat cushion 304 face towards the rear 4 of the vehicle 10 while the lower surface 302c of the seat base frame 302 faces towards the front 2 of the vehicle 10. Similarly, the seat base frame 302 has a front end 302a and a rear end 302b which is disposed rearward of the front end 302a when the seat base 19A is in a seating position (FIGS. 6A to 6D). The front end 302a is disposed above the rear end 302b when the seat base 19A is in a storage position (FIGS. 7A to 7D). It is also contemplated that the seat base 19A could be pivoted downwards to a storage position such that the lower surface 302c faces towards the rear of the vehicle 10 and the front end 302a is below the rear end 302b in the storage position.

Figure 7A:
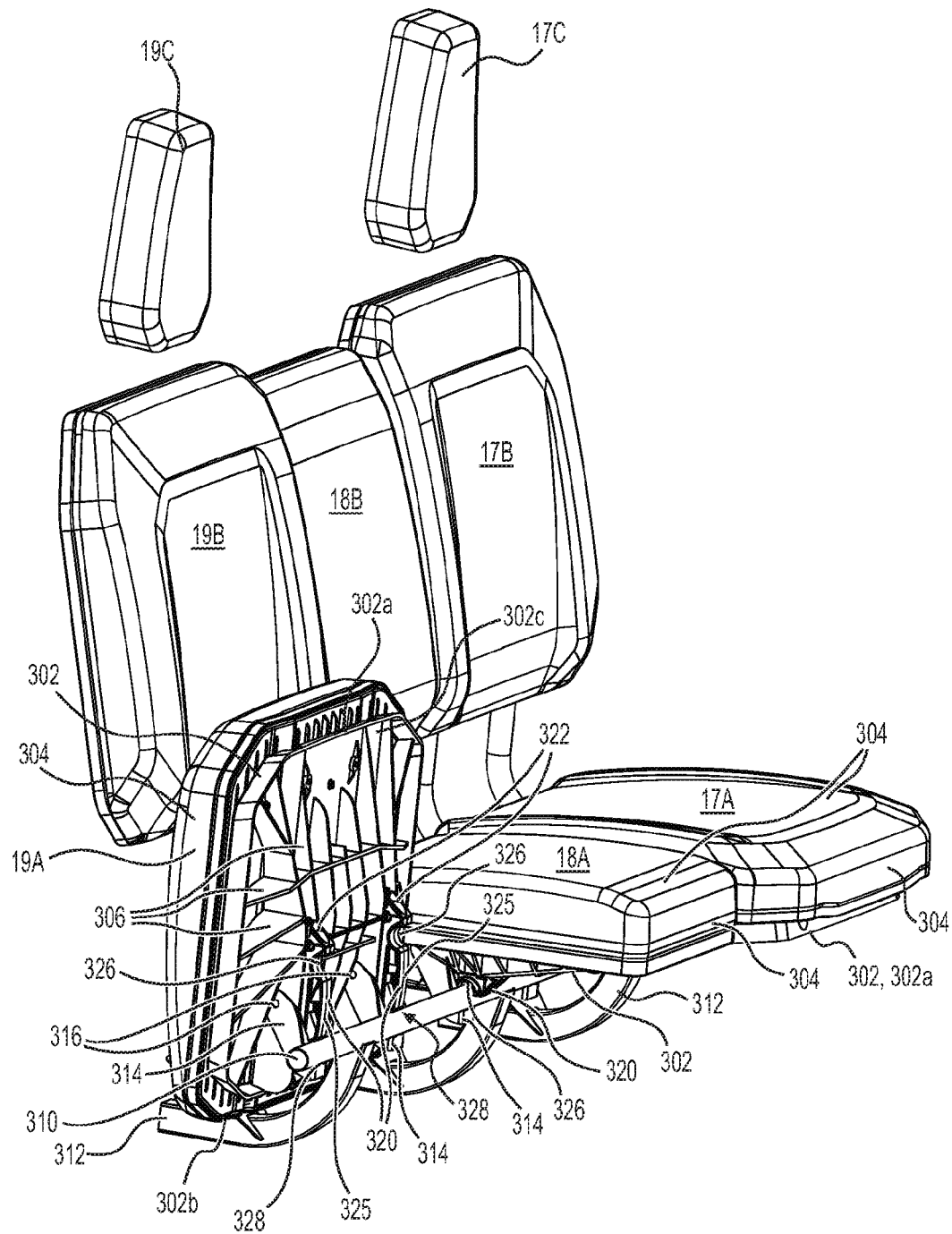
FIG. 7A is a perspective view, taken from a front, right side, of the left, middle and right seats of the vehicle of FIG. 1 with the left and middle seats disposed in a seating position and the right seat disposed in a storage position.
Figure 7B:
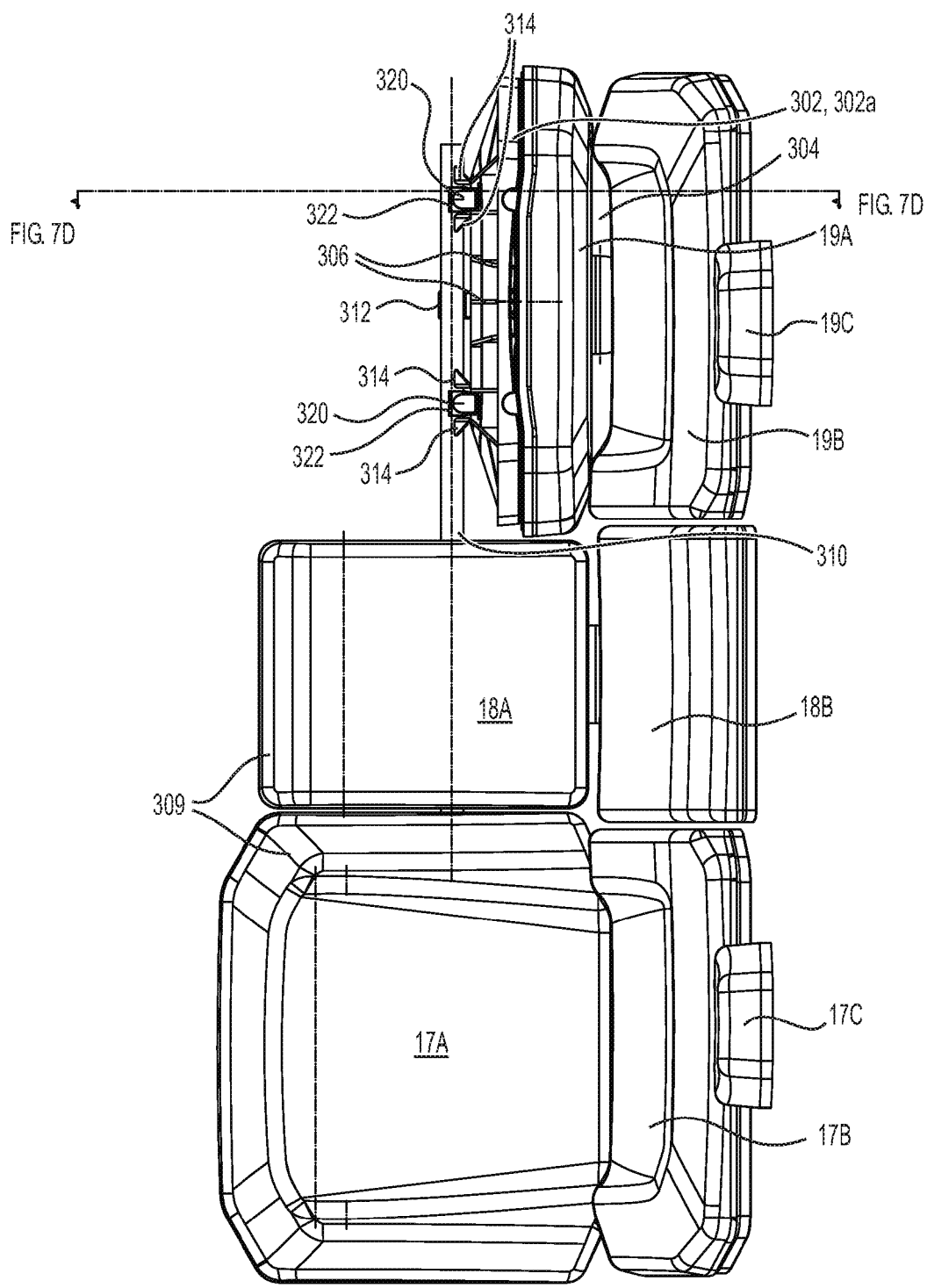
FIG. 7B is a top plan view of the seats of FIG. 7A.
Figure 7C:
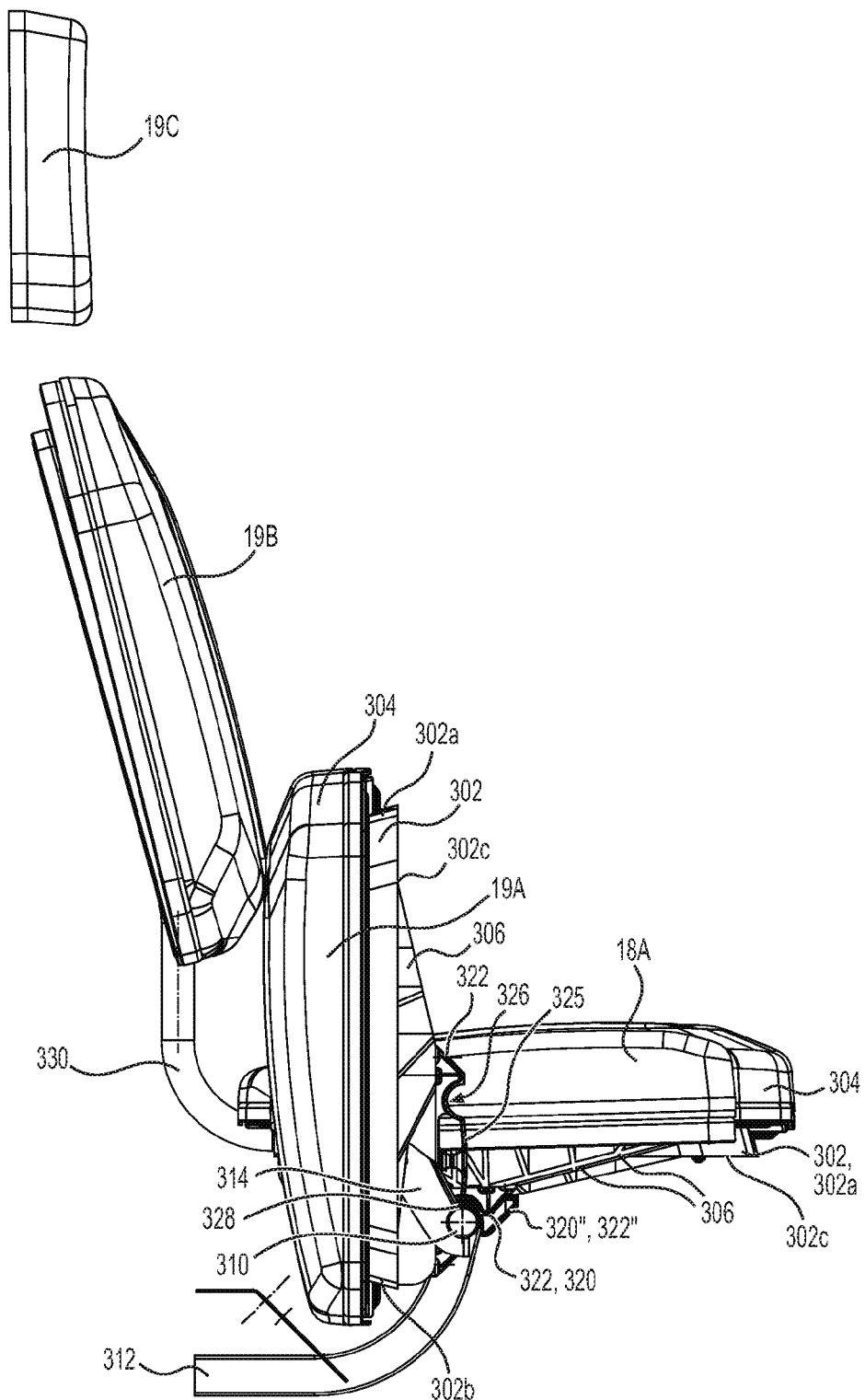
FIG. 7C is a right side elevation view of the seats of FIG. 7A.

With reference to FIG. 7A, a horizontal rod 310 extends laterally between the left and right sides 7, 9 of the vehicle 10 below the driver seat base 17A and the passenger seat bases 18A, 19A when disposed in a seating position. The rod 310 is connected to the frame 12 by three support members 312. Each support member 312 extends downwardly from the rod 310 and then rearwardly through the firewall 25 to connect to a lateral frame member 256 (FIG. 10A) disposed behind the firewall 25. The left support member 312 is disposed below the driver seat base 17A, the middle support member 312 and the right support member 312 are respectively disposed below the passenger seat bases 18A, 19A when disposed in the seating position. A bracket 340 is connected to each support member 312 and extends upwards therefrom. The bracket 340 supports the upper portion of the firewall 25 as can be seen in FIG. 4D.

With reference to FIG. 7A, each passenger seat base 18A, 19A is pivotally connected to the rod 310 by a pair of attachment brackets 314 including one on each side of the corresponding support member 312. The lower end of each attachment bracket 314 is welded to a rear surface and a lower surface of the rod 310. Each attachment bracket 314 has a pair of flanges that extends upwards and rearwards from the rod 310 to the seat base frame 302 (FIG. 7A shows the right flanges of the right and left attachment brackets 314 connected to the seat base 19A). Each attachment bracket 314 is connected to a rib 306 by placing the rib 306 between the two flanges and aligning the through-holes 316 (FIG. 7A) of the rib 306 and the attachment bracket flanges on either side thereof. A bolt 317 (FIGS. 6D and 7D) is inserted through the aligned through-holes 316 to pivotally connect the seat base frame 302 to its attachment bracket 314. The seat base 19A thus pivots about the attachment bracket 314 about a pivot axis 315 (FIG. 6D, 7D) defined by the aligned through-holes 316. It is contemplated that the brackets 314 could not connect the seat base frame 302 to the rod 310. It is contemplated that the seat base frame 302 could be pivotally connected to the vehicle frame 12 directly or via an element other than the rod 310.

Figure 6A:
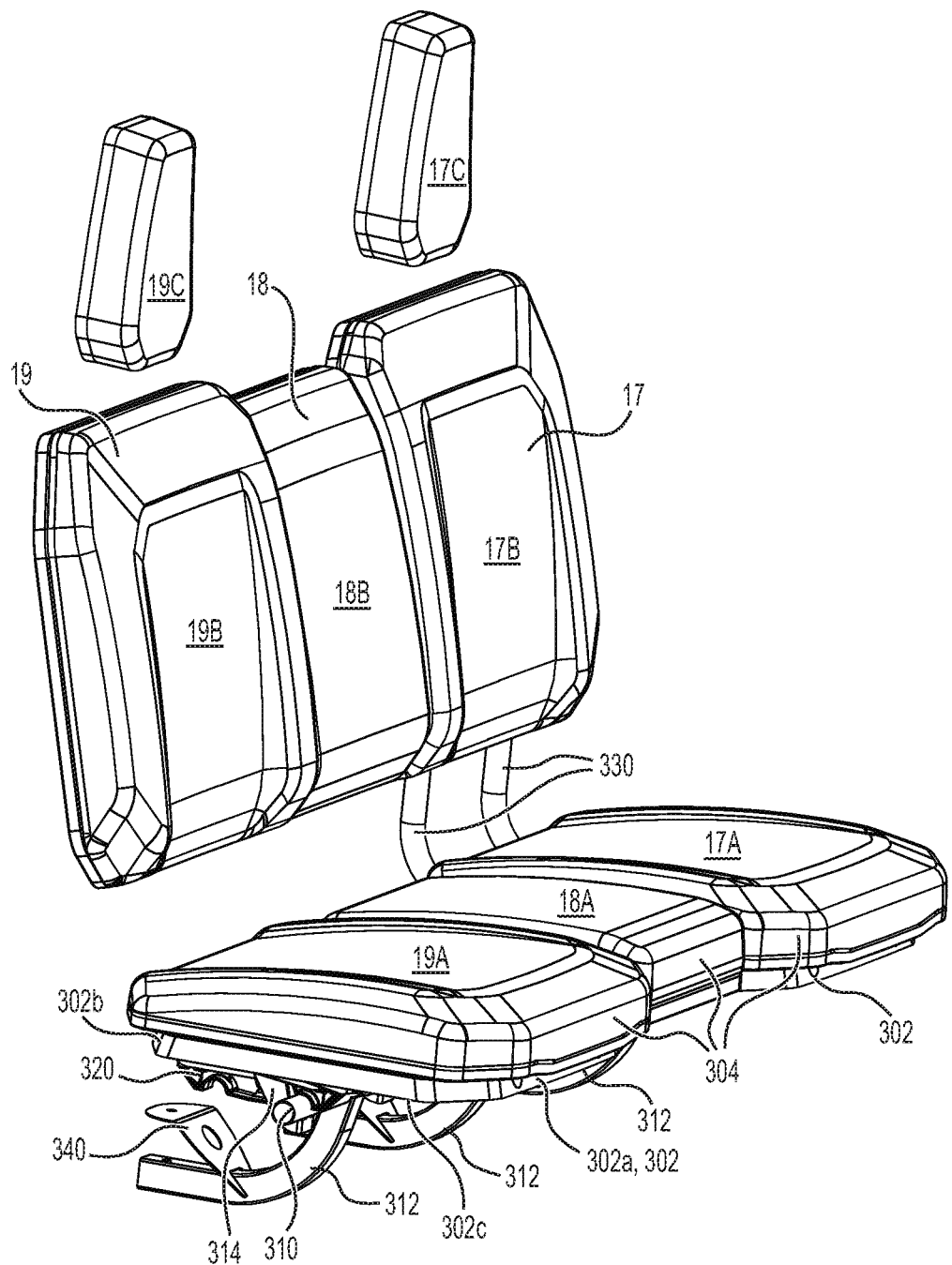
FIG. 6A is a perspective view, taken from a front, right side, of the left, middle and right seats of the vehicle of FIG. 1 with all the seats disposed in a seating position.
Figure 6B:
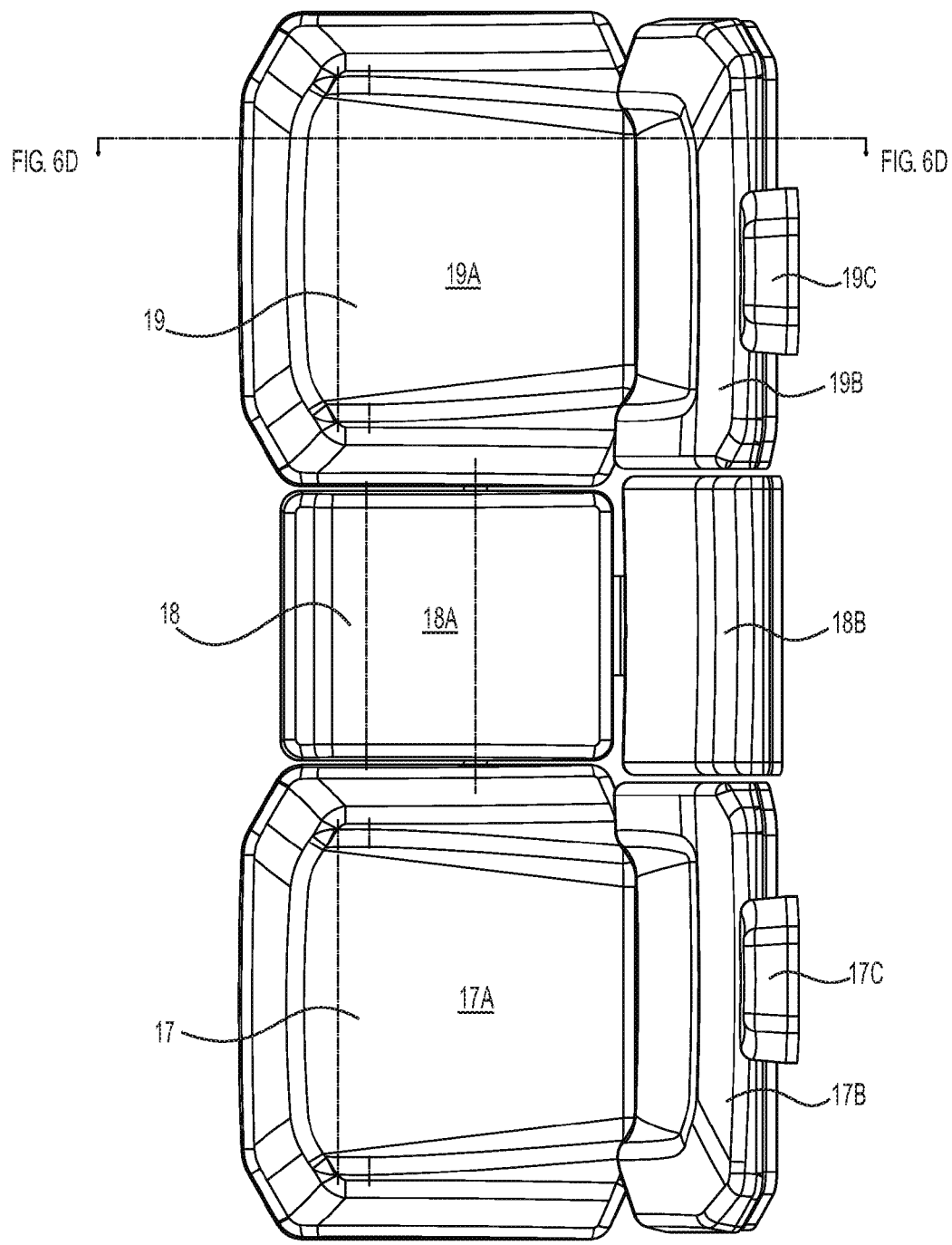
FIG. 6B is a top plan view of the seats of FIG. 6A.
Figure 6C:
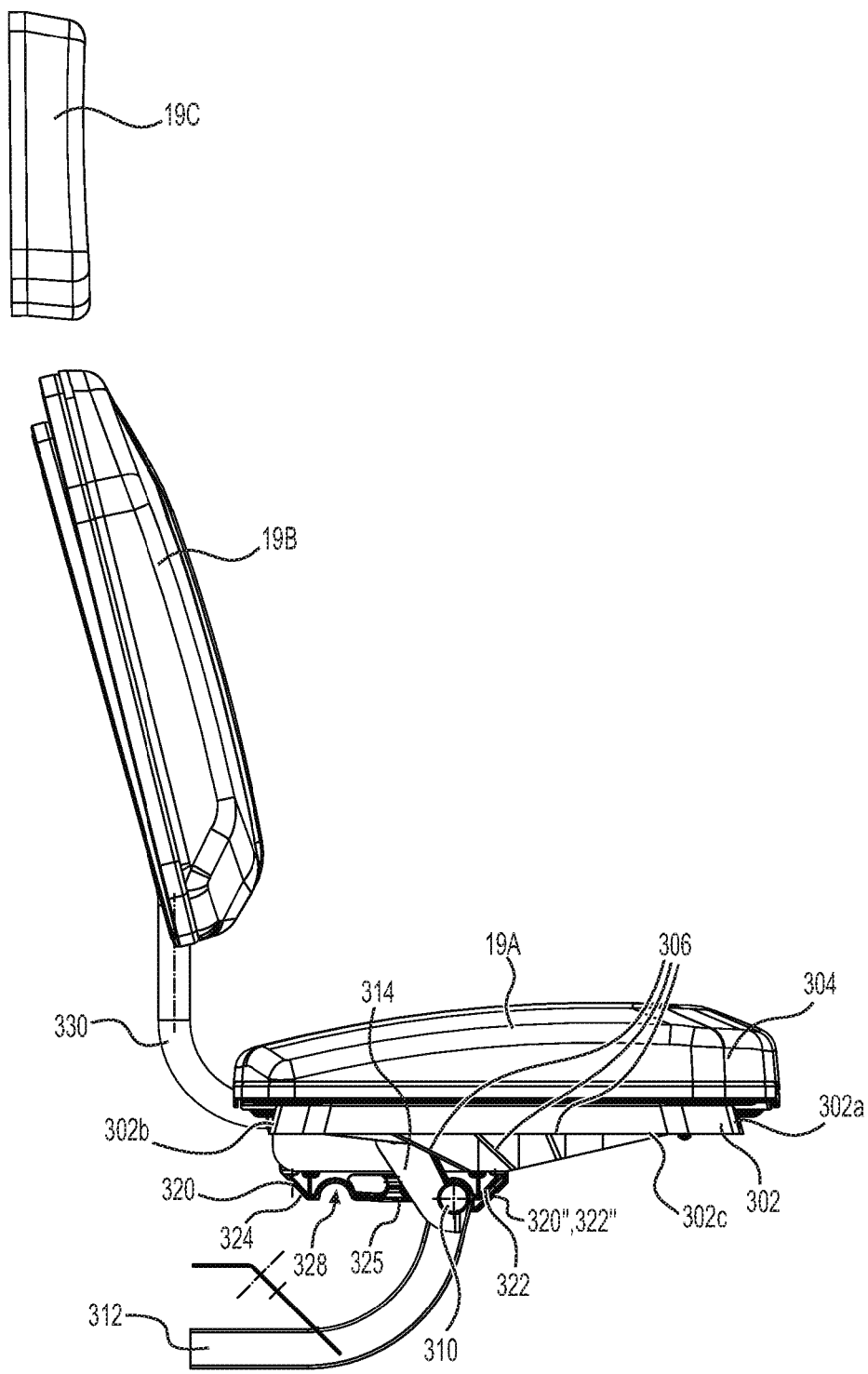
FIG. 6C is a right side elevation view of the seats of FIG. 6A.
Figure 6D:
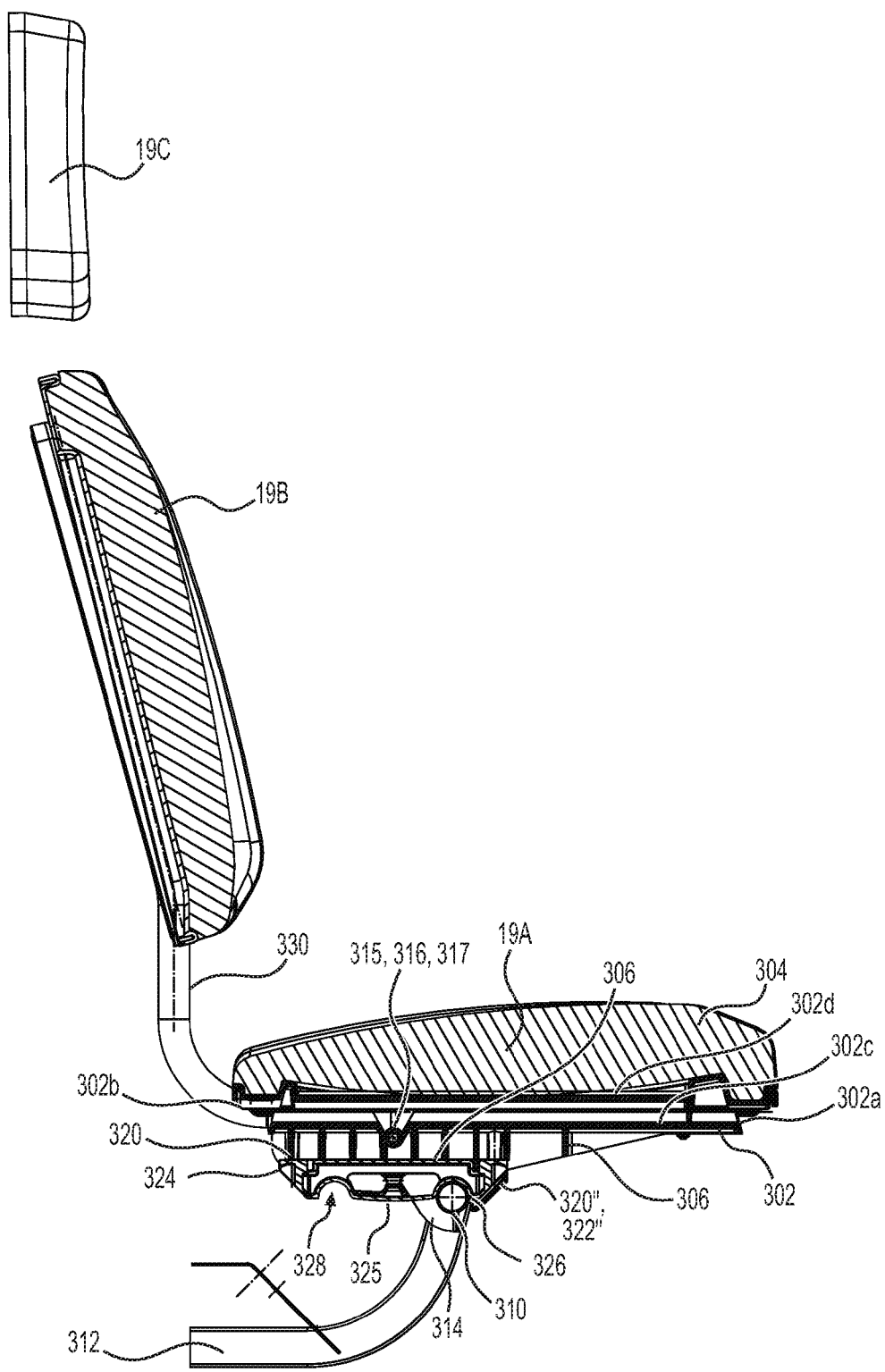
FIG. 6D is a cross-sectional view taken along the line 6D-6D of FIG. 6B.
Figure 7D:
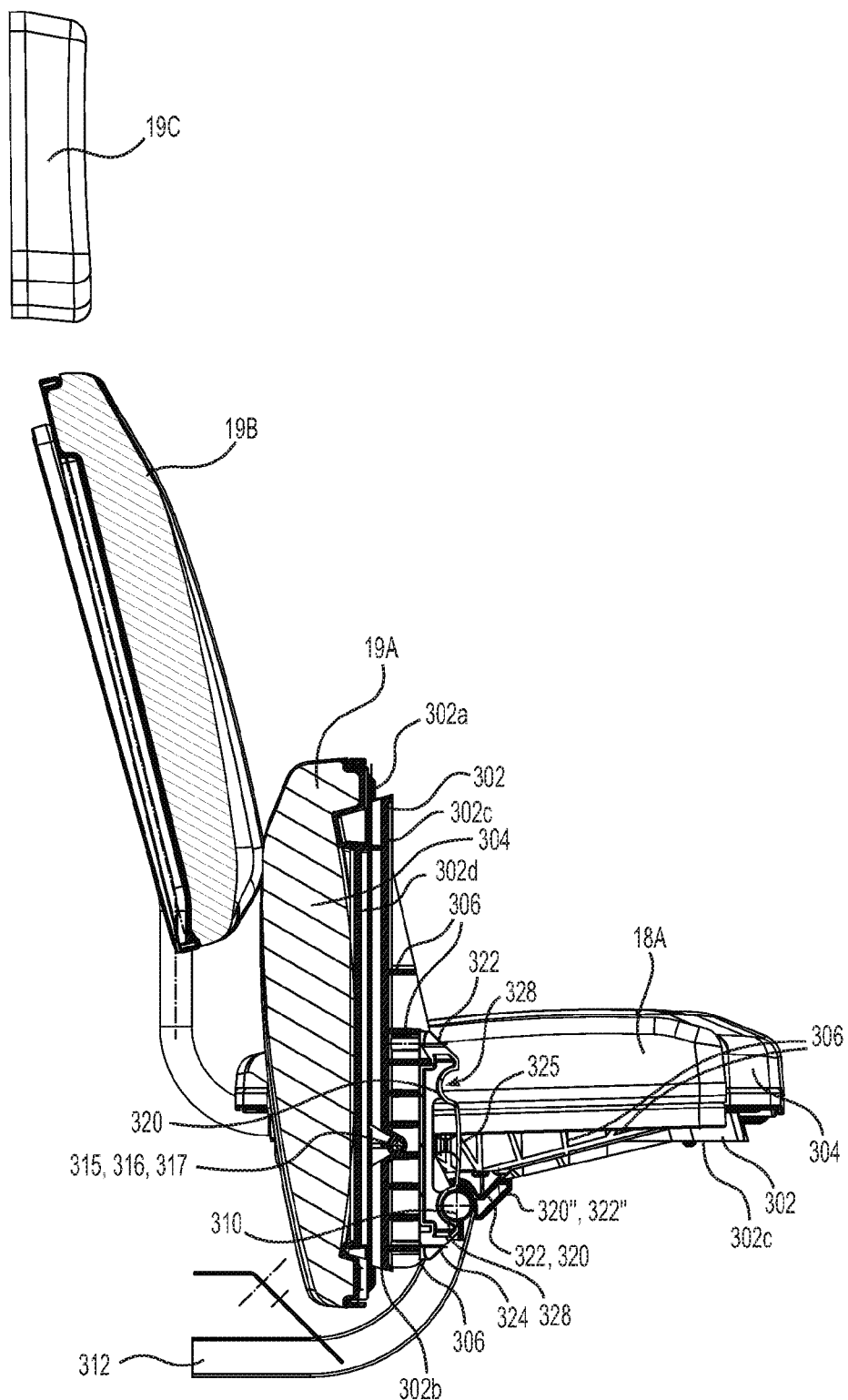
FIG. 7D is a cross-sectional view taken along the line 7D-7D of FIG. 7B.

With reference to FIG. 6D, when the seat base 19A is in a seating position, the pivot axis 315 is disposed below the seat cushion 304 and longitudinally between the front end 302a and the rear end 302b of the seat base frame 302. With reference to FIG. 7D, when the seat base 19A is in a storage position, the pivot axis 315 is disposed longitudinally forward of the seat cushion 304 and vertically between the front end 302a and the rear end 302b of the seat base frame 302. The pivot axis 315 is disposed vertically above and longitudinally rearward of the horizontal rod 310 in both positions. It is however contemplated that the seat base 19A could be configured differently than as discussed above. For example, the seat base 19A could be configured to pivot downwards to its storage position such that the pivot axis 315 is disposed longitudinally rearward of the seat base 19A. It is contemplated that the pivot axis 315 could be disposed above the seat base 19A in the seating position and rearward of the seat base 19A in the storage position (for a seat base 19A that pivots upwards to its storage position). It is contemplated that the pivot axis 315 could be disposed above the seat cushion 304 in the seating position and rearward of the seat cushion 304 in the storage position (for a seat base 19A that pivots downwards to its storage position). It is also contemplated that the pivot axis 315 could be disposed longitudinally rearward of the seat base 19A in one or both of the seating and storage positions.

With reference to FIG. 7A, a pair of retaining brackets 320 is connected to the lower seat base frame surface 302c. In the illustrated implementation, a retaining bracket 320 is connected to a rib 306 which has an attachment bracket 314 connected thereto. The retaining bracket 320 is disposed between the two flanges of attachment brackets 314 and is connected to the edge of the rib 306 such that the retaining bracket 320 extends outwardly from the rib 306. It is however contemplated that the brackets 314, 320 could be connected to the seat base frame 302 at other locations than as shown herein. It is contemplated that there could be one or more than two attachment brackets 314 connecting each seat base frame 302 to the rod 310. It is contemplated that there could be one or more than two retaining brackets 320 connecting each seat base frame 302 to the rod 310. It is contemplated that the retaining brackets 320 could be formed integrally with the seat base frame 302 and/or one of the ribs 306 disposed thereon.

The two retaining brackets 320 connected to each seat base frame 302 are identical to each other, as such, only the right one will be described herein.

Figure 8A:
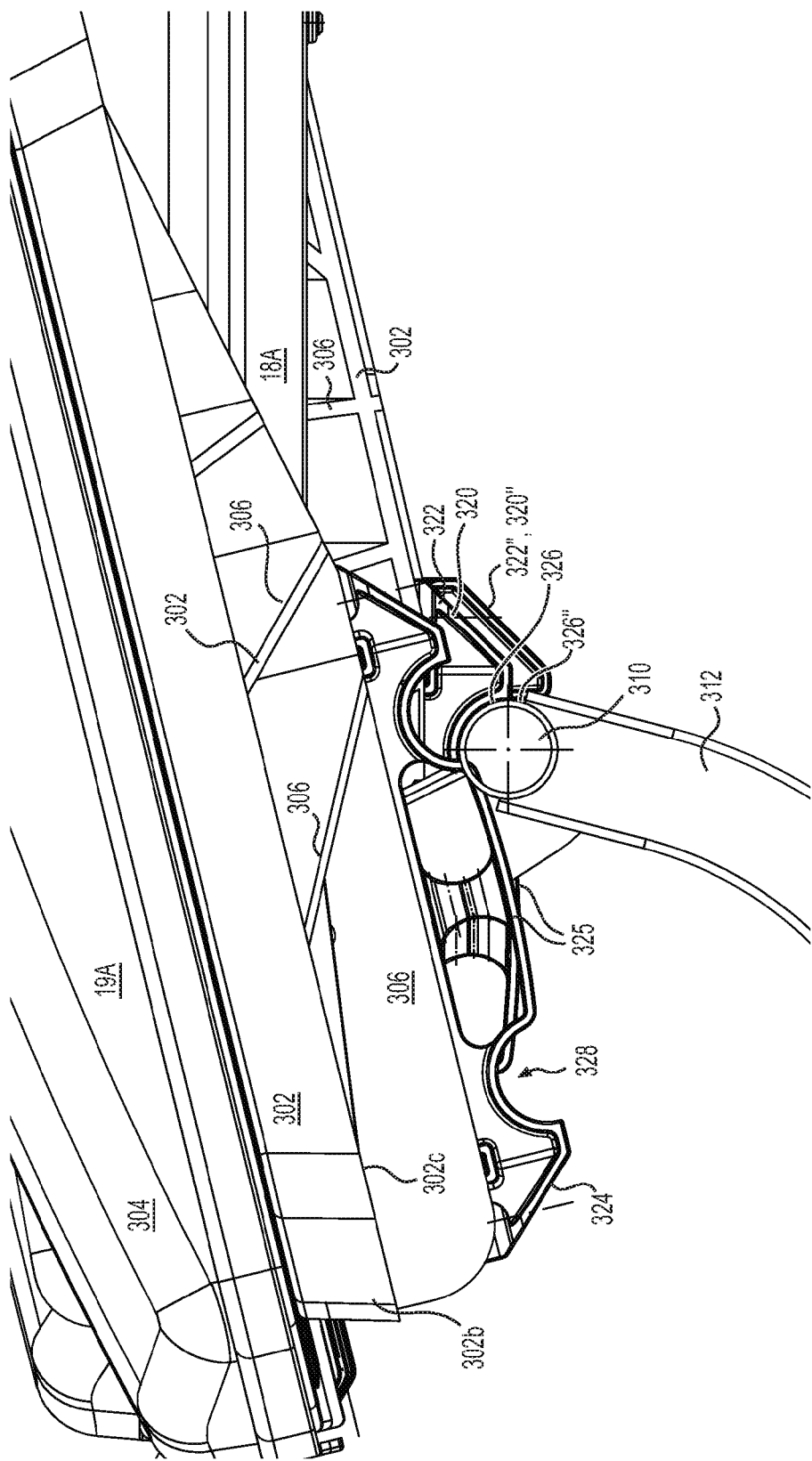
FIG. 8A is a close-up, right side elevation view of the of the left, middle and right seats of the vehicle of FIG. 1 with the left and middle seats disposed in a seating position and the right seat disposed in an intermediate position slightly prior to being placed in a seating position.

With reference to FIGS. 8A to 8C, the retaining bracket 320 has a front end 322 disposed closer to the front end 302a of the seat base frame 302, a rear end 324 disposed closer to the rear end 302b of the seat base frame 302. When the seat base 18A, 19A is disposed in the seating position, the front end 322 is disposed forward of the rear end 324. When the seat base 19A is in a storage position, the front end 322 is disposed above the rear end 324.

With reference to FIGS. 8A to 8C, the retaining bracket 320 has a retaining surface 325 extending between the front and rear ends 322, 324 and spaced from the rib 306. The retaining surface 325 has a groove 326 near its front end 322 and another groove 328 near its rear end 324. In the illustrated implementation, the grooves 326, 328 are generally semi-circular but it is contemplated that the grooves 326, 328 could have a different shape than that shown herein as long as the shape provides sufficient contact between the rod 310 and the surface of the grooves 326, 328 to prevent rattling of the rod 310 when it is received in the groove 326, 328. With reference to FIGS. 6A to 6D, when the seat base 19A is disposed in a seating position, the retaining surface 325 between the grooves 326, 328 extends generally horizontally and the grooves 326, 328 extends upwards from the retaining surface 325 towards the seat cushion 304. When the seat base 19A is disposed generally horizontally in a seating position, the rod 310 is received in the front groove 326, which is therefore referred to herein as the seating position groove 326. When the seat base 19A is disposed in a storage position (FIGS. 7A to 7D and 8C), the rod 310 is received in the rear groove 328, which is therefore referred to herein as the storage position groove 328.

With reference to FIG. 8A, just before the seat base 19A is placed in the seating position, the rod 310 is in contact with the portion of the retaining surface 325 adjacent the rear edge of the seating position groove 326. The rod 310 can be retainingly received into the seating position groove 326 by applying a downward force to the front portion of the seat base 19A so as to press the rod against the retaining surface 325 adjacent the rear edge of the seating position groove 326. The rear edge of the seating position groove 326 is slightly deformed (as seen in FIG. 8A) by the rod 310 pressing against it, thereby allowing the retaining surface 325 to slide further against the rod 310 until the rod 310 is received into the seating position groove 326.

With reference to FIGS. 6C and 6D, the spacing between the grooves 326 and the pivot axis 315 defined by the attachment brackets 314 ensures that when the seat base 19A is in the seating position, and in the absence of an external force being applied to the front portion of the seat base 19A, the rod 310 pushes into the surface of the groove 326, thereby preventing the surface of the groove 326 from sliding against the rod 310 and possibly resulting in the rod 310 disengaging from the groove 326. The rod 310 is thus retained in the seating position groove 326 in the absence of an upward force being applied to the front portion of the seat base 19A. The rod 310 pushing into the groove surface 326 also prevents any slight relative movement between 326 and 310 that could cause unwanted noise "rattling" of the seat base 19A when disposed in the seating position. The rod 310 can be disengaged from the seating position groove 326 by applying an upward force to the front portion (i.e. the portion near the front end 302b) of the seat base 19A so that the rod 310 presses rearwards against the surface of the seating position groove 326 along its rear edge, thereby deforming the rear edge surface of the seating position groove 326 and allowing the groove 326 to slide past the rod 310. The rod 310 is thus no longer retained in the seating position groove 326 and the seat base 19A is no longer retained in the seating position.

As can be seen in FIG. 8B, just before the seat base 19A is placed in the storage position, the seat base 19A is disposed such that the rod 310 is in contact with the portion of the retaining surface 325 adjacent the front edge of the storage position groove 328. When a rearward and/or upward force is applied on the front portion of the seat base 19A (i.e. the portion near the front end 302a), the rod 310 presses against the front edge of the storage position groove 328. The front edge of the storage position groove 328 is slightly deformed (as seen in FIG. 8B) by the rod 310 pressing against it, thereby allowing the retaining surface 325 to slide further against the rod 310 until the rod 310 is received into the storage position groove 328.

With reference to FIG. 7D, the spacing between the storage position groove 328 and the pivot axis 315 defined by the attachment brackets 314 ensures that when the seat base 19A is in a storage position, and in the absence of an external force being applied to the front portion of the seat base 19A, the rod 310 pushes rearward into the surface of the storage position groove 328, thereby preventing the surface of the groove 328 from sliding against the rod 310 and possibly resulting in the rod 310 disengaging from the storage position groove 328. The seat base 19A is thus retained in the storage position in the absence of an external force being applied to the front portion of the seat base 19A. The rod 310 pushing into the storage position groove surface 328 also prevents rattling of the seat base 19A when disposed in the storage position. The rod 310 can be disengaged from the storage position groove 328 by applying a forward and/or downward force to the front portion of the seat base 19A so that the rod 310 presses against the front surface of the storage position groove 328, thereby slightly deforming it. The retaining surface 325 then continues to slide against the rod 310 until the surface of the storage position groove 328 is no longer in contact with the rod 310, at which point, the rod 310 is no longer retained in the storage position groove 328 and the seat base 19A is no longer retained in the storage position.

With reference to FIGS. 8A and 8B, the portion of the retaining surface 325 adjacent the front edge of the storage position groove 328 and the rear edge of the seating position groove 326 is resiliently deformable, as can be seen in FIGS. 8A and 8B. The resilient deformation of the retaining surface 325 at the edges of the grooves 326, 328 allows the retaining surface 325 at the edges of the grooves 326, 328 to slide past the rod 310, such that the rod 310 can be received into the groove 326 or 328, and once received in the groove 326 or 328, to be retained therein. The surfaces of the grooves 326, 328 are also resiliently deformable in order to allow the grooves 326, 328 to slide past the rod 310, and to thereby disengage the rod 310 from the grooves 326, 328. In the illustrated implementation, the retaining bracket 320 is formed of acetal, which is resiliently deformable. It is contemplated that other suitable materials could be used to form the retaining bracket 320, and/or that only the retaining surface 325, or a portion thereof is resiliently deformable.

With reference to FIGS. 6A to 8C, the pivoting mechanism for the seat base 19A described above positively retains the seat base 19A in the storage position as well as in the seating position. In the illustrated implementation, the rod 310 serves as a retaining member as well as a support member by which the seat base 19A is connected to the frame 12. Using the support member 310 as a retaining member 310 reduces the number of components used in the vehicle 10 and thereby limits an increase in weight of the vehicle 10. It is however contemplated that the vehicle 10 could have separate support member and retaining member.

With reference to FIGS. 6A to 7D, in the illustrated implementation of the vehicle 10, the driver's seat base 17A is not pivotable. A pair of tubular members 330 rigidly connect the rear surface of the seat back 17B to the lower surface 302c of the seat base 17A. It is contemplated that the driver's seat base 17A could also be pivotable, in which case the members 330 rigidly connecting the driver seat base 17A to the drive seat back 19B would be omitted. The driver seat base 17A is also connected to the frame member 256 (FIG. 3D, 10A) by a pair of retaining brackets 320" attached to the lower surface 302c of its seat base frame 302. With reference to FIGS. 6C, 6D, and 7C to 8C, each retaining bracket 320" is similar to the retaining bracket 320 of the middle and left seat bases 18A, 19A except that the storage position groove 328 has been omitted, and the bracket 320" is slightly larger in size, with the front end 322" extending closer to the front end 302a of the seat base frame 302 than the front end 322 of the brackets 320. The seating position groove 326" of the bracket 320' is identical to the seating position grooves 326 of the retaining brackets 320 and receives the rod 310 in the same way as the retaining brackets 320.

Figure 3C:
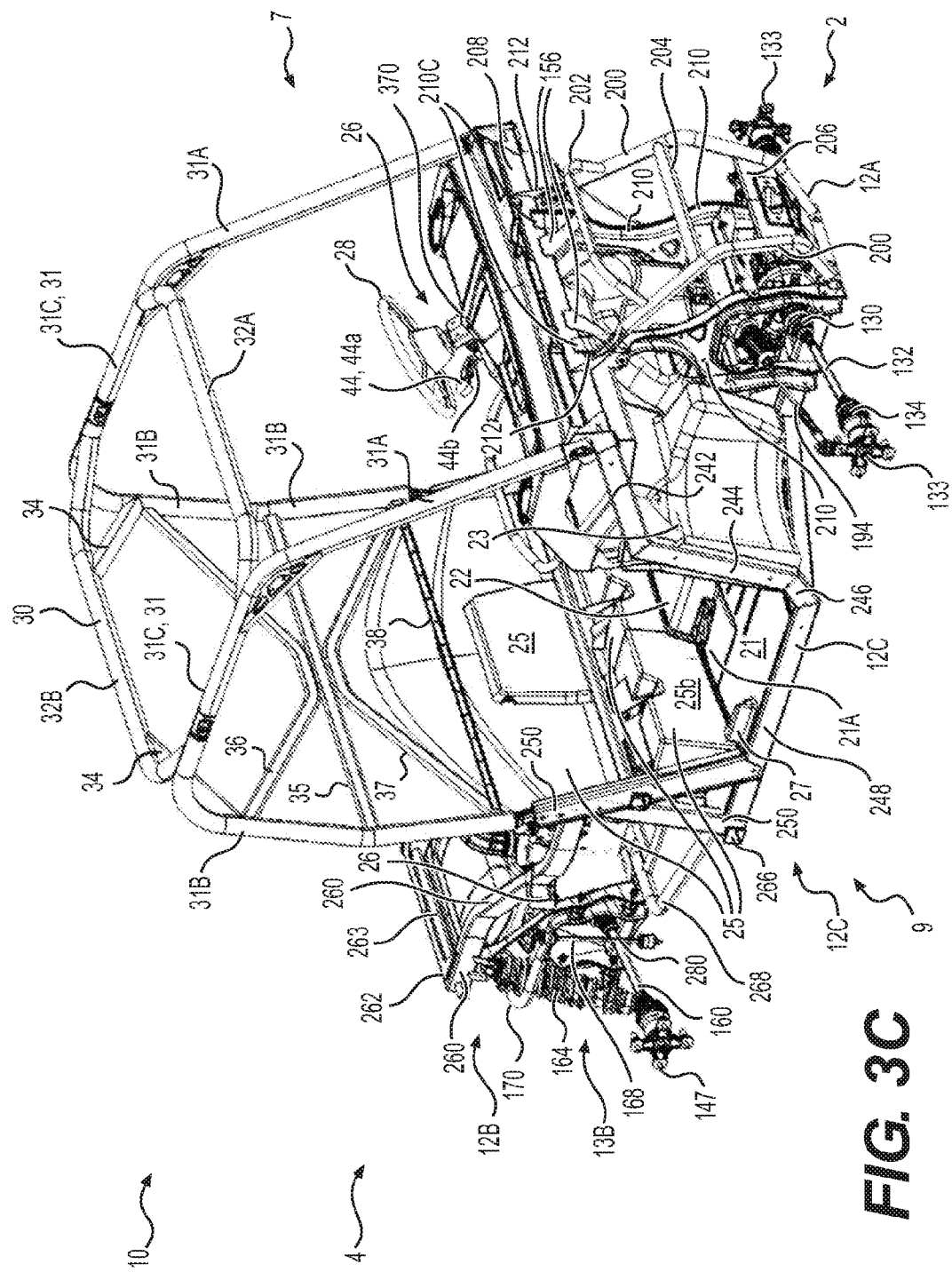
FIG. 3C is a perspective view, taken from a front, right side of the vehicle portion of FIG. 3A with the seats removed for clarity.
Figure 3D:
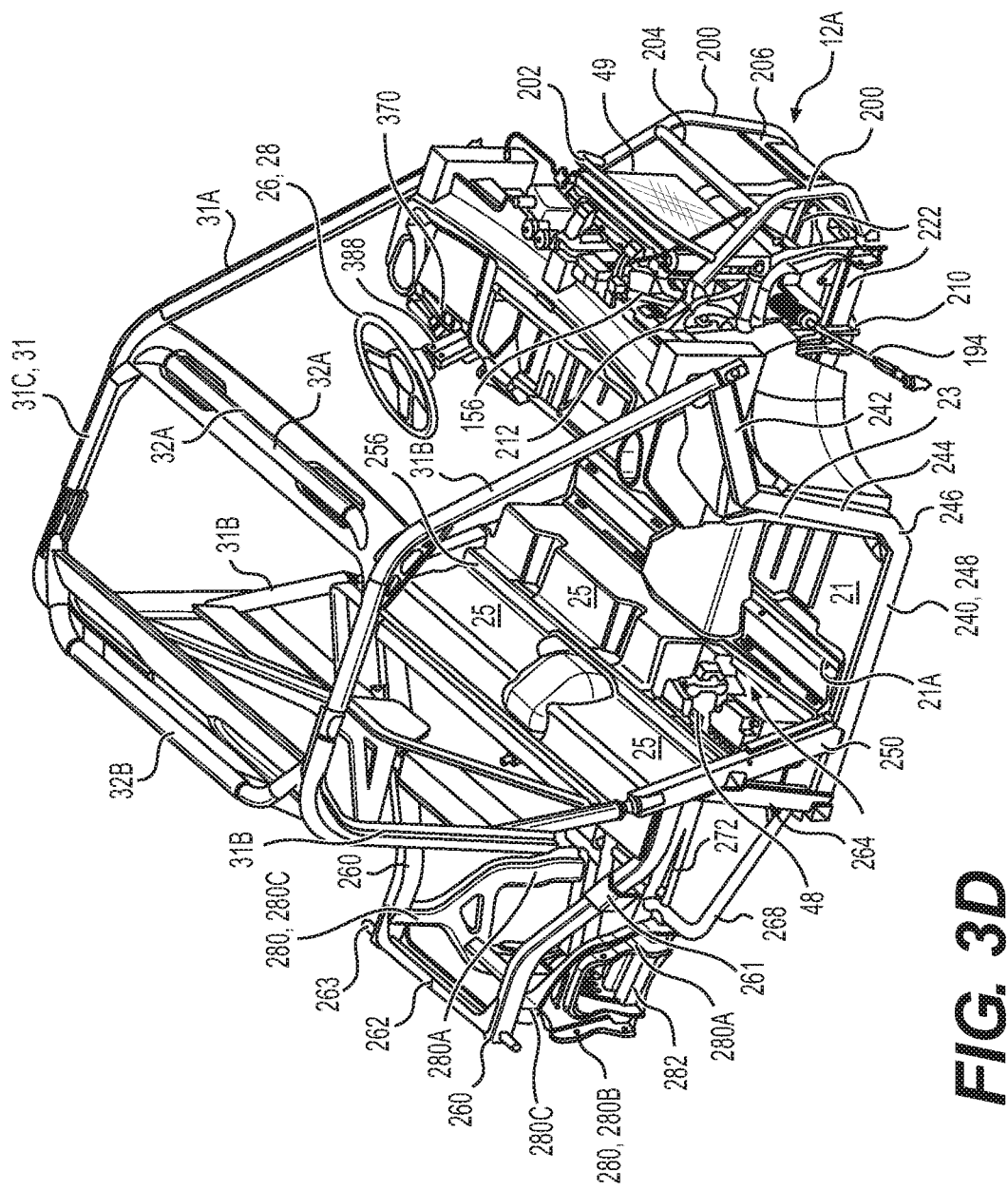
FIG. 3D is a perspective view, taken from a front, right side of the vehicle portion of FIG. 3C including a radiator and with a detachable portion of the firewall removed to show the battery of the vehicle.
Figure 3E:
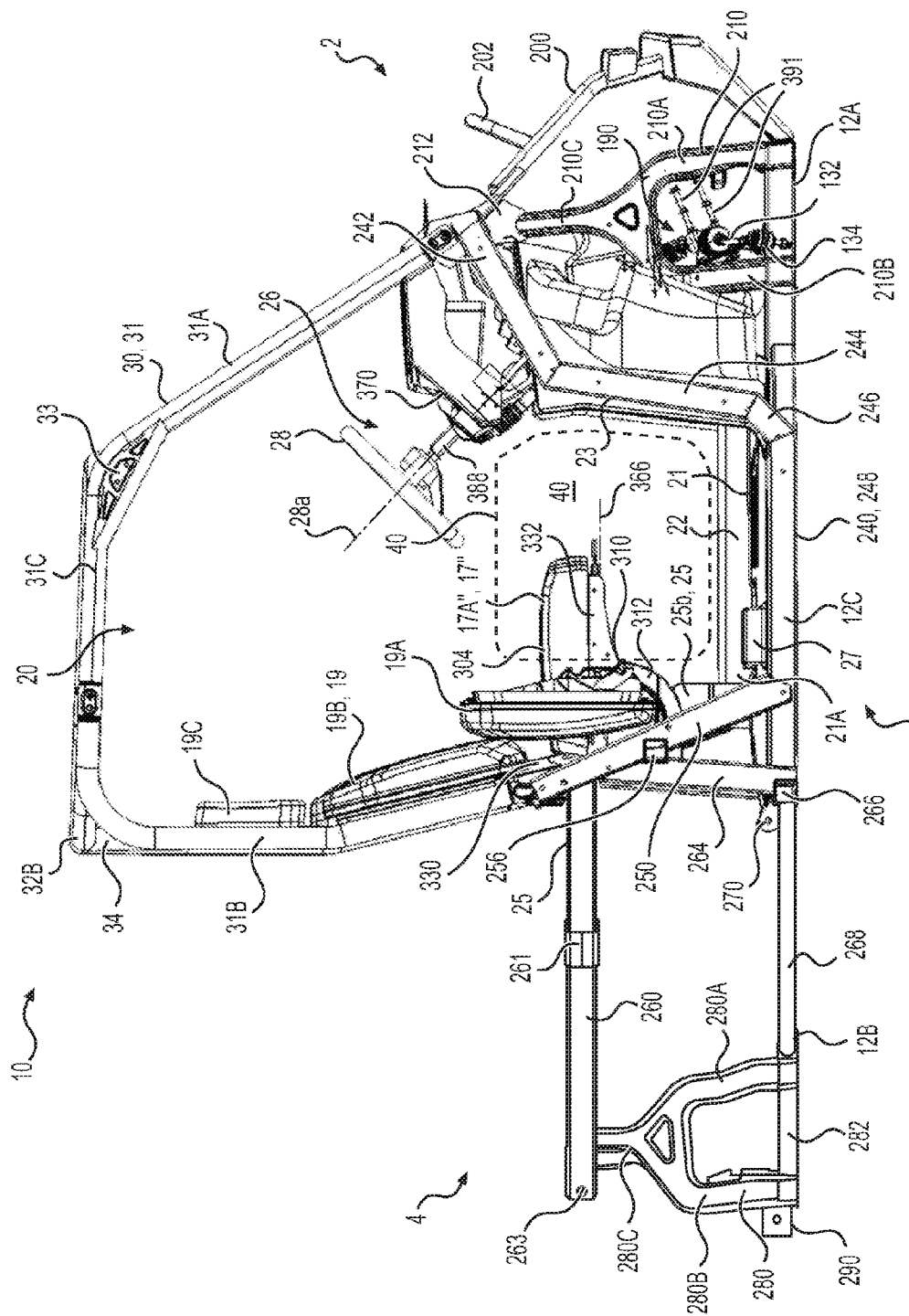
FIG. 3E is a right side elevation view of the vehicle portion of FIG. 3A showing another implementation of a driver seat.

With reference to FIG. 3E, a different implementation of a driver seat 17" will now be described. The driver seat 17" is similar to the driver seat 17 described above. Corresponding and similar features of the driver seat 17" and the driver seat 17 have been labeled with the same reference numbers and will not be described again herein. The driver seat base 17A" of the driver seat 17" is slidably connected to the frame 12 by a mounting member 332. The seat base frame (not shown) is slidably connected to the mounting member 332 so that the seat base 17A" can be moved longitudinally forward or rearward depending on the driver's preference.

The roll cage 30 will now be described with reference to FIGS. 2C and 3C. As can be seen in FIG. 2C, the roll cage 30 has a left side support structure 31 disposed on the left side 7 of the vehicle 10 and a right side support structure 31 disposed on the right side 9 of the vehicle 10. Each of the left and right side support structures 31 is formed as an inverted U-shaped structure having a front arm 31A extending upwards from the frame 12, an upper arm 31C extending rearwards from the front arm 31A, and a rear arm 31B extending downwards from the upper arm 31C to the frame 12. A front lateral arm 32A extends laterally across the vehicle 10 above the left and right side front arms 31A, and is connected to the respective front portions of the left and right side upper arms 31C. A rear lateral arm 32B extends laterally across the vehicle 10 above the left and right side rear arms 31B, and is connected to the respective rear portions of the left and right side upper arms 31C. A reinforcement bracket 33 is connected to the upper arm 31C and the front arm 31A at the connection therebetween. A reinforcement member 34 extends from an upper portion of the right side rear arm 31B to a right side portion of the rear lateral arm 32B. Similarly, a reinforcement member 34 extends from an upper portion of the left side rear arm 31B to a right side portion of the rear lateral arm 32B. A cross member 35 extends laterally and horizontally between the left and right rear arms 31B. The left and right ends of the cross member 35 are respectively connected to the middle portions of the left and right rear arms 31B. The cross member 35 is connected to the upper portions of the backrests 17B, 18B, 19B. The cross member 35 is additionally connected to the left and right rear arms 31B by an upright V-shaped member 36 and an inverted V-shaped member 37. The upright V-shaped cross member 36 has a left arm extending upwardly and leftwardly from the cross member 35 to the upper portion of the left side rear arm 31B and a right arm extending upwardly and rightwardly from the cross member 35 to the upper portion of the right side rear arm 31B. The driver headrest 17C is connected to the left arm of the member 36 and the passenger headrest 19C is connected to the right arm thereof. The inverted V-shaped cross member 37 has a left arm extending leftwardly and downwardly from the cross member 35 to the lower portion of the left rear arm 31B, and a right arm extending rightwardly and downwardly from the cross member 35 to the lower portion of the right rear arm 31B. A member 38 (FIG. 3C) extends laterally and horizontally between the lower portions of the rear arms 31B. The cross member 38 is connected to the lower portions of the backrests 17B, 18B, 19B. The roll cage 30 also includes a pair of lateral restraining members 39 (FIG. 2F). Each lateral restraining member 39 extends forward from the rear arm 31B, then downward and rearward to connect to the frame 12. It is contemplated that the lateral restraining members 39 could have a different shape. It is contemplated that the roll cage 30 could have a structure other than as shown herein.

With reference to FIGS. 1 to 2E, the vehicle 10 also includes a cargo box 41 disposed rearwardly of the cockpit area 20 in addition to the storage space 40 provided in the cockpit area 20, and the storage boxes 42, 43 provided for use therein. The cargo box 41, which is mounted to the rear frame portion 12C, is generally rectangular and opened at the top. It is contemplated that the cargo box 41 could have a top cover, and could have a different shape than that shown herein. The front end of the cargo box 41 is secured to the rear frame portion 12C by latches 41a (FIGS. 1 and 2A) connected between the cargo box 41 and the frame 12. Each latch 41a is rotatable about a horizontal and lateral axis e to selectively engage a bracket 261 extending laterally outwardly from the frame 12. The left latch 41a can be seen in a latched position (41a') and unlatched position (41a") in FIG. 1. The rear end of the cargo box 41 extends rearwardly of the rear frame portion 12C and the rear wheels 14B. The cargo box 41 has a pair of brackets 41b extending downwards from its lower surface (the left bracket 41a can be seen in FIG. 1). The brackets 41b are disposed longitudinally rearward and laterally inward of the brackets 41a. The left and right brackets 41b are pivotably connected to the left and right ends respectively of a horizontal rod 263 (FIG. 2B, 2F) extending laterally at the rear end of the frame 12 such that the front end of the cargo box 41 can be pivoted upwards (as seen in FIG. 2F) to access the engine 50 and other internal components of the vehicle 10 located thereunder, or to unload the contents of the cargo box 41. A pneumatic piston extending upwards from the rear frame portion 12C is connected to the lower surface of the cargo box 41 in order to pivot the cargo box 41 and to support the cargo box 41 in its pivoted position as seen in FIG. 2F. It is contemplated that the cargo box 41 could be omitted.

With reference to FIGS. 4A to 5F, internal components of the vehicle 10 will be described in more detail.

Figure 4B:
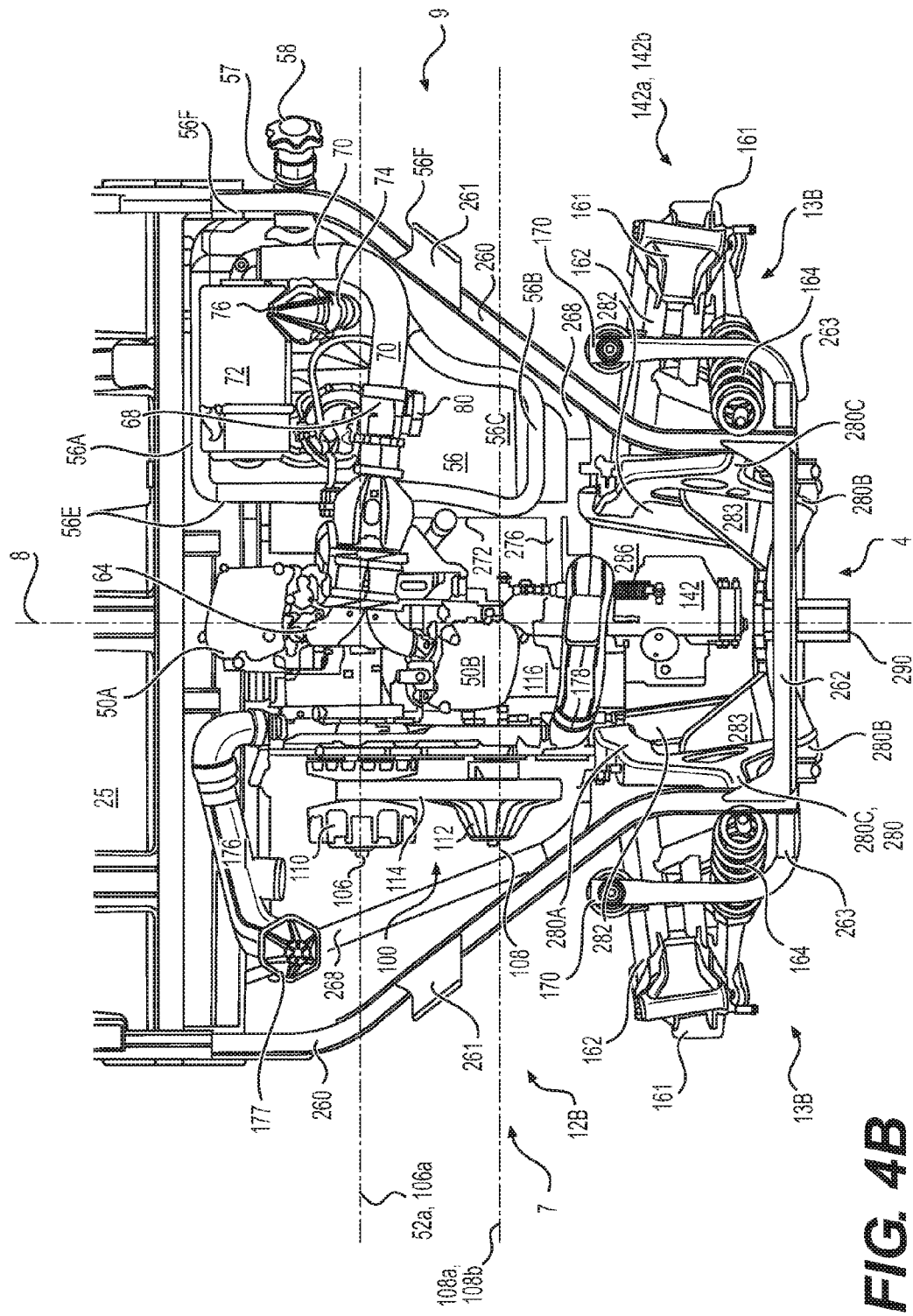
FIG. 4B is a top plan view of the vehicle portion of FIG. 4A with the firewall removed for clarity.
Figure 4C:
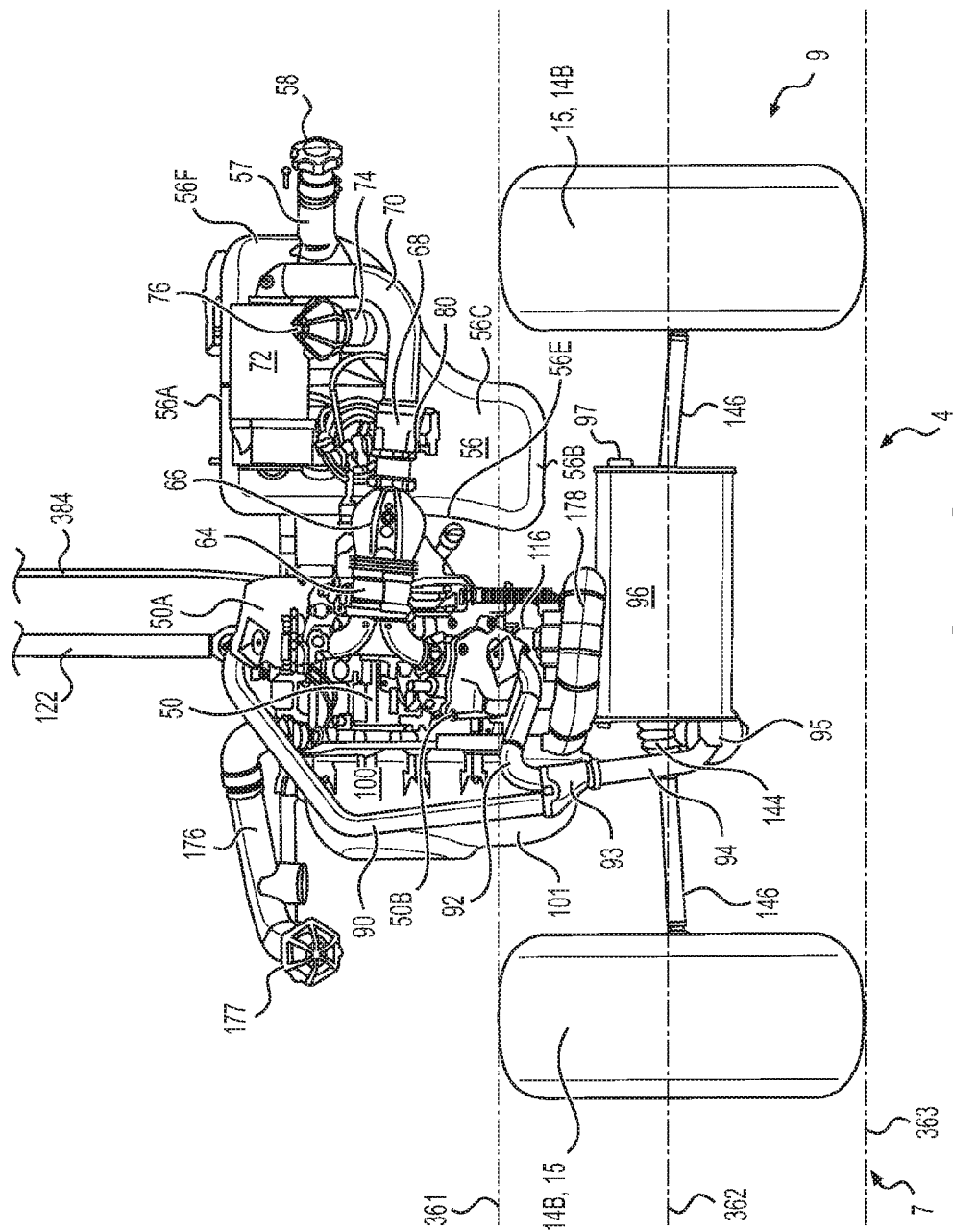
FIG. 4C is a top plan view of the vehicle portion of FIG. 4B with the frame removed for clarity and including an exhaust system and the rear wheels.
Figure 4D:
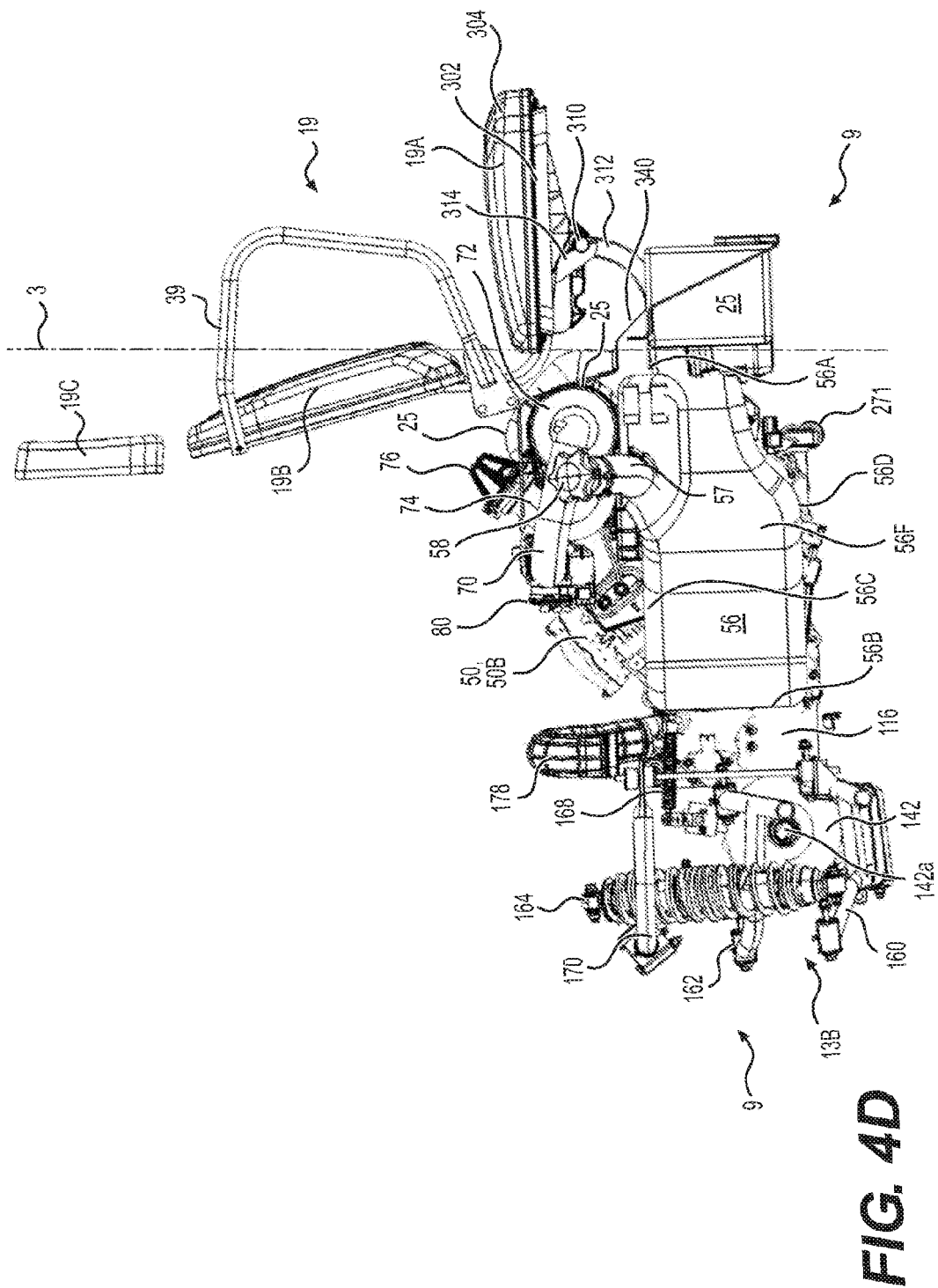
FIG. 4D is a right elevation view of the seats, the firewall, the rear suspension, the engine and other components of the vehicle of FIG. 1.

As can be seen in FIGS. 4A, 4B and 4D, the engine 50 is disposed longitudinally rearward of the cockpit area 20 and mounted to the rear frame portion 12B such that the longitudinal centerplane 8 intersects the engine 50. It is also contemplated that the engine 50 could selectively switch between driving two wheels 14A or 14B, and driving four wheels 14A and 14B. The engine 50 is a four-stroke V-twin engine. Accordingly, the engine 50 has two cylinders 50A, 50B extending at an angle from each other. The engine 50 has a output shaft (not shown) that rotates about an output shaft axis 52 extending horizontally and laterally. The front cylinder 50A extends upwardly and forwardly with respect to a vertical plane 52a containing the output shaft axis 52. The rear cylinder 50B is disposed leftwardly of the front cylinder 50A, and extends upwardly and rearwardly with respect to the plane 52a. It is contemplated that other types of engines could be used. For example, the engine 50 could be a two-stroke engine with in-line cylinders. The engine 50 is operatively connected, via a drivetrain, to the two front wheels 14A as well as the two rear wheels 14B to drive the SSV 10. It is contemplated that the engine 50 could be operatively connected only to the front wheels 14A or only to the rear wheels 14B. The drivetrain will be described below.

With reference to FIGS. 4A to 4D, the engine 50 receives fuel from a fuel tank 56 disposed on the right side of the engine 50 behind the passenger seat base 19A. The fuel tank 56 has a front surface 56A disposed longitudinally forward of the front cylinder 50A and a rear surface 56B is disposed longitudinally rearward of the rear cylinder 50B. The rear surface 56B is also disposed longitudinally rearward of a plane 108b containing a driven pulley axis 108a (FIG. 5C) of a driven pulley 108 of a continuously variable transmission (CVT) 100. The right seat back 19B is disposed above the front surface 56A as can be seen in FIG. 4D. The fuel tank 56 has a top surface 56C, a bottom surface 56D, a left surface 56E, and a right surface 56F, each of which extends continuously between the front and rear surfaces 56A, 56B. The top surface 56C is disposed vertically higher in the front portion adjacent the front surface 56A than in the rear portion adjacent the rear surface 56B. The top surface 56C of the fuel tank 56 is disposed vertically lower than the bottom surface of the right seat base 19A. The bottom surface 56D is disposed vertically higher in its front portion adjacent the front surface 56A than in the rear portion adjacent the rear surface 56B. The left surface 56E of the fuel tank 56 extends generally longitudinally from the front surface 56A to the rear surface 56B. The right side surface 56F is disposed further rightwardly in its front portion adjacent the front surface 56A than in its rear portion adjacent the rear surface 56B. The lateral separation between the left and right surfaces 56E, 56F is greater in the front portion of the fuel tank 56 than in the rear portion thereof. The fuel tank 56 has a filler neck 57 extending upwardly and rightwardly from an upper portion of its right side surface 56F. The opening of the filler neck 57 which is covered with a cap 58 is disposed rightwardly of the firewall 25 when viewed from the top as in FIG. 4A.

With reference to FIGS. 4A to 4D, the engine 50 receives air via an air induction system disposed above the fuel tank 56. The air induction system includes an intake manifold 64 connected to the two cylinders 50A, 50B, an intake conduit 66 connected upstream of the intake manifold 64, a throttle body 68 connected upstream of the intake conduit 66, an intake conduit 70 connected upstream of the throttle body 68, an air box 72 connected upstream of the intake conduit 70, and a conduit 74 connected upstream of the air box 72. When the engine 50 is operating, air flows consecutively through the right-angle conduit 74, the air box 72, the intake conduit 70, the throttle body 68, the intake conduit 66, the intake manifold 64 and then enters the air intake ports of the cylinders 50A, 50B of the engine 50. A majority of the air induction system extends on a right side of the longitudinal centerplane 8 which intersects the manifold 64.

With reference to FIGS. 4A to 4D, the intake manifold 64 is disposed longitudinally between the front and rear cylinders 50A, 50B and separates the flow of air from the intake conduit 66 into two branches. One branch of the intake manifold 64 is connected to an air intake port in a front surface of the rear cylinder 50B and the other branch is connected to an intake port in the rear surface of the front cylinder 50A. The longitudinal centerplane 8 passes through the two branches of the intake manifold 64.

With reference to FIGS. 4A to 4D, the intake conduit 66 which extends rightwardly from the manifold 64 to the throttle body 68, is generally ellipsoidal so as to act as a plenum chamber that equalizes the pressure of the air being supplied to the engine 50 to account for the variations in air demand by the engine 50. The intake conduit 66 also acts as an acoustic silencer device to reduce the noise generated by the engine 50 that escapes from the air induction system.

With reference to FIGS. 4A to 4D, the cylindrical throttle body 68 is disposed such that its cylindrical axis is oriented generally horizontally and laterally. The throttle body 68 includes a throttle valve (not shown) in the form of a throttle plate that pivots about an axis transverse to the cylindrical throttle body axis to regulate a flow of air to the engine 50. An electric motor 80, mounted to a rear surface of the throttle body 68, is operatively connected to the throttle plate to pivot the throttle plate inside the throttle body 68. A throttle valve position sensor (not shown) senses the position of the throttle plate, and hence air flow through the throttle body 68. The electric motor 80 positions the throttle plate based at least in part on a position of a throttle pedal 46 (FIG. 2C) of the vehicle 10. The throttle pedal 46 is located in front of the driver seat 17A above the cockpit floor 21, below the steering wheel 28 and adjacent the brake pedal 47. The throttle pedal 46 is connected to a throttle pedal position sensor which senses a position of the throttle pedal 46 and sends a signal representative of the throttle pedal position to a control unit (not shown) which controls the electric motor for regulation of the throttle valve.

With reference to FIGS. 4A to 4D, the intake conduit 70 extends rightwardly from the right end of the throttle body 68, then forwardly and finally leftwardly to connect to a right side surface of the airbox 72. The airbox 72 is positioned behind the right seat 19 and is supported on the upper surface 56C of the fuel tank 56 as can be seen in FIG. 4D. The central cylindrical axis of cylindrical airbox 72 extends horizontally and laterally. The conduit 74 is connected to an intake port in a rear portion of the curved surface of the cylindrical airbox 72. The conduit 74 extends rearwardly from the airbox 72 and then upwardly and forwardly above the airbox 72. The inlet at the upper end of the conduit 74 is disposed above the horizontal portion of the upper firewall 25. The inlet which receives air from the atmosphere is covered with a grill 76 shaped like a conical frustum to prevent entry of large debris into the conduit 74 and thereby into the air induction system. The air box 72 contains at least one air filter (not shown) therein to filter dust and other foreign particles from the air to be supplied to the engine 50.

An exhaust system, shown in FIG. 4C, delivers the exhaust gases from the engine 50 to the atmosphere. The exhaust system includes exhaust conduits 90, 92, 94, an exhaust manifold 93, and a muffler 96. The exhaust conduit 90 is connected to an exhaust port defined on the front surface of the front cylinder 50A of the engine 50. From this exhaust port, the exhaust pipe 90 extends rearwardly and leftwardly, and then rearwardly above the CVT 100 and connects to an inlet of the exhaust manifold 93. The exhaust conduit 92 is connected to an exhaust port defined in the rear surface of the rear cylinder 50B of the engine 50. From this exhaust port, the exhaust conduit 92 extends leftwardly and forwardly and then bends toward the rear to connect to another inlet of the exhaust manifold 93. The inlets of the exhaust manifold 93 face towards the front 2 of the vehicle 10. The outlet of the exhaust manifold 93, which faces towards the rear 4 of the vehicle 10, is connected to the exhaust conduit 94. From the exhaust manifold 93, the exhaust conduit 94 extends generally rearwardly to connect to the muffler 96. The muffler 96, which is in the shape of an elliptical cylinder (as can be seen in FIGS. 1, 2A and 4C) is disposed laterally between the left and right rear wheels 14B with its central cylindrical axis extending generally normal to the longitudinal centerplane 8. As can be seen in FIGS. 1 and 2A, the muffler 96 extends vertically above the rear wheels 14B when the wheels 14B are disposed on level ground and in the absence of a load being carried by the vehicle 10. As can be seen in FIG. 4C, when the vehicle 10 is steered in a straight ahead direction, a vertical plane 361 passing through a front edge of the rear wheels 14B is disposed longitudinally forward of the muffler 96, a vertical plane 363 passing through a rear edge of the rear wheels 14B is disposed longitudinally rearward of the muffler 96, and a vertical plane containing the rear wheel axis 362 passes through the muffler 96. The muffler inlet 95, which is connected to the exhaust conduit 94, is disposed on the left end surface of the muffler 96 longitudinally rearward of the axis of rotation of the rear wheels 14B. The muffler outlet 97 through which exhaust gases are expelled to the atmosphere 94 is disposed on the right end surface of the muffler 96 and longitudinally forward of the axis of rotation of the rear wheels 14B. The muffler outlet 97 faces towards the right side 9 of the vehicle 10. When the engine 50 is operating, exhaust gases from the exhaust ports of the cylinders 50A, 50B flow consecutively through their respective exhaust conduit 90, 92, and the exhaust manifold 93 which combines the flows into a single flow in the exhaust conduit 94. From the exhaust conduit 94, the exhaust gases flow through the muffler 96 and are then released to the atmosphere.

As can be seen in FIG. 4D, the engine 50, the air induction system including the airbox 72, the exhaust system, and the fuel tank 56 are all situated behind a laterally extending vertical plane 3 passing through a rearwardmost point of the seat bases 17A, 18A, 19A. As can be seen in FIGS. 4A to 4D, the engine 50, the fuel tank 56 and the air induction system including the airbox 72 are all disposed longitudinally forward of the rear suspension system 13B, in particular the rear shock absorbers 164.

With reference to FIGS. 4A to 5F, the drivetrain of the vehicle 10 will now be described. The drivetrain includes the continuously variable transmission (CVT) 100, a transmission 116, a front differential 128 and a rear differential 142.

Figure 5A:
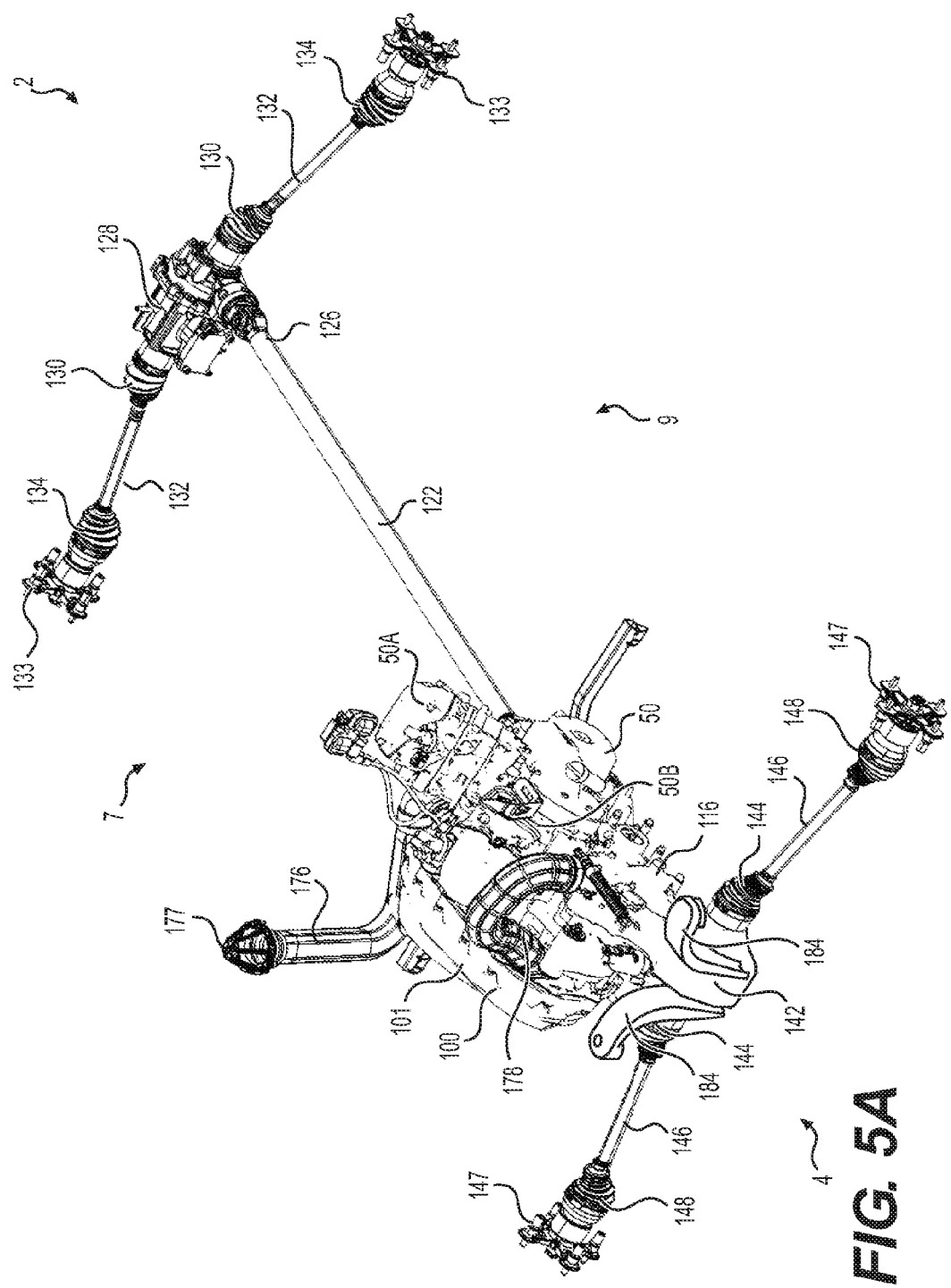
FIG. 5A is a perspective view, taken from a rear, right side of a drivetrain of the vehicle of FIG. 1.
Figure 5B:
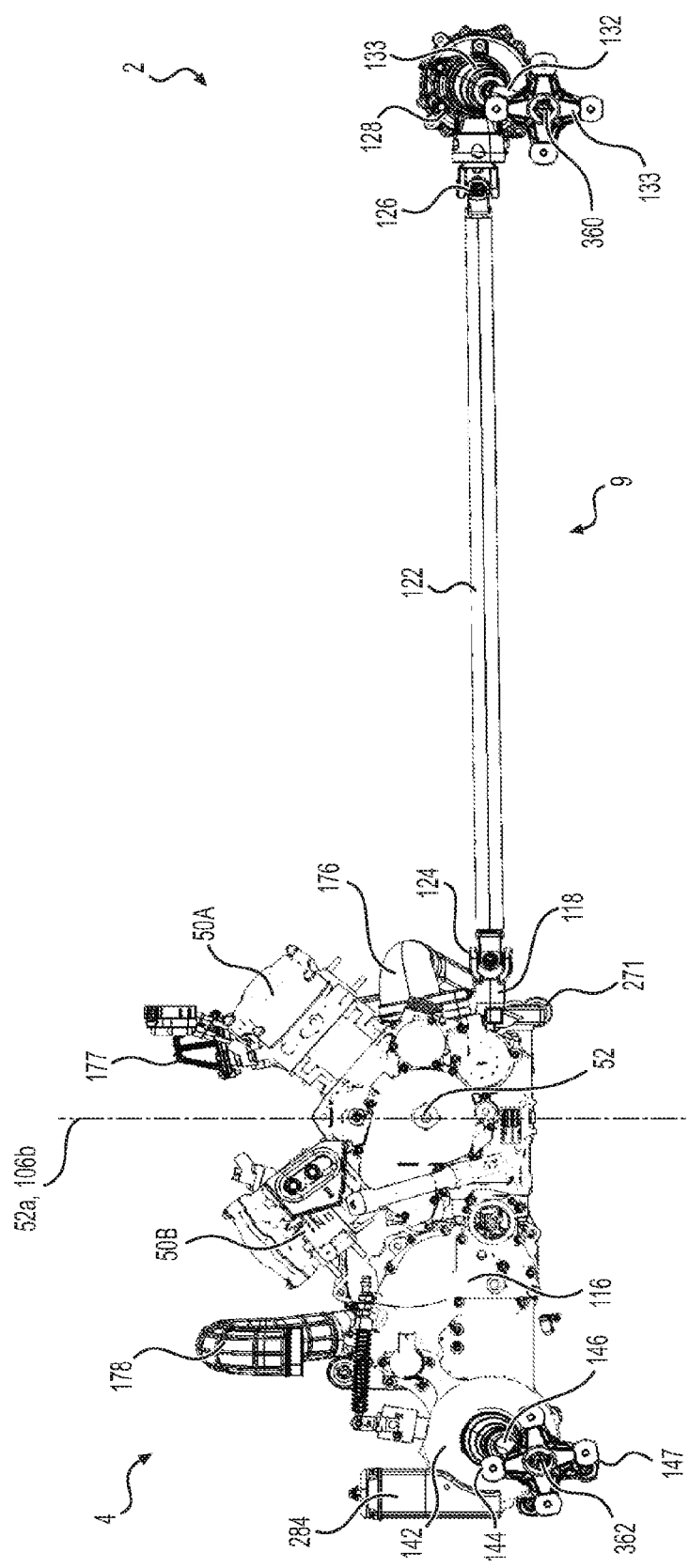
FIG. 5B is a right side elevation view of the drivetrain of FIG. 5A.
Figure 5C:
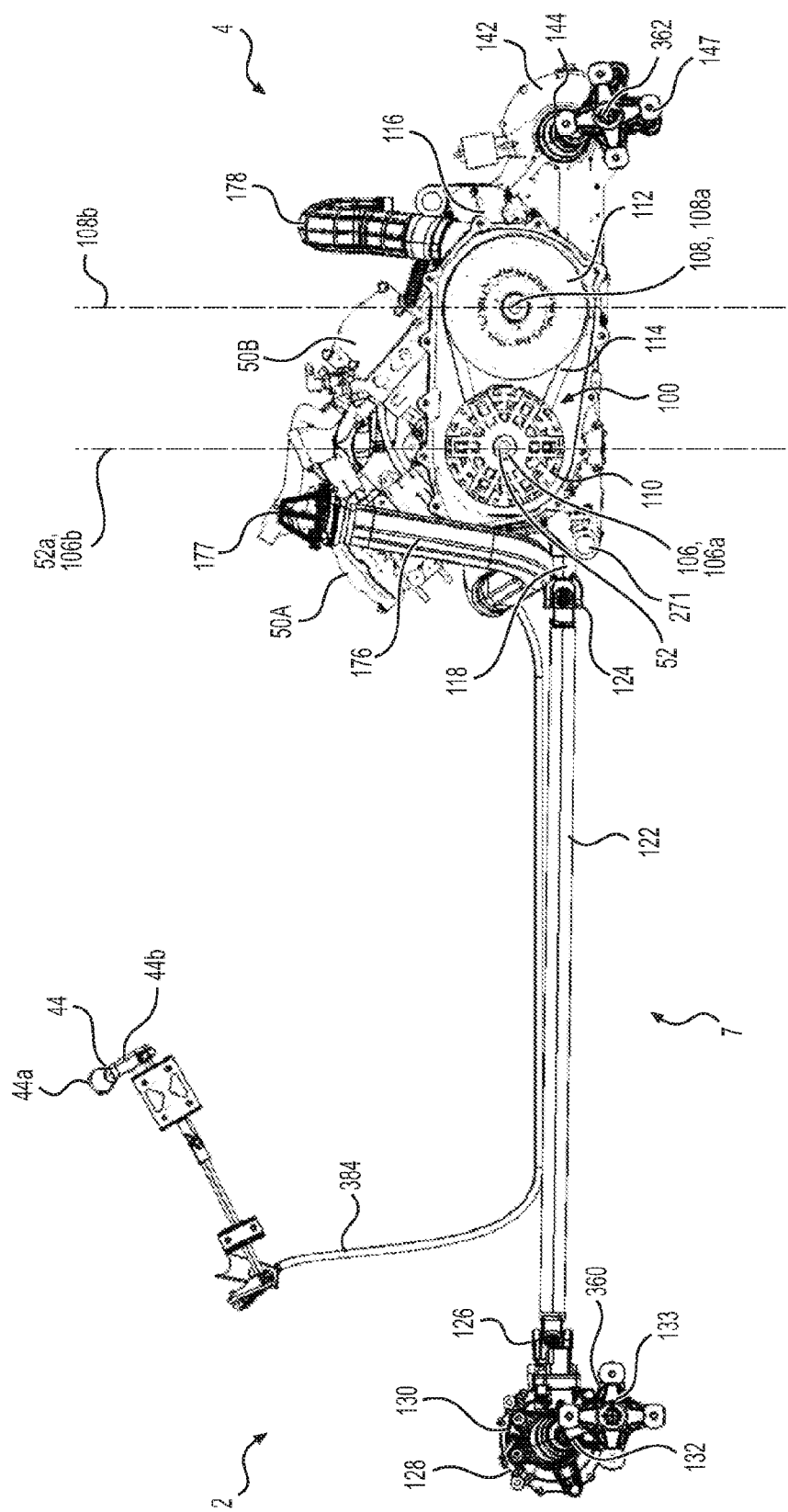
FIG. 5C is a left side elevation view of the drivetrain of FIG. 5A and a gear selector lever connected to the transmission of the drivetrain.
Figure 5D:
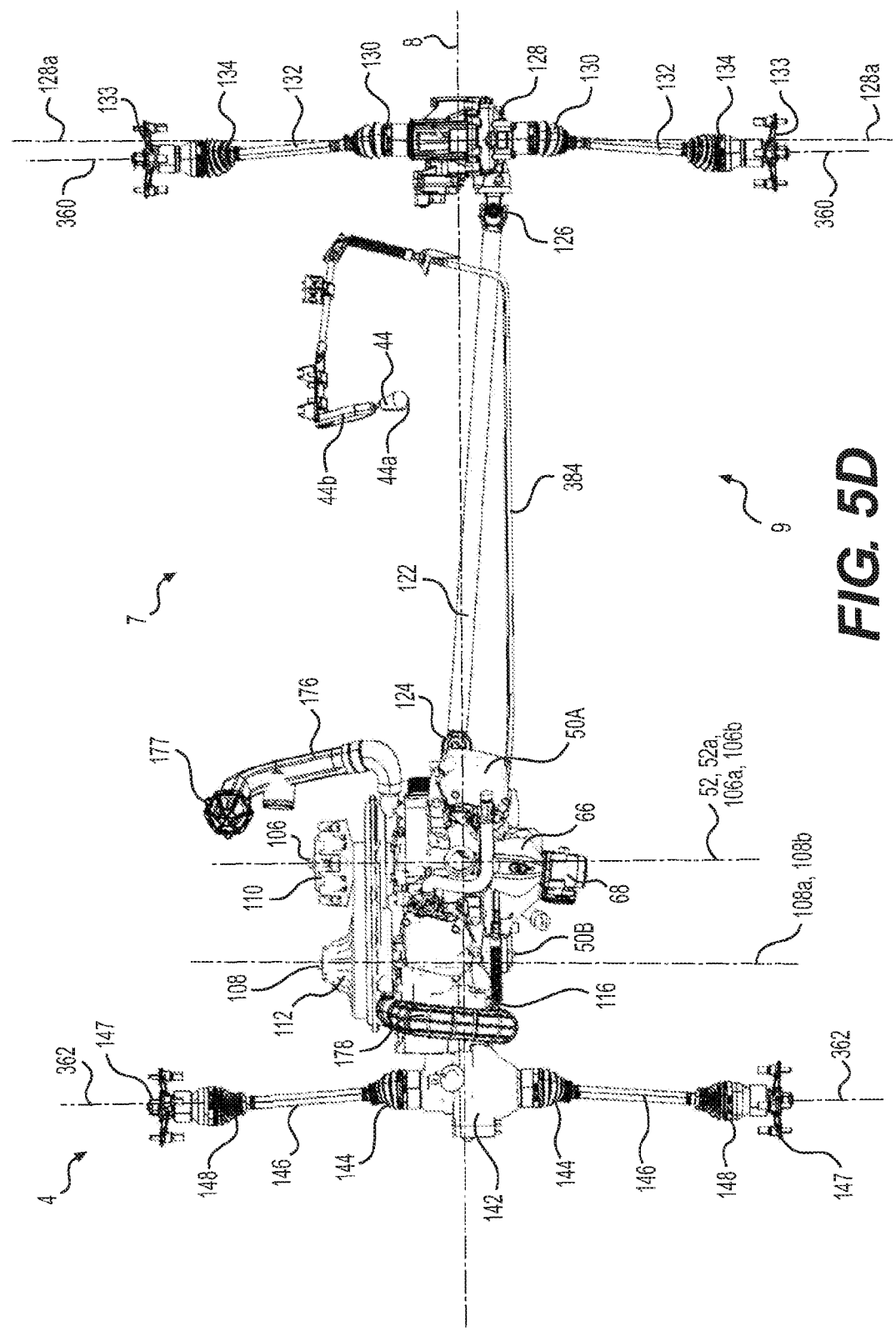
FIG. 5D is a top plan view of the drivetrain and connected gear selector lever of FIG. 5C.
Figure 5E:
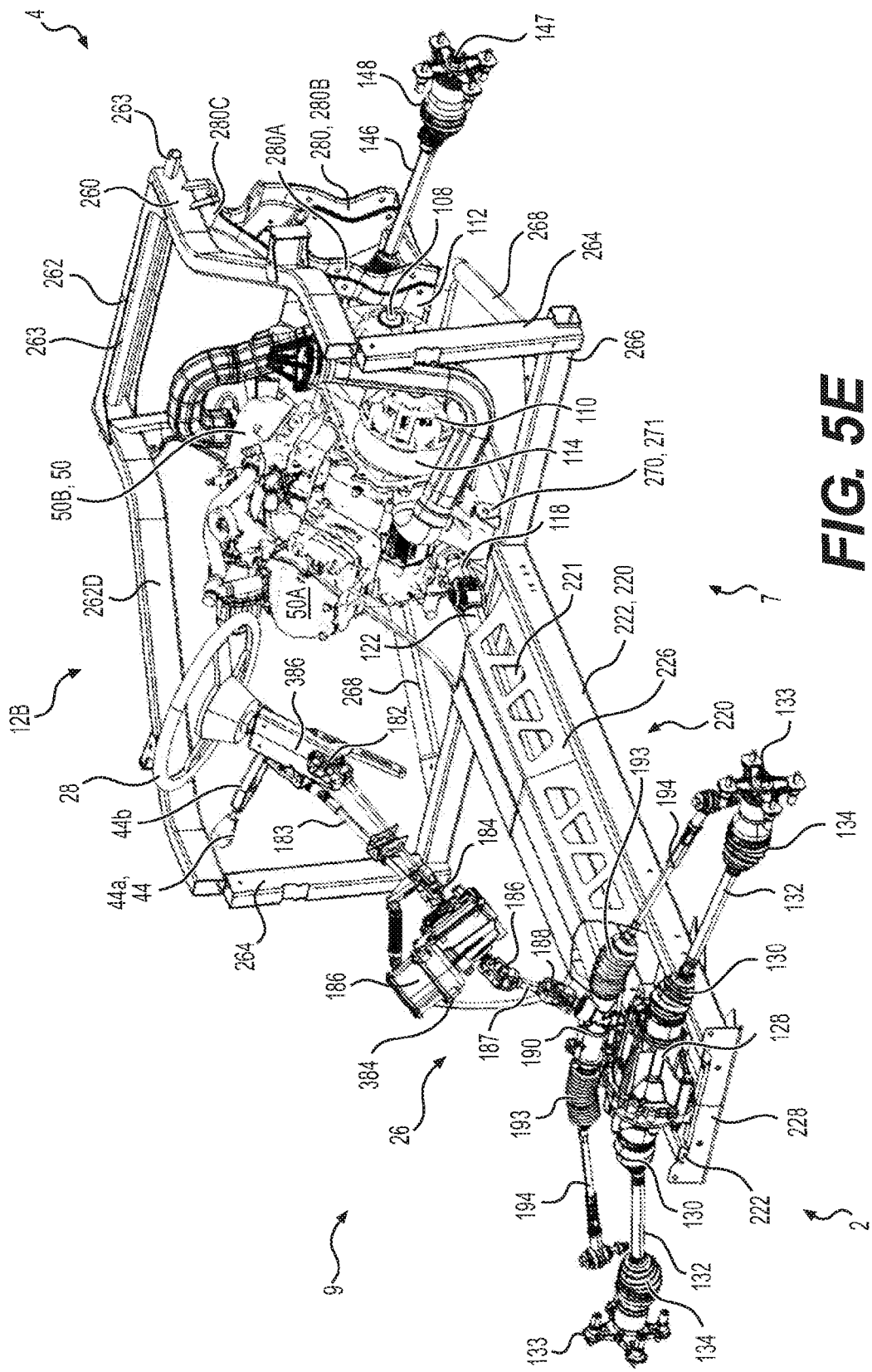
FIG. 5E is a perspective view, taken from a front, left side, of the drivetrain and the gear selector lever of FIG. 5C and including the steering assembly and a portion of the frame of the vehicle of FIG. 1.
Figure 5F:
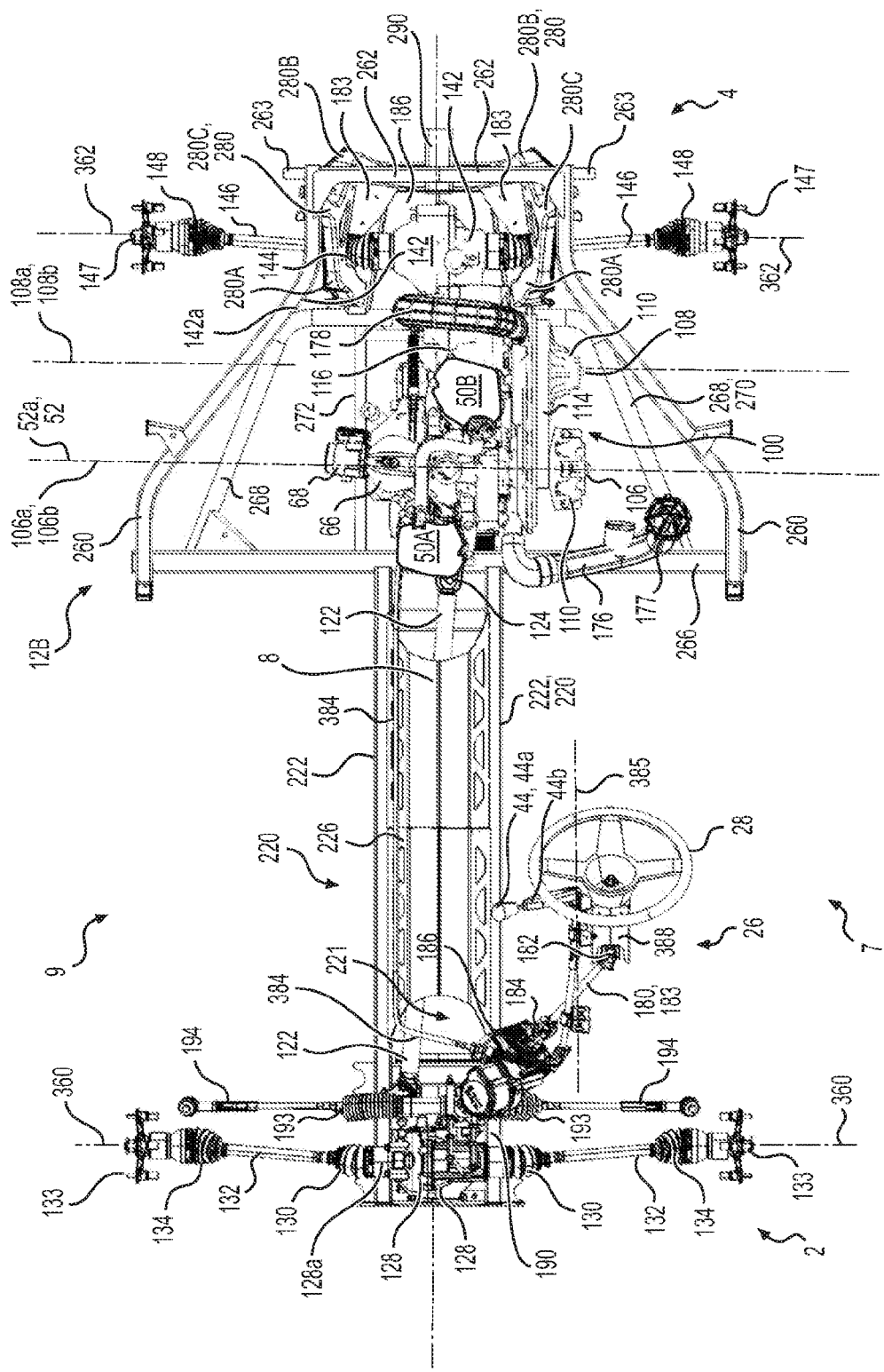
FIG. 5F is a top plan view of the elements of FIG. 5E.

As best seen in FIGS. 5C, 5D and 5F, the CVT 100 is disposed on a left side of the engine 50 and the longitudinal centerline 8. The CVT 100 has a driving pulley 110 and a driven pulley 112 connected to the driving pulley 110 by a belt 114. The driving pulley 110 is mounted on the engine output shaft 106 so as to rotate about a driving pulley axis 106a. The driving pulley axis 106a is contained in a vertical plane 106b. It is contemplated that the driving pulley 110 could not be connected directly to the engine output shaft 106, and instead be mounted to another shaft that is connected to the engine output shaft 106 via a transmission. The driven pulley 112 is mounted on a driving shaft 108 so as to rotate about the driven pulley axis 108. The belt 114 disposed around both pulleys 110, 112 transmits torque from the driving pulley 110 to the driven pulley 112. Each one of the pulleys 110, 112 includes a beveled movable sheave that can move axially relative to a beveled fixed sheave in response to changes in rotational speed and torque to modify an effective diameter of the corresponding pulley 110, 112 thereby modifying a transmission ratio from the driving pulley 110 to the driven pulley 112. The driven shaft 108 drives a transmission 116 which is connected to the rear portion of the engine 50. A cover 101 is disposed over the CVT 100 and is connected to both the engine 50 and the transmission 116.

As can be seen best in FIGS. 4A, 4B and 4D, an air intake conduit 176 is connected to the front portion of the CVT 100 for drawing cool air into the CVT 100 for cooling the CVT 100. The intake conduit 176 extends forwardly from the CVT 100, then leftwardly and finally upward through the rear portion of the firewall 25 as can be seen in FIG. 4A. The inlet of the conduit 176 which extends above the firewall 25 is covered with a grill 177 similar to the grill 76 covering the inlet of the air intake conduit 74 as can be seen in FIGS. 4A to 4D. The heated air is released to the atmosphere by a conduit 178 connected to the rear portion of the CVT. The conduit 178 extends upward from the CVT 100, then towards the right above the transmission 116 and then downward. The outlet of the conduit 178 is disposed rightwardly of the transmission 116. The outlet of the conduit 178 is open and facing downwardly.

With reference to FIGS. 4A to 5B, the transmission 116 is connected to the rear of the engine 50. The transmission 116 transfers the torque from the driven shaft 108 to a front driveshaft 118 and a rear differential 142. The transmission 116 includes a plurality of gears and connects the engine 50 to the front and rear wheels 14A, 14B via a particular one of a plurality of gear configurations. A gear selector 44 (FIG. 2F), operable by the driver of the vehicle 10, is connected to the transmission 116 for selecting one of the plurality of gear configurations of the transmission 116. The gear selector 44 and the connection to the transmission 116 will be described below in greater detail.

With reference to FIGS. 5A to 5F, the front driveshaft 118 passes through the casing of the engine 50 and connects to another front driveshaft 122 via a universal joint 124. From the universal joint 124, the front driveshaft 122 extends forwardly and toward the right of the vehicle 10 to another universal joint 126. The universal joint 126 connects the front driveshaft 122 to a front differential 128. The front differential 128 is connected, via a left constant velocity joint (not shown) enclosed by a flexible boot 130, to a left front drive axle 132, and via a right constant velocity joint (not shown) enclosed by a flexible boot 130 to a right front drive axle 132. The left front drive axle 132 is connected to a left spindle 133 of the left front wheel 14A via a left constant velocity joint (not shown) enclosed by a flexible boot 134. The right front drive axle 132 is connected to a right spindle 133 of the right front wheel 14A via a right constant velocity joint (not shown) enclosed by a flexible boot 134. The left spindle 133 is rotatably suspended from the frame 12 by the left front suspension 13A and the right spindle 133 is rotatably suspended from the frame 12 by the right front suspension 13A as can be seen in FIGS. 2A and 2B.

The transmission 116 connects to a rear differential 142. The rear differential 142 is connected via a left constant velocity joint (not shown) enclosed by a flexible boot 144, to a left rear drive axle 146, and via a right constant velocity joint (not shown) enclosed by a flexible boot 144 to a right rear drive axle 146. The left rear drive axle 146 is connected to a left spindle 147 of the left rear wheel 14B via a left constant velocity joint (not shown) enclosed by a flexible boot 148. The right drive axle 146 is connected to a right spindle 147 of the right rear wheel 14B via a right constant velocity joint (not shown) enclosed by a flexible boot 148. The left spindle 147 is rotatably suspended from the frame 12 by the left rear suspension 13B and the right spindle 147 is rotatably suspended from the frame 12 by the right rear suspension 13B as can be seen in FIGS. 2A and 2B.

With reference to FIGS. 4A, 4B, 4D, 9A and 9B, the front suspension 13A and the rear suspension 13B and their connection to the frame 12 will now be described.

As can be seen in FIGS. 9A and 9B, the left front suspension 13A extends laterally outwardly (leftwardly) from a left suspension support 210 and the right front suspension 13A extends laterally outwardly (rightwardly) from a right suspension support 210. The left front suspension support 210 is a mirror image of the right front suspension support 210 and as such, only the right one will be described herein. As can be seen best in FIG. 10A, the right front suspension support 210 has an inverted Y-shape with an upper arm 210C connected to two lower arms 210A, 210B disposed below the upper arm 210C and longitudinally spaced from each other. The left front suspension 13A is a mirror image of the right front suspension 13A, and as such, only the right front suspension 13A will be described below. Corresponding and similar elements of the left and right front suspensions 13A are labeled with the same reference numerals in the figures. It is contemplated that some of the elements of the right front suspension 13A may be different from the corresponding elements of the left front suspension 13A. For example, suspension elements on one side may differ from suspension elements on the other side to accommodate elements of the vehicle 10 that are present on only one side or that differ between each side.

With reference to FIGS. 2B, 9A and 9B, the right front suspension 13A includes a lower A-arm 150 and an upper A-arm 152, each extending rightwardly (laterally outwardly) from the inverted Y-shaped left front suspension support 210. The lower A-arm 150 includes a front member pivotally connected to the front lower arm 210A and a rear member pivotally connected to the rear lower arm 210B of the front suspension support 210. The laterally outer ends of the front and rear members of the lower A-arm 150 are connected together and to a lower portion of a knuckle 158. The front left wheel 14A is rotationally connected to the knuckle 158. The upper A-arm 152 is disposed above the lower A-arm 150 and also includes a front member and rear member. The front member of the upper A-arm 152 is pivotally connected to the front lower front arm 210A above the front member of the lower A-arm 150, and the rear member of the upper A-arm is pivotally connected to the rear lower rear arm 210B of the front suspension support 210 above the rear member of the lower A-arm 150. The laterally outer ends of the front and rear members of the upper A-arm 152 are connected together and to an upper portion of the knuckle 158. A shock absorber 154 has a lower end connected to the outer end of the upper A-arm 152 and an upper end connected to the upper arm 210C of the Y-shaped front suspension support 210 via a bracket 156. A sway bar 159 connects between the lower A-arms 150 of the left and right front suspensions 13A. The sway bar 159 is a U-shaped member extending laterally and rearwardly behind the left and right rear suspension supports 210 and then extending forwardly and downwardly on a laterally outer side of the rear lower rear arm 210B of each suspension support 210. The sway bar 159 is disposed vertically above the lower A-arm 150 and vertically below the upper A-arm 152. A vertical link 157 connects the left end of the sway bar 159 to the front member of the left suspension lower A-arm 150, and a right vertical link 157 connects the right end of the sway bar 159 to the front member of the right suspension lower A-arm 150.

As can be seen in FIGS. 4A and 4B, the right rear suspension 13B extends rightwardly from a right suspension support 280 and the left rear suspension 13B extends leftwardly from a left suspension support 280. The left and right rear suspension supports 280 are mirror images of one another and as such, only the right one will be described herein. With reference to FIGS. 10A and 10D to 10G, the right rear suspension support 280 has an inverted Y-shape similar to the front suspension support 210, with an upper arm 280C connected to two lower arms 280A, 280B which are longitudinally spaced from each other. The upper arm 280C of the rear suspension support 280 is shorter in length than the upper arm 210C of the front suspension support 210. The left rear suspension 13B is a mirror image of the right rear suspension 13B, and as such, only the right rear suspension 13B will be described below. Corresponding and similar elements of the left and right rear suspensions 13B are labeled with the same reference numerals in the figures. It is contemplated that some of the elements of the right rear suspension 13B may be different from the corresponding elements of the left rear suspension 13B. For example, suspension elements on one side may differ from suspension elements on the other side to accommodate elements of the vehicle 10 that are present on only one side or that differ between each side.

With reference to FIGS. 4A, 4B, and 4D, the right rear suspension 13B includes a lower A-arm 160 and an upper A-arm 162, each extending rightwardly (laterally outwardly)

from the inverted Y-shaped left rear suspension support 280. The lower A-arm 160 includes a front member pivotally connected to the lower front arm 280A of the rear suspension support 280, and a rear member pivotally connected to the rear lower rear arm 280B of the rear suspension support 210. The right end of the lower arm rear member is connected to the lower arm front member laterally inwardly of its left end. The right end of the lower arm front member is connected to the lower portion of a knuckle 161 (only the left knuckle 161 is shown in the Figures). The rear right wheel 14B is rotationally connected to the knuckle 161. The upper A-arm 162 is disposed above the lower A-arm 160 and also includes a front member and rear member. The front member of the upper A-arm 162 is pivotally connected to the front lower arm 280A above the front member of the lower A-arm 160, and the rear member is pivotally connected to the rear lower rear arm 280B above the rear member of the lower A-arm 160. The right end of the upper arm rear member is connected to the upper arm front member leftward (laterally inward) of its right end. The right end of the upper arm front member is connected to the upper portion of the knuckle 161. A shock absorber 164 extends upwardly and leftwardly from the rear member of the lower A-arm 160 to the upper arm 280C of the rear suspension support 280 of the frame 12. A link 168 extends upwards from the front member of the lower arm 160. The upper end of the link 168 is connected to the right end portion of a torsion bar 170. The left end portion of the torsion bar 170 is connected to the link 168 of the left rear suspension 13A. The torsion bar 170 is a U-shaped member disposed above both A-arms 160, 162. The torsion bar 170 has a laterally extending middle portion disposed rearward of both shock absorbers 164. The left end portion of the torsion bar 170 extends longitudinally and is disposed leftwardly of the left shock absorber 164. The right end portion of the torsion bar 170 extends longitudinally, and is disposed rightwardly of the right shock absorber 164. The torsion bar 170 increases the roll stiffness of the rear suspensions 13B.

The steering assembly 26 and its connection to the front wheels 14A will now be described with reference to FIGS. 9A to 9D. The steering assembly 26 includes the steering wheel 28, a steering column 180, a power steering module 186 and a rack and pinion assembly 190.

With reference to FIGS. 9A, 9B and 9D, the steering column 180 includes an upper shaft 181, a middle shaft 183, and a lower shaft 188. The upper shaft 181 is coaxially and rigidly connected at its upper end to the steering wheel 28. The upper shaft 181 extends longitudinally and downwardly from the steering wheel 28 to a universal joint 182 which is connected to an upper end of the middle shaft 183. From the universal joint 182, the middle shaft 183 extends downwardly, forwardly and rightwardly to a universal joint 183 fixed to the input of the power steering module 186. The upper and middle shafts 181, 183 are disposed rearward of the left front suspension support 210.

With reference to FIGS. 9A, 9B and 9D, the upper shaft 181 and the steering wheel 28 rotate about a steering wheel axis 28a (FIG. 9D). The steering wheel 28 and the steering column shaft 181 are also pivotable with respect to the frame 12 in order to accommodate different drivers as shown in FIG. 1. The steering wheel 28 is connected to the frame member 208 of the front frame portion 12A via rectangular mounting brackets 386, 388. The mounting bracket 386, which is fixed to the frame member 208, is disposed on the rear surface of the frame member 208 and extends therebelow. The mounting bracket 388 is disposed above the mounting bracket 386 and connected pivotably thereto by flanges 387 disposed on the lateral edges of the bracket 386 and corresponding flanges (not shown) extending on the lateral edges of the bracket 388. A right bolt (not shown) is inserted through aligned through-holes of the right side flanges 387 of the brackets 388, 386 and a left bolt 385 is inserted through aligned through-holes of the left side flanges 387 of the brackets 386, 388 to pivotally connect the bracket 388 to the bracket 386. The upper bracket 388 is thus pivotable with respect to the lower mounting bracket 386 about a pivot axis 387a extending generally horizontally and laterally. The steering column shaft 181 is fixed to the pivotable bracket 388 so as to be rotatable about a central axis of the shaft 181 and the steering wheel 28, i.e. the steering wheel axis 28a. The steering column shaft 181, the steering wheel 28 and the steering wheel axis 28a thus pivot along with the upper mounting bracket 388 about the pivot axis 387a. In the illustrated implementation of the vehicle 10, as can be seen in FIG. 1, the steering wheel 28 is pivotable between a high position 28', an intermediate position 28" and a low position 28'". The high position 28' is also longitudinally forward of the intermediate position 28" which is longitudinally forward of the low position 28'". It is contemplated that the steering wheel 28 could be pivotable about the axis 387a between two or more than three positions. A pneumatic piston 196 (FIGS. 9A, 9D) connected between the upper mounting bracket 388 and the lower mounting bracket 386 facilitates pivoting of the shaft 181 about a horizontal axis extending through the bottom of the shaft 181.

With reference to FIGS. 9A, 9B and 9D, the power steering module 186 is disposed vertically below and on a right side of the lower mounting bracket 386. The power steering module 186 is disposed longitudinally forward of the mounting bracket 386 and longitudinally rearward of the left suspension support 210. A bracket 389 fixes the power steering module 186 to the upper arm 210C of the left front suspension support. The power steering module 186 includes an electronic sensor (not shown) and a motor (not shown). The sensor senses the rotation of an input shaft (not shown) connected to the universal joint 184, and thereby the rotation of the steering wheel 28. The motor is operatively connected to a universal joint 187. The universal joint 187 is connected to the upper end of the lower shaft 188. The lower shaft 188 extends downwardly, forwardly and rightwardly from its upper end to its lower end which is connected to a rack and pinion assembly 190 via a universal joint 189. The lower shaft 188 is disposed laterally between the left and right front suspension supports 210 and longitudinally between the front and rear lower arms 210A, 210B of each front suspension support 210.

With reference to FIGS. 9A, 9C and 9D, the rack and pinion assembly 190 is disposed laterally between the left and right front suspension support 210 and longitudinally between the front and rear lower arms 210A, 210B of each front suspension support 210. As can be seen in FIG. 9A, the rack and pinion assembly 190 is disposed above the front wheel axis 360 when the vehicle 10 is disposed on level ground and with no load being carried by the vehicle 10. The front differential 128 is disposed forwardly of and vertically lower than the rack and pinion assembly 190 as can be seen in FIG. 3C. The universal joint 189 is fixed to the pinion (not shown) of the rack and pinion assembly 190. The pinion has gears which engage the teeth on a rack 191 extending horizontally on either side of the pinion such that a rotation of the pinion causes the rack 191 to move laterally. The housing of the rack and pinion assembly 190 has a cylindrical portion 190a extending generally vertically which houses the pinion and a horizontally extending cylindrical portion 190*b* in which a portion of the rack 191 is housed slidably. The left end of the rack 191 is connected to the right end of the left steering linkage 194 by a ball joint (not shown) enclosed within a flexible boot 193. The left end of the left steering linkage 194 is connected to the left knuckle 158. The left ball joint in the left flexible boot 193 is disposed between the front and rear lower arms 210A, 210B of the left front suspension support 210. The right steering linkage 194 is connected to the right end of the rack 191 by a right ball joint (not shown) enclosed within a flexible boot 193. The right end of the right steering linkage 194 is connected to the right knuckle 158. The right ball joint enclosed by the right flexible boot 193 is disposed between the front and rear lower arms 210A, 210B of the right front suspension support 210. When the steering wheel 28 is rotated counter-clockwise direction (when looking from the top or from the driver's point of view) about steering wheel axis 28*a*, the corresponding counter-clockwise rotation of the pinion causes the rack 191 to move rightwardly, thereby turning the rear portion of each front wheel 14A rightward of the front portion thereof and thus steering the vehicle 10 towards the left. When the steering wheel 28 is rotated in a clock-wise direction (when viewed from the top or from the driver's point of view) about the steering wheel axis 28*a*, the corresponding clockwise rotation of the pinion causes the rack 191 to move leftwardly, thereby pushing the rear portion of each front wheel 14A towards the left relative to the front portion thereof, and thus steering the vehicle 10 towards the right.

With reference to FIGS. 9A to 9C, the rack and pinion assembly 190 is connected to the frame 12 by a bracket 390 extending laterally between the left and right front suspension supports 210. The left and right ends of the bracket 390 are respectively fixed to the rear lower rear arm 210B of left and right suspension supports 210 as can be seen in FIG. 9C. The housing 190*a*, 190*b* of the rack and pinion assembly 190 is connected to the front surface of the bracket 390 by a pair of posts 391 and a pair of clamp members 392. An upper post 391 is placed on the bracket 390 above the rack housing portion 190*b* and on the right side of the pinion housing portion 190*a*. A lower post 391 is placed on the bracket 390 below the rack housing portion 190*b* on the left side of the pinion housing portion 190*a*. A triangular clamp member 392 is placed on each post 391. The upper triangular clamp member 392 extends downwardly from the upper post 391 onto the front surface of the pinion housing portion 190*a* and the lower triangular clamp member 392 extends upwardly from the lower post 391 onto the front surface of the pinion housing portion 190*a*. A bolt 393 is inserted through each clamp member 392, the corresponding post 391 and the bracket 390 to clamp the rack and pinion assembly 190 to the front surface of the bracket 390. The right end of the rack 191 extends slidably through a circular opening of a right bracket 394 (best seen in FIG. 9C). The bracket 394 extends forwardly from the front surface of the bracket 390 just leftwardly of the right suspension support arm 210B.

With reference to FIGS. 9D to 9H, the gear selector 44 extends rightwardly from the upper steering mounting bracket 388. The gear selector 44 has a rounded and triangular handle portion 44*a* connected to the right end of a shaft 44*b*. The handle portion 44*a* is disposed rightwardly of the steering wheel 28, as can be seen clearly in FIG. 5F. The left end of the gear selector shaft 44*b* is connected to a shaft 385 that extend downward and forward from the gear selector shaft 44*b*. The shaft 385 is rotatably connected to the frame 12 by a mounting bracket 382 so as to be rotatable about a gear selector axis 385*a* (FIG. 9D). The gear selector 44 is thus pivotable about the axis 385*a*. When viewed from a side as in FIG. 9D, the gear selector 44 is disposed longitudinally between a front edge and a rear edge of the steering wheel 28. The gear selector 44 is disposed vertically above a lower edge of the steering wheel 28 and below an upper edge of the steering wheel 28 when viewed from a side of the vehicle 10. The steering wheel axis 28*a* and the gear selector axis 385*a* extend upwardly and rearwardly above the steering wheel 28. The gear selector axis 385*a* is disposed rearward of the steering wheel axis 28*a* above the steering wheel 28, and the gear selector axis 385*a* diverges away from the steering wheel axis 28*a* above the steering wheel 28. The gear selector axis 385*a* of the gear selector 44 extends through the locus of the steering wheel 28 as can be seen in FIG. 9D. The gear selector 44 can be selectively placed in one of a plurality of positions corresponding to the plurality of gear configurations of the transmission 116. In the illustrated implementation of the vehicle 10, the gear selector positions include, in sequential order: a parking (P) position, a reverse (R) position, a neutral (N) position, a high gear (H) position, and a low gear (L) position. The gear selector 44 is connected to the transmission 116 by a gear selector cable 384 that extends in a forward and downward direction from the left end of the gear selector 44, and then downwards in front of the front cockpit wall 23. The gear selector cable 384 then passes under the front wall 23, and extends longitudinally below the cockpit floor 21, between the plate 226 forming the tunnel 221 and the raised portion of the cockpit floor 22. It is contemplated that the longitudinally extending portion of the gear selector cable 384 could be disposed in the tunnel 222. The through the tunnel 221 to connect to the transmission 116 as can be seen in FIGS. 9E and 9F. A removable panel 23*a* (FIG. 9E) covers the portion of the gear selector cable 384 that extends in the cockpit area 20. The gear selector 44 pushes or pulls on the cable 384 as it pivots about the axis 385*a*. The cable 384 actuates an arm in the transmission 116 which connects the transmission gears in the appropriate configuration desirable for the selected gear selector position. It is also contemplated that a position sensor could be attached to the gear selector 44, and the gear selector cable 384 could be an electronic cable transmitting a signal to the transmission 116 based on the position detected by gear selector position sensor.

With reference to FIGS. 3A, 3C and 10A to 10G, the frame 12 of the vehicle will now be described.

With reference to FIGS. 3A, 3C and 10A, the front portion 12A of the frame 12 includes the front suspension supports 210 and a support beam 208 extending laterally between the left and right sides 7, 9 of the vehicle 10 above the front suspension supports 210. The left and right ends of the beam 208 are connected respectively to the lower end of the left and right side front arms 31A of the roll cage. A pair of inverted C-shaped members 200 extend downwards from the support beam 208 laterally inwardly of its ends. The left member 200 is disposed on a left side of the longitudinal centerplane 8 in front of the left front suspension support 210. The right member is disposed on a right side of the longitudinal centerplane 8 in front of the right front suspension support 210. The upper end of each member 200 is connected to the beam 208 and the corresponding front suspension support upper arm 210C by a bracket 212. The lower ends of each member 200 are connected to the lower end of the front lower arm 210A of the corresponding front suspension support 210. A U-shaped cross member 202 has a left end connected to the upper portion of the left member 200 and a right end connected to the upper portion of the right member 200. A lateral cross member 204 extends laterally across the front of the vehicle 10 between the respective middle portions of the left and right members 200. Each of the members 200, 202, 204 is a tubular member. A plate 206 extends laterally between the lower portions of the members 200. The plate 206 has a planar upper portion extending generally vertically, and a planar lower portion extending downwardly and rearwardly. The plate 206 has an opening for a cable of a winch to pass therethrough. As can be seen in FIG. 3D, the radiator 49 is supported by the front frame portion 12A rearward of the members 200 and forward of the member 208. The radiator 49 is mounted on the front suspension supports 210.

With reference to FIGS. 10A to 10C, a central support structure 220, including a pair of parallel beams 222, extends longitudinally along the bottom of the front and middle frame portions 12A, 12B laterally inwardly of the suspension supports 210. The left beam 222 is connected to the lower end of the left suspension support arms 210A, 210B. The right beam 222 is connected to the lower ends of the right suspension support arms 210A, 210B. A laterally extending bracket 228 is connected to the front ends of the both beams 222, the arms 210A of each suspension support 210, and both members 200. The beams 222 are constructed of hollow rectangular beams. It is contemplated that the beams 222 could be formed of beams having other cross-sectional shapes.

With reference to FIGS. 10A to 10C, two reinforcing cross members 224 are connected to the beams 222 and extend laterally therebetween. It is contemplated that the left and right beams 22 could be connected by one or more than two cross members 224. The right end of each cross member 224 is connected to the left side wall of the right beam 222 and the left end of each cross member 224 is connected to the right side wall of the left beam 222. Each member 224 is constructed of a hollow rectangular beam. The beams 222 have slots 255', 225' formed in their vertical side walls which respectively receive corresponding projections 255 of the members 252, 254 and corresponding projections 225 of the members 224 of the beams 222 for assembly of the frame 12 and will be discussed below.

With reference to FIG. 10C, an inverted U-shaped piece of sheet metal 226 disposed above the beams 222, forms a longitudinally extending central tunnel 221. The left side portion of the sheet metal member 226 extends upwards from the top wall of the left beam 222, the right side portion of the sheet metal member 226 extends upwards from the top wall of the right beam 222, and the upper portion of the sheet metal member 226 extends generally horizontally and laterally between the side portions. The side portions of the sheet metal member 226 have openings to reduce weight of the frame 12. A metal sheet (not shown) mounted to the cross members 224 and the beams 222 covers the bottom of the tunnel 221. The tunnel 221 houses, amongst other elements, the gear shifter cable 384 and the front driving shaft 122.

With reference to FIGS. 2A, 2B, 3A to 3D, and 10A to 10C, the middle frame portion 12B includes a left side support structure 240 extending rearwardly from the beam 208 along the left side 7 of the vehicle 10 and a right side support structure 240 extending rearwardly from the beam 208 along the right side 9 of the vehicle 10. In FIG. 10A, the right side support structure 240 is shown in a partially disassembled configuration, and in FIG. 10B the right side support structure 240 has been removed for clarity. As best seen in FIGS. 2A to 3D, each side support structure 240 includes an upper front member 242, a middle front member 244, a lower front member 246, a bottom member 248 and a rear member 250. As can be seen in FIG. 10A, the members 242, 244, 246, 248, 250 are hollow rectangular beams. The left side support structure 240 is a mirror image of the right side support structure 240. As such, only the right side support structure 240 will be described herein.

As can be seen in FIGS. 3C and 9F, the front end of the upper front member 242 is connected to the right end of the beam 208. A tubular member 243 (best seen in FIG. 9F) extends laterally between the upper front members 242 of the left and right side support structures 240. With reference to FIGS. 3C and 3D, the upper front member 242 extends downwardly and rearwardly from the beam 208 to the middle front member 244. The middle front member 244 extends downwardly and rearwardly from the upper front member to the lower front member 246. The middle front member 244 is longer than the upper front member 242, and is disposed at a greater angle with respect to the horizontal than the upper front member 242. The lower front member 246 extends downwardly and rearwardly from the middle front member 244 to the bottom member 248. The lower front member 246 is shorter than the middle and upper front members 244, 242 and disposed at a smaller angle with respect to the horizontal than the middle front member 244. As can be seen in FIGS. 3C, 3D and 10A, the bottom member 248 extends horizontally and rearwardly from the lower front member 246 to a left member 264 of the rear frame portion 12C. The rear member 250 extends rearwardly and upwardly from a rear portion of the bottom member 248 to an upper end which is connected to the lower end of the left side rear arm 31B of the roll cage 30. The upper end of the rear member 250 is disposed longitudinally rearwardly of the bottom member 248. A horizontal member 256 extends laterally and horizontally between the rear members 250 of the left and right side support structures 240. The horizontal member 256 is connected to the middle portion of each rear member 250 between their upper and lower ends. The member 264 extending upwards from the bottom member 248 is connected to the rear member 250 between the horizontal member 256 and the roll cage arm 31B as can be clearly seen in FIG. 10A. The members 248, 246, 244 each have projections 241 which are received in corresponding grooves 241' of the members 246, 244, 242, for assembly of the frame 12 and will be discussed below.

With reference to FIGS. 10A to 10C, the right side support structure 240 is connected to the central support structure 220 by cross members 252, 254. The cross member 252 extends forwardly and laterally inwardly (leftwardly) from a front portion of the bottom member 248 to the right beam 222. The cross member 254 extends rearwardly and laterally inwardly (leftwardly) from a rear portion of the bottom member 248 to the right beam 222. The cross member 254 is connected to the bottom member 248 longitudinally forward of the rear member 250. Similarly, on the left side of the central support structure 220, the left side support structure 240 is connected to the left beam 222 by cross members 252, 254. As the left side members 252, 254 are mirror images of the left side cross members 252, 254, these will not be described herein again in detail. The cross members 252, 254 are constructed of hollow rectangular beams, each having horizontal top and bottom walls connected by vertical front and rear walls.

With reference to FIGS. 10A, and 10D to 11B, the rear frame portion 12C has a lower portion including a lateral member 266 extending between the lower ends of the left and right members 264, a left member 268 and a right member 268 extending rearwardly from the member 266. The beams 222 are connected to the lateral member 266. The left member 268 is a mirror image of the right member 268 and as such, will not be described herein again in detail. The right member 268 is connected to the front member 266 laterally inwardly (leftwardly) of the right member 264 and extends rearwardly and laterally inwardly (leftwardly) therefrom. A rear portion of the lower right member 268 extends laterally (leftwardly) towards the longitudinal centerplane 8. The inner (left) end of the rear portion of the lower right member 268 is disposed rightwardly of the longitudinally centerplane 8. A member 272 extends longitudinally between the member 266 and the laterally extending rear portion of the member 268. The left and right members 272 are disposed on either side of the longitudinal centerplane 8 and connected to each other by a front lateral member 274 and a rear lateral member 276. The lower portion members 268, 272, 274, 276 are constructed of tubular members. The laterally extending member 266 is constructed of a hollow rectangular beam.

With reference to FIGS. 10A and 10D to 11B, an engine mounting bracket 270 is connected to the lateral member 266 and disposed between the left members 272 and the longitudinal centerplane 8 (best seen in FIG. 10D). The engine mounting bracket 270 is welded to the rear and upper surface of the member 266 and extends rearwardly and upwardly therefrom. The front portion of the engine 50 has a bracket 271 (FIG. 5B) which is connected to the engine mounting bracket 270 to mount the engine 50 to the frame 12C.

With reference to FIGS. 10A and 10D to 10G, the rear frame portion 12C has an upper portion including a left member 260 extending rearwardly from the upper end of the left member 264, a right member 260 extending rearwardly from the upper end of the left member 264, and a lateral member 262 extending laterally between the rear ends of the members 260. The left and right members 260 are closer together in the rear portion than in the front portion. The bracket 261 used to latch the front end of the cargo box 41 extends laterally outwardly the upper surface of each member 260. The members 260 are constructed from hollow rectangular beams bent along their lengths to form the structure described above. The upper lateral member 262 is constructed of a square channel beam having horizontal top and bottom walls connected together along their rear edges by a rear vertical wall. Thus, the channel formed by the walls of the upper lateral rear member 262 faces forward towards the front 2 of the vehicle 10. The tubular rod 263 is disposed within the forward facing channel of the upper lateral rear member 262 and extends laterally through the upper left and right members 260 such that its right end is disposed rightward of the rear end of the upper right member 260, and its left end is disposed leftward of the rear end of the upper left member 260. The cargo box 41 is pivotally mounted to the left and right ends of the tubular member 263 as discussed above.

With reference to FIGS. 10A and 10D to 10G, the members 260 of the upper rear frame portion 12C extend further rearwardly than the members 268 of the lower rear frame portion 12C. Each rear suspension support 280 is connected to the corresponding member 260 longitudinally rearward of its corresponding lower member 268. The upper end of the arm 280C is connected to the right member 260. The lower ends of the lower arms 280A, 280B are each connected to a beam 282 that extends longitudinally and rearwardly from the lateral rear portion of the right member 268.

With reference to FIGS. 10D to 11B, a horizontal flange 283 extends laterally inwardly from each rear suspension support 280 from the region forming a bridge between the downward arms 280A, 280B and disposed below the upward arm 280C. An engine mounting bracket 284 is placed on the flange 283 and bolted thereto. A damper 283a (FIGS. 10D and 10F) is placed between each flange 283 and the corresponding engine mounting bracket 284 to limit transmission of engine vibrations to the driver and passengers of the vehicle 10. The engine mounting bracket 284 is a J-shaped bracket extending laterally inwardly towards the longitudinal centerplane 8 and then downwardly. The right engine mounting bracket 284 connected to the right rear suspension support 280 is spaced farther from the longitudinal centerplane 8 than the left engine mounting bracket 284 connected to the left rear suspension support 280 as can be seen in FIGS. 10D and 10E. A horizontal plate 286 extends laterally between the left and right beams 282. A hollow square shaft 290 extends longitudinally rearwardly from the rear edge of the horizontal plate 286. The shaft 290 can be used to attach a trailer to the vehicle 10. A plate 288 extends vertically upwards from the rear edge of the horizontal plate 286 and above the beam 290. The upper edge of the vertical plate 288 is connected on its left side to the left flange 283 and on its right side to the right flange 283. The rear differential 142 is disposed between the engine mounting brackets 284 and bolted to their respective lower ends. The laterally extending rear differential axis 142a is disposed vertically below the rear suspension support arm 280C and above the beams 282. A vertical plane 142b containing the rear differential axis 142a is disposed between the front and rear lower suspension support arms 280A, 280B of each rear suspension support 280.

The assembly of the frame 12 will now be discussed with respect to FIGS. 10A to 10F and 11A to 11B.

With reference to FIG. 10C, the connection of the cross members 224 to the beams 222 will now be discussed. The right beam 222 has openings 225' extending through its vertical wall. Each cross member 224 extending between the beams 222 has a right projection 225 extending rightwardly from the right side edge of its front vertical wall and its rear vertical wall. The right projections 225 are inserted into the openings 225' for alignment of the cross member 224 with the right beam 222 before they are welded together and to maintain the members 222, 224 in the aligned position during welding. Although not seen, each cross member 224 also has left projection 225 extending leftwardly from its left edge which are similarly received in corresponding openings 225' of the vertical side wall of the left beam 222 225' for alignment of the cross member 224 with the left beam 222 before they are welded together and to maintain the members 222, 224 in the aligned position during welding.

With reference to FIGS. 10A to 10D, the connection of the beams 222 to the lateral member 266 will now be discussed. As can be seen in FIGS. 10B and 10C, each beam 222 has a projection 223 on the rear edge of its vertical walls, Each projection 223 is a hook-like projection extending rearwardly from the rear edge of the beam 222 and then downwardly. As can be seen in FIG. 10D the lateral member 266 has openings 223' extending through its front wall. The rear surface of each beam 222 is placed against the front wall of the lateral member 266 so as to insert the projections 223 into the openings 223' for efficient alignment of the beam 222 with the member 266 before they are welded together and to maintain the members 222, 266 in the aligned position during welding. It will be understood that the cross members 224 are connected to the left and right beams 222 before the beams 222 are connected to the member 266.

With reference to FIGS. 10B and 10C, the connection of the member 252, 254 of the middle frame portion 12B to the beams 222 and the side support member 248 will now be described. The vertical front and rear walls of the member 252 disposed on the right side of the beams 222 have right projections 255 extending rightwardly from their respective right edges as can be seen in FIG. 10B. As can be seen in FIG. 10B, the vertical front and rear walls of the members 252 also have left projections 255 extending leftwardly from their respective left edges. The left projections 255 are received in corresponding openings 255' formed in the vertical wall of the right beam 222. Similarly, the right projections 255 are received in corresponding openings (not shown) formed in the vertical wall of the bottom member 248 before the member 252. The projections 255, and the corresponding openings 255' facilitate alignment of the member 252 with the members 222 and 248 before they are welded together and to maintain the members 222, 252, 248 in the aligned position during welding. The member 254 also has right projections 255 by which it is connected to the bottom member 248 and left projections 255 by which it is connected to the right beam 222 in a similar manner as described above for the member 252.

In the illustrated implementation, the openings 223', 225', 255' are rectangular through-holes but it is contemplated that the openings 223', 225', 255' could have a shape other than rectangular, for example, circular. It is contemplated that the projections 223, 225, 255 could be shaped differently than as shown herein. It is contemplated that a frame member could have more than one projection, slot or groove formed in a wall or an edge thereof.

With reference to FIG. 10A, each side support structure 240 is constructed from a single hollow rectangular beam. V-shaped notches are cut into the beam 240 from the top wall or the bottom wall to create parts 242, 244, 246, 248, 250. Each part 242, 244, 246, 248, 250 is connected to an adjacent part 242, 244, 246, 248, 250 along either the top wall or the bottom wall of the member 240. The notches 240a are created with projections 241 and grooves 241' along their respective edge surfaces as can be seen in FIG. 10A. The notches 240a, projections 241, and grooves 241' are all created by laser-cutting so as to be precise. The member 240 is then bent at the notches 240a so that each projection 241 is received in a corresponding groove 241' to ensure alignment between adjacent parts 242, 244, 246, 248, 250 before they are welded together. The projections 241 and the complementary grooves 241' help to align the members 246, 248 before they are welded to each other, and to maintain the members 246, 248 in the aligned position as they are being welded to each other.

The SSV 10 has other features and components such as headlights and handles. As it is believed that these features and components would be readily recognized by one of ordinary skill in the art, further explanation and description of these components will not be provided herein.

With reference to FIGS. 12A to 12D, the configuration of the internal components of another implementation of the SSV 10' will now be discussed. Some of the features of the SSV 10' are similar to the SSV 10 discussed above. Corresponding features of the SSV 10 and 10' have been labeled with the same reference numbers and will only be discussed below with respect to some of the differences.

The SSV 10' has seats 17', 18' and 19' that are similar to the seats 17'', 18, 19 discussed above. As such, corresponding and similar features of the seats 17'', 18, 19 and 17', 18', 19' have been labeled with the same reference numbers and will only be discussed below with regard the differences.

The driver seat 17' is similar to the driver seat 17'' (FIG. 3E) discussed above, and is slidably mounted so as to allow repositioning in the longitudinal direction in accordance with the preferences of the driver. The pivoting mechanism of the middle and right seats 18', 19' is slightly different from the pivoting mechanism of the middle and right seats 18, 19 described above and will be described in further detail below with respect to FIGS. 13A to 13D.

As can be seen in FIGS. 12A to 12C, the cockpit area 20 housing the seats 17', 18', 19' is separated from the engine 50, and other components connected thereto, by a firewall 25' which has a different shape than the firewall 25 shown in FIGS. 3A, 3C, 3D and 4A. The firewall 25' extends vertically higher than the firewall 25. The firewall 25' has a portion 402 that extends vertically and laterally just rearward of the seat 17', 18', 19'. The top edge of the vertically extending portion 402 is disposed just below the upper edge of the seat backs 17B, 18B, 19B. A horizontally extending portion 404 of the firewall 25' extends generally horizontally and rearwardly from the vertically extending portion 402 thereof. The horizontally extending portion 404 is vertically spaced from the upper edge of the vertically extending portion 402. The SSV 10' also has a left side panel 406 and a right side panel 406 that respectively extend longitudinally rearwardly from the left edge and right edge of the vertically extending portion 402. Each side panel 406 has a trapezoidal opening 408 that is covered with a mesh 410. It is contemplated that the opening 408 could have a different shape and size than as shown herein. The firewall 25' forms various openings, projections and recesses for accommodating various components of the SSV 10' such as the airbox 72, and the like.

With reference to FIGS. 12C and 12D, the fuel tank 56' of the SSV 10' has a different shape than the fuel tank 56. The top surface 56C of the fuel tank 56' is substantially horizontal between the front and rear surfaces 56A and 56B thereof. The bottom surface 56D is also substantially horizontal between the front and rear surfaces 56A and 56B thereof except for the front end which is disposed slightly vertically higher than the rest of the bottom surface 56D. When viewed from the top as in FIG. 12D, the left surface 56E extends further leftwardly in the rear portion than in the front portion. The filler neck 57 connects to an opening in the right side panel 406 such that the cap 58 can be easily accessed for refilling.

With reference to FIGS. 12A to 12D, the throttle body 68 extends rightwardly, upwardly and forwardly from the intake conduit 66 (FIG. 12D). The electric motor 80 is mounted to a right facing surface of the throttle body 68. The intake conduit 70 extends rightwardly from the upper end of the throttle body 68 to connect to an outlet formed in a left side surface of the airbox 72. The airbox 72 is cylindrical and disposed with its cylindrical axis oriented generally horizontally and laterally. The airbox 72 is disposed above the fuel tank 56' and spaced from the top surface 56C thereof. The airbox 72 is supported in part by the vertically extending portion 402 of the firewall 25'. The intake port of the airbox 72 is defined in an upper front surface in the left portion of the airbox 72. The conduit 74 connected to the intake port of the airbox 72 extends upwardly therefrom, then rightwardly just below the horizontally extending portion 404 of the firewall 25, and then downwardly. The right side panel 406 is disposed on a right side of the downwardly extending portion of the conduit 74. The inlet of the conduit 74 is downwardly facing and disposed rightwardly of the right side surface of the airbox 72 and vertically higher than the upper surface of the airbox 72. The inlet of the conduit 74 is disposed above the top surface 56C of the fuel tank 56'. The inlet of the conduit 74 is covered with a convex grill 76. The inlet of the conduit 74 is disposed near the side panel opening 408 such that air can flow through the mesh 410 of the side panel opening 408 into the inlet of the conduit 74. The muffler outlet 97 has an exhaust conduit 397 connected thereto for expelling gases to the atmosphere. The conduit 397 extends rightwardly from the outlet 97, then upwardly and rearwardly, and then downwardly and rearwardly. The outlet of the conduit 397 is facing downwardly and rearwardly so that expelled gases are directed towards the ground rearward of the SSV 10'.

The CVT air intake conduit 176' extends forwardly from the CVT 100, then leftwardly, then upwardly and rearwardly just behind the firewall 25. The air intake conduit 176' then extends leftwardly just below the horizontally extending portion 404 of the firewall 25', and then finally downwardly to the side panel opening 408 (FIG. 12A) that is covered with the mesh 410. The leftward facing inlet of the air intake conduit 176' is generally trapezoidal in shape to correspond to the side panel opening 408, and has a larger cross-sectional area than the portion of the intake conduit 176' connected to the CVT 100.

The pivoting mechanism of the seat bases 18A, 19A will now be discussed with reference to FIGS. 13A to 13D. The middle seat base 18A has a similar pivoting mechanism as the right seat base 19A. As such, the pivoting mechanism will be described below with reference mainly to the right seat base 19A. As mentioned above, features of the seats 17', 18', 19' that are similar to the corresponding features of the seats 17", 18, 19 have been labeled with the same reference numbers and will not be described again below.

As can be seen in FIG. 12C, three support members 312' connect the rod 310 to the frame 12. The support members 312' are different from the support members 312 described above as can be seen by comparing FIGS. 4D and 12C. The left 312', middle 312' and the right 312' support members are respectively disposed below the left seat base 17A, the middle seat base 18A and the right seat base 19A when disposed in the seating position. Each support member 312' is linear instead of being J-shaped, and extends vertically downward from the rod 310 toward the cockpit floor 21. The bracket 340 has been omitted from the seats 17', 18' and 19'.

With reference to FIG. 13A, each passenger seat base 18A, 19A is pivotally connected to the rod 310 by a pair of attachment brackets 314' including one on each side of the corresponding seat base frame 302. FIG. 13A shows the right attachment bracket 314' connected to the right seat base 19A. The left attachment bracket (not shown) is generally a mirror image of the right attachment bracket 314' and thus, only the right attachment bracket 314' will be described herein. The front edge of the attachment bracket 314' is welded to a rear surface of the rod 310. A lower portion of the attachment bracket 314' extends lower than the rod 310. The attachment bracket 314' extends upwards and rearwards from the rod 310 to the seat base frame 302. The attachment bracket 314' is connected to the seat base frame 302 by a bolt 317 inserted through the aligned through-holes 316 to pivotally connect the seat base frame 302 to the attachment bracket 314'. The seat base 19A thus pivots about the attachment bracket 314' about a pivot axis 315 defined by the aligned through-holes 316. It is contemplated that the attachment brackets 314' could not connect the seat base frame 302 to the frame 12 via the rod 310, but via a member other than the rod 310. It is also contemplated that the attachment bracket 314' could be directly connected to the vehicle frame 12.

With reference to FIG. 13A, when the seat base 19A is in a seating position, the pivot axis 315 is disposed below the seat cushion 304 and longitudinally between the front end 302a and the rear end 302b of the seat base frame 302. With reference to FIG. 13D, when the seat base 19A is in a storage position, the pivot axis 315 is disposed between the front and rear ends, 302a and 302b, of the seat base frame 302 in the vertical and in the longitudinal direction. As can be seen in FIG. 13D, the lower surface 302c of the seat base 19A is angled slightly forwardly from the vertical in the storage position. The pivot axis 315 is disposed vertically above and longitudinally rearward of the horizontal rod 310 in both of the positions. It is however contemplated that the seat base 19A could be configured differently than as discussed above. For example, the seat base 19A could be configured to pivot downwards to its storage position such that the pivot axis 315 is disposed longitudinally rearward of the seat base 19A. It is contemplated that the pivot axis 315 could be disposed above the seat base 19A in the seating position and rearward of the seat base 19A in the storage position (for a seat base 19A that pivots upwards to its storage position). It is contemplated that the pivot axis 315 could be disposed above the seat cushion 304 in the seating position and rearward of the seat cushion 304 in the storage position (for a seat base 19A that pivots downwards to its storage position). It is also contemplated that the pivot axis 315 could be disposed longitudinally rearward of the seat base 19A in one or both of the seating and storage positions.

With reference to FIG. 13A, a pair of retaining brackets 320' is connected to the lower seat base frame surface 302c. The right retaining bracket 320' can be seen in FIGS. 13A to 13E. The left retaining bracket 320' is generally a mirror image of the right retaining bracket 320' and as such only the right retaining bracket 320' will be described herein. In the illustrated implementation, the right retaining bracket 320' is connected to the lower surface 302c of the right side edge of the seat base frame 302 which has the right attachment bracket 314' connected thereto. It is however contemplated that the brackets 314', 320' could be connected to the seat base frame 302 at other locations than as shown herein. It is contemplated that there could be one or more than two attachment brackets 314' connecting each seat base frame 302 to the rod 310. It is contemplated that there could be one or more than two retaining brackets 320' connecting each seat base frame 302 to the rod 310. It is contemplated that the retaining brackets 320' could be formed integrally with the seat base frame 302 and/or one of the ribs 306 disposed thereon.

With reference to FIGS. 13B to 13E, the retaining bracket 320' has a front end 322 disposed closer to the front end 302a of the seat base frame 302, and a rear end 324 disposed closer to the rear end 302b of the seat base frame 302. When the seat base 19A is disposed in the seating position, the front end 322 is disposed forward of the rear end 324. When the seat base 19A is in a storage position, the front end 322 is disposed above the rear end 324.

With reference to FIGS. 13B to 13E, the retaining bracket 320 has a retaining surface 325' extending between the front and rear ends 322, 324. The retaining surface 325' forms an arc-shaped groove 326' near its front end 322, another arc-shaped groove 328' near its rear end 324. In the illustrated implementation, the grooves 326', 328' have an arc length that is smaller than that of a semi-circle but it is contemplated that the grooves 326', 328' could have a different shape and size than that shown herein as long as the shape provides sufficient contact between the rod 310 and the surface of the grooves 326', 328' to retain the rod 310 therein and to prevent rattling of the rod 310 when it is received in the groove 326' or 328'. With reference to FIG. 13B, when the seat base 19A is disposed in a seating position, the retaining surface 325' between the grooves 326', 328' extends generally horizontally and the grooves 326', 328' extends upwards from the retaining surface 325' towards the seat cushion 304. When the seat base 19A is disposed generally horizontally in a seating position, the rod 310 is received in the front groove 326', which is therefore referred to herein as the seating position groove 326'. When the seat base 19A is disposed in a storage position (FIG. 13D), the rod 310 is received in the rear groove 328', which is therefore referred to herein as the storage position groove 328'.

Near the seating position groove 326' and spaced therefrom, the retaining surface 325' has a knob-like projection 412. The projection 412 is disposed further away from the front end 322 than the seating position groove 326'. The projection 412 is separated from the surface of the seating position groove 326 by a groove 411 that is deeper and narrower than the seating position groove 326'. As can be seen in FIG. 13E, the projection 412 projects inside an imaginary circle formed by extending the arc-shaped seating position groove 326'. Thus, as can be seen in FIG. 13B, in the seating position, when the rod 310 is disposed in the seating position groove 326', the projection 412 pushes into the rod 310. In the seating position, the projection 412 and the seating position groove 326' are on opposite sides of an imaginary plane 416 containing the pivot axis 315 and the central axis of the rod 310 so that the force exerted by the projection 412 pushing against the rod 310 biases the seat base 19A to remain in the seating position. The projection 412 thus retains the seat base 19A in the seating position and also prevents any slight relative movement between the seating position groove 326' and the rod 310 that could cause unwanted noise or "rattling" of the seat base 19A when disposed in the seating position.

Similarly, near the storage position groove 328', and spaced therefrom, the retaining surface 325' has a knob-like projection 414. The projection 414 is disposed further away from the rear end 324 than the storage position groove 328'. The projection 414 is separated from the surface of the storage position groove 328' by a groove 413 that is deeper and narrower than the storage position groove 328'. As can be seen in FIG. 13C, the projection 414 projects inside an imaginary circle formed by extending the arc-shaped storage position groove 328'. Thus, as can be seen in FIG. 13D, in the storage position, when the rod 310 is disposed in the storage position groove 328', the projection 414 pushes into the rod 310. In the storage position of the seat base 19A, the projection 414 and the storage position groove 328' are on opposite sides of an imaginary plane 418 containing the pivot axis 315 and the central axis of the rod 310 so that the force exerted by the projection 412 pushing against the rod 310 biases the seat base 19A to remain in the storage position. The projection 414 thus retains the seat base 19A in the storage position and also prevents any slight relative movement between the surfaces of the storage position groove 328' and the rod 310 that could cause unwanted noise or "rattling" of the seat base 19A when disposed in the storage position.

As can be seen in FIGS. 13C and 13E, the rod 310 pushes against the retaining surface 325' between the projections 412 and 414 when the seat base 19A is being moved between the seating and storage positions. The retaining surface 325' flexes to allow the seat base 19A to move between the seating and storage positions. The retaining bracket 320' shown herein is made of acetal, but it is contemplated that the retaining bracket 320' could be made of a material other than acetal that can flex sufficiently to allow the seat base 19A to move between the seating and storage positions.

With reference to FIGS. 13B and 13C, the rod 310 can be disengaged from the seating position groove 326' by applying an upward and rearward force to the front portion (i.e. the portion near the front end 302*b*) of the seat base 19A so that the rod 310 presses rearwards against the projection 412, thereby slightly deforming the retaining surface 325' adjacent the projection 414 and allowing the rod 310 to slide past the projection 412. The rod 310 is thus no longer retained in the seating position groove 326' and the seat base 19A is no longer retained in the seating position.

Similarly, with reference to FIGS. 13D and 13E, the rod 310 can be disengaged from the storage position groove 328' by applying an downward and forward force to the front portion (i.e. the portion near the front end 302*b*) of the seat base 19A so that the rod 310 presses upwardly against the projection 414, thereby slightly deforming the retaining surface 325' adjacent the projection 414 and allowing the rod 310 to slide past the projection 414. The rod 310 is thus no longer retained in the storage position groove 328' and the seat base 19A is no longer retained in the seating position.

With reference to FIGS. 13A to 13E, the pivoting mechanism for the seat base 19A described above positively retains the seat base 19A in the storage position as well as in the seating position. In the illustrated implementation, the rod 310 serves as a retaining member as well as a support member by which the seat base 19A is connected to the frame 12. Using the support member 310 as a retaining member 310 reduces the number of components used in the vehicle 10 and thereby limits an increase in weight of the vehicle 10. It is however contemplated that the vehicle 10' could have separate support member and retaining member.

With reference to FIGS. 14A to 14C, the SSV 10' has a gear selector 44' that is different from the gear selector 44 discussed above. The gear selector 44' is mounted to the upper portion of the front cockpit wall 23 so as to be disposed on the right side of the steering wheel 28. The gear selector 44' has a rounded handle portion 44'*a* connected to the right end of a shaft 44'*b*. From the front cockpit wall 23, the gear selector shaft portion 44'*b* extends upwardly, then upwardly and rightwardly, and then upwardly to the handle portion 44'*a*. The shaft portion 44'*b* is movably mounted to the front wall 23 so as to be movable in a longitudinal direction as can be seen best in FIGS. 14A and 14B. The gear selector 44' can be selectively placed in one of a plurality of positions corresponding to the plurality of gear configurations of the transmission 116. In the illustrated implementation of the vehicle 10, the gear selector positions include, in sequential order: a parking (P) position, a reverse (R) position, a neutral (N) position, a high gear (H) position, and a low gear (L) position.

The gear selector 44' is connected to the transmission 116 by a gear selector cable 384. From the gear selector 44', the gear selector cable 384 extends downwardly and forwardly through an upper opening 396 (FIG. 14C). From the upper opening 396, the gear selector cable 384 extends downwardly and rightwardly to a lower opening 398 (FIG. 14C). Thus, the portion of the gear selector cable 384 extending between the openings 396 and 398 is disposed forwardly of the front cockpit wall 23. The gear selector cable 384 passes rearwardly through the opening 398 into the cockpit area 20 and extends downwardly behind the front cockpit wall 23. A removable panel 23*a* (FIG. 14B) covers the portion of the gear selector cable 384 that extends in the cockpit area 20 behind the front cockpit wall 23. The gear selector cable 384 extends downwardly between the removable panel 23a and the front cockpit wall 23, then passes under the removable panel 23a to extend longitudinally rearwardly below the cockpit floor 21. The gear selector cable 384 extends longitudinally, on a right side of the tunnel 221 between the tunnel 221 and the raised portion 22 of the cockpit floor 21, before connecting to the transmission 116. It is contemplated that the longitudinally extending portion of the gear selector cable 384 could be disposed in the tunnel 221, or on a left side of the tunnel 221. It is contemplated that the shape, size and position of the openings 396, 398 could be different than as shown herein.

Modifications and improvements to the above-described implementation of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
    a frame;
    a left front wheel, a right front wheel, a left rear wheel and a right rear wheel;
    a left front suspension operatively connecting the left front wheel to the frame;
    a right front suspension operatively connecting the right front wheel to the frame;
    a left rear suspension operatively connecting the left rear wheel to the frame;
    a right rear suspension operatively connecting the right rear wheel to the frame;
    at least one seat connected to the frame and having a seat base, the at least one seat being disposed longitudinally rearward of the left and right front suspensions;
    an engine operatively connected to at least one of the wheels;
    an air induction system fluidly communicating with the engine and including an airbox; and
    a fuel tank fluidly communicating with the engine,
    the engine, the airbox and the fuel tank being entirely disposed longitudinally forward of the left and right rear suspensions and longitudinally rearward of the seat base of the at least one seat.

2. The vehicle of claim 1, wherein each of the engine, the airbox and the fuel tank is entirely disposed longitudinally rearward of a seat base plane, the seat base plane being a laterally extending vertical plane containing a rearmost point of the seat base of the at least one seat.

3. The vehicle of claim 1, wherein each of the engine and the fuel tank is entirely disposed vertically lower than a horizontal plane containing a highest point of the seat base of the at least one seat.

4. The vehicle of claim 1, wherein the fuel tank is disposed on one side of the engine.

5. The vehicle of claim 1, wherein the fuel tank is disposed on one side of a longitudinal centerplane of the vehicle.

6. The vehicle of claim 5, wherein the airbox is disposed on the one side of the longitudinal centerplane.

7. The vehicle of claim 5, wherein the longitudinal centerplane intersects the engine.

8. The vehicle of claim 1, wherein the engine has an output shaft defining an output shaft axis extending laterally; and
    wherein a vertical plane containing the output shaft axis intersects the fuel tank.

9. The vehicle of claim 1, wherein a rear portion of the fuel tank is disposed longitudinally rearward of the engine.

10. The vehicle of claim 9, wherein a front portion of the fuel tank is disposed longitudinally forward of a front of the engine.

11. The vehicle of claim 1, wherein the airbox is disposed on one of a left side and a right side of the engine.

12. The vehicle of claim 1, wherein the airbox is disposed above the fuel tank and longitudinally and laterally overlaps the fuel tank.

13. The vehicle of claim 12, further comprising a firewall disposed between the at least one seat and the engine, the airbox and the fuel tank, wherein the airbox is at least in part supported by the firewall.

14. The vehicle of claim 1, wherein the airbox is generally cylindrical; and
    wherein a cylindrical axis of the airbox extends horizontally and laterally.

15. The vehicle of claim 1, wherein the airbox has an outlet defined on a lateral end surface of the airbox.

16. The vehicle of claim 1, wherein the airbox has an inlet defined on one of an upper surface and a rear surface of the airbox.

17. The vehicle of claim 1, wherein the air induction system further comprises a intake conduit fluidly communicating with an inlet of the airbox; and
    wherein the intake conduit has an inlet to receive air from the atmosphere, the inlet being disposed longitudinally rearward of the seat base of the at least one seat.

18. The vehicle of claim 1, wherein the at least one seat comprises a left seat and a right seat, each of the left and right seats including a seat base and a seat back, the seat base of each of the left and right seats being longitudinally disposed entirely forward of the engine, the fuel tank, and the airbox.

19. The vehicle of claim 18, wherein the seat base plane contains respective rearmost points of the seat bases of the left and right seats.

20. The vehicle of claim 18, wherein:
    at least a portion of the fuel tank is laterally aligned with at least a portion of the seat base of one of the right and left seats.

21. The vehicle of claim 20, wherein a front portion of the fuel tank is disposed below a portion of the seat back of the one of the right and left seats.

22. The vehicle of claim 18, wherein the at least one seat further comprises a middle seat disposed laterally between the left and right seats, the middle seat including a seat base and a seat back, the seat base of the middle seat being longitudinally disposed entirely forward of the engine, the fuel tank, and the airbox.

23. The vehicle of claim 1, further comprising an exhaust system including a muffler fluidly communicating with the engine to expel exhaust gases from the engine, wherein:
    the muffler is laterally disposed between the left rear wheel and the right rear wheel, with the vehicle being steered in a straight ahead direction;
    at least a portion of the muffler extends vertically above the rear wheels, with the rear wheels being disposed on level ground, and in the absence of a load being carried by the vehicle; and
    at least a portion of the muffler is disposed longitudinally rearward of a vertical plane passing through a front edge of the rear wheels and longitudinally forward of a vertical plane passing through a rear edge of the rear wheels, with the vehicle being steered in a straight ahead direction.

24. The vehicle of claim 23, wherein the muffler includes an outlet, the outlet being disposed at least in part facing a lateral side of the vehicle.

25. The vehicle of claim 1, wherein each of the left and right rear suspensions includes a shock absorber connected to the frame and disposed longitudinally rearward of the engine, the fuel tank and the airbox.

26. The vehicle of claim 1, further comprising a continuously variable transmission (CVT) operatively connecting the engine to at least one of the wheels, the CVT being disposed on a left side of the engine.

27. The vehicle of claim 26, wherein the CVT is disposed on one side of a longitudinal centerplane of the vehicle, and the fuel tank and airbox are each disposed on an other side of the longitudinal centerplane.

28. The vehicle of claim 26, wherein the CVT comprises:
 a driving pulley defining a driving pulley axis extending laterally; and
 a driven pulley defining a driven pulley axis extending laterally, the driven pulley axis being disposed longitudinally rearward of the driving pulley axis; and wherein:
 a front portion of the fuel tank is disposed longitudinally forward of the driving pulley axis;
 a rear portion of the fuel tank is disposed longitudinally rearward of the driven pulley axis; and
 the left and right rear suspensions are disposed entirely longitudinally rearward of the driven pulley axis.

29. The vehicle of claim 26, further comprising a transmission operatively connecting the CVT to at least one of the wheels, the transmission being disposed rearward of the engine.

30. The vehicle of claim 1, further comprising a rear differential operatively connected to the left and right rear wheels and defining a rear differential axis, the engine, the fuel tank and the airbox being disposed longitudinally forward of the rear differential axis.

31. The vehicle of claim 1, further comprising:
 a cockpit area defined by the frame, the at least one seat being disposed in the cockpit area; and
 a roll cage connected to the frame and disposed at least in part over the cockpit area.

* * * * *

UNITED STATES PATENT AND TRADEMARK OFFICE
CERTIFICATE OF CORRECTION

PATENT NO. : 9,932,073 B2  
APPLICATION NO. : 15/113452  
DATED : April 3, 2018  
INVENTOR(S) : Frank Dube et al.

Page 1 of 1

It is certified that error appears in the above-identified patent and that said Letters Patent is hereby corrected as shown below:

Claim 17, Column 36, Line 25, "comprises a intake" should read --comprises an intake--

Signed and Sealed this  
Twenty-second Day of May, 2018

Andrei Iancu  
*Director of the United States Patent and Trademark Office*